US007523236B1

(12) United States Patent
Nemazie et al.

(10) Patent No.: US 7,523,236 B1
(45) Date of Patent: *Apr. 21, 2009

(54) SWITCHING SERIAL ADVANCED TECHNOLOGY ATTACHMENT (SATA) TO A PARALLEL INTERFACE

(75) Inventors: Sam Nemazie, San Jose, CA (US); Andrew Hyonil Chong, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 10/775,521

(22) Filed: Feb. 9, 2004

Related U.S. Application Data

(63) Continuation-in-part of application No. 10/775,488, filed on Feb. 9, 2004, and a continuation-in-part of application No. 10/775,553, filed on Feb. 9, 2004.

(60) Provisional application No. 60/477,857, filed on Jun. 11, 2003.

(51) Int. Cl.
*G06F 13/12* (2006.01)
*G06F 13/38* (2006.01)

(52) U.S. Cl. .............................. 710/74; 710/52; 710/56; 710/71; 370/229; 370/230

(58) Field of Classification Search .................... 710/31, 710/51, 54, 74, 71, 52, 56; 370/351–430, 370/229, 230
See application file for complete search history.

(56) References Cited

U.S. PATENT DOCUMENTS

| | | | |
|---|---|---|---|
| 5,440,752 A | | 8/1995 | Lentz et al. |
| 6,247,100 B1 | | 6/2001 | Drehmel et al. |
| 6,388,590 B1 | * | 5/2002 | Ng .............................. 341/100 |
| 6,434,620 B1 | * | 8/2002 | Boucher et al. ............. 709/230 |
| 6,735,650 B1 | | 5/2004 | Rothberg |
| 6,763,402 B2 | * | 7/2004 | Talati .......................... 710/36 |

(Continued)

FOREIGN PATENT DOCUMENTS

TW           507896           10/2002

OTHER PUBLICATIONS

"Serial ATA Specification", Jan. 7, 2003, pp. 33-35, 248-249 and 301-302.*

(Continued)

*Primary Examiner*—Alford W Kindred
*Assistant Examiner*—Chun-Kuan Lee
(74) *Attorney, Agent, or Firm*—Maryam Imam

(57) ABSTRACT

A switch is coupled between a plurality of host units and a device, for communicating therebetween. A first serial advanced technology attachment (SATA) port includes a first host task file, and is coupled to a first host unit. A second SATA port includes a second host task file, and is coupled to a second host unit. The task files are responsive to commands sent by the respective host units, and cause access to the device by the host respective host units. A third parallel ATA port includes a device task file, and is coupled to a device, for access to the device by the first or second host units. An arbitration and control circuit is coupled to the task files, for selecting one of the first or second host units to concurrently access the device through the switch at any given time, including when the device is not idle.

36 Claims, 43 Drawing Sheets

U.S. PATENT DOCUMENTS

| | | | |
|---|---|---|---|
| 6,854,045 B2 * | 2/2005 | Ooi et al. | 711/202 |
| 6,961,787 B2 * | 11/2005 | Ooi | 710/19 |
| 6,961,813 B2 * | 11/2005 | Grieff et al. | 711/112 |
| 7,154,905 B2 * | 12/2006 | Shin et al. | 370/465 |
| 2003/0033465 A1 | 2/2003 | Chien et al. | |
| 2003/0131166 A1 * | 7/2003 | Utsunomiya et al. | 710/74 |
| 2003/0236953 A1 | 12/2003 | Grieff et al. | |
| 2005/0120150 A1 | 6/2005 | Lissel et al. | |
| 2005/0198425 A1 | 9/2005 | Wang et al. | |
| 2006/0031612 A1 | 2/2006 | Bashford et al. | |
| 2006/0136666 A1 | 6/2006 | Pang et al. | |
| 2006/0174049 A1 | 8/2006 | Lin et al. | |
| 2006/0271739 A1 | 11/2006 | Tsai et al. | |

OTHER PUBLICATIONS

"SATA vs. PATA: the reality of Serial and Parallel ATA—Serial ATA", Nov. 2002.*

Klaus-Peter Deyring, Serial ATA: High Speed Serialized AT Attachment, Serial ATA Workgroup, Jan. 7, 2003, p. 1-35, Santa Cruz, USA, XP002393220.

Robert C. Elliot, Working Draft American National Standard: Information Technology Serial Attached SCSI—1.1 (SAS-1.1), Project T10/1601-D; Rev. 9e Jul. 24, 2005, Houston, Texas, USA; Reference No. ISO/IEC 14776-151:200x.

Robert C. Elliot, Working Draft American National Standard: Information Technology Serial Attached SCSI—2 (SAS-2), Project T10/1760-D; Rev. 6 Sep. 22, 2006, Houston, Texas, USA, Reference No. ISO/IEC 14776-152:200x.

SATA IO Board Members: Dell Computer Corporation, Hewlett Packard Corporation, Hitachi Packard Corporation, Hitachi Global Storage Technologies, Inc., Intel Corporation, Maxtor Corporation, Seagate Technology, Vitesse Semiconductor Corporation, Serial ATA International Organization: Serial ATA Revision 2.5, Oct. 27, 2005.

* cited by examiner

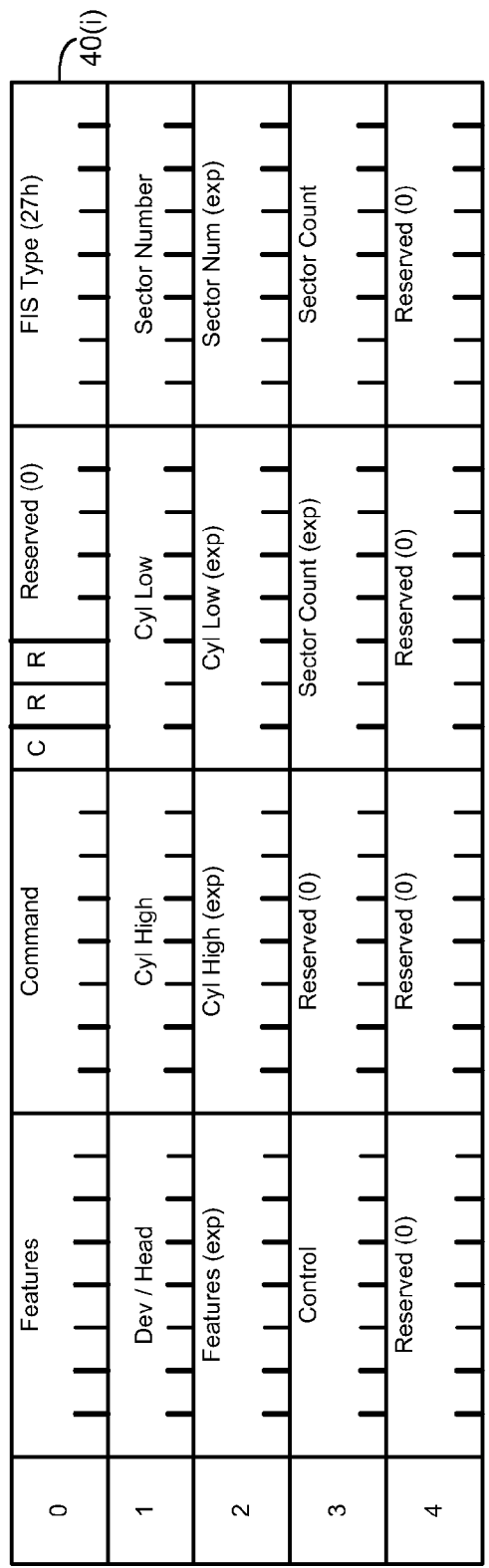
FIG. 1d(i) Register FIS Host to Device
(PRIOR ART)
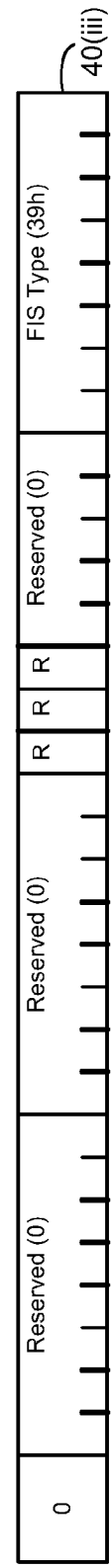
FIG. 1d(iii) DMA Activate FIS, Device to Host
(PRIOR ART)

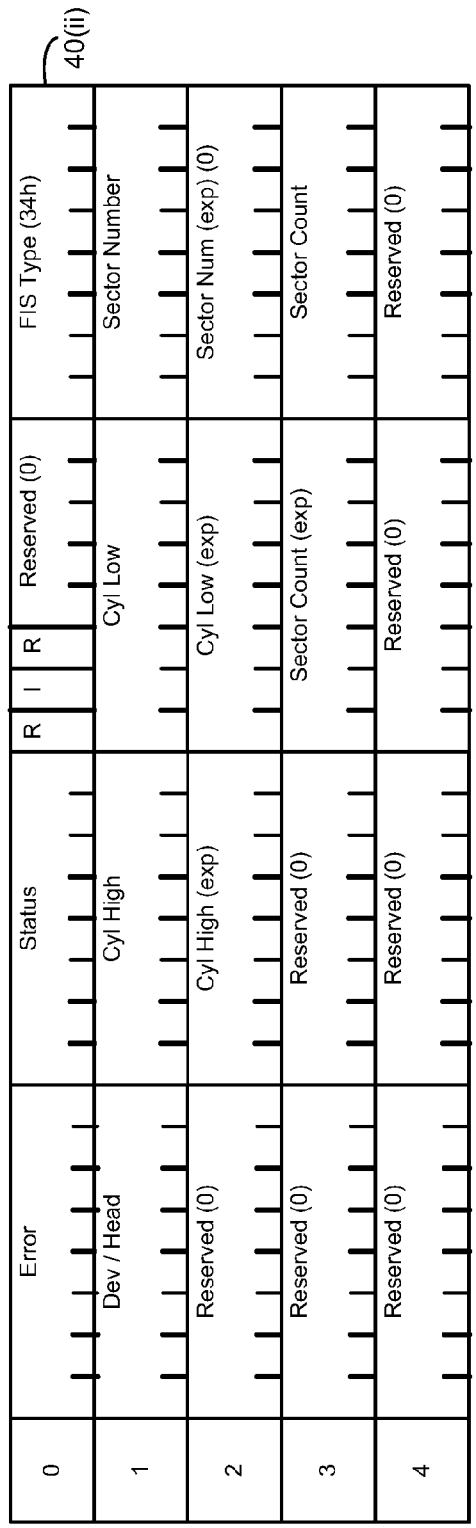
FIG. 1d(ii) Register FIS Device to Host
(PRIOR ART)
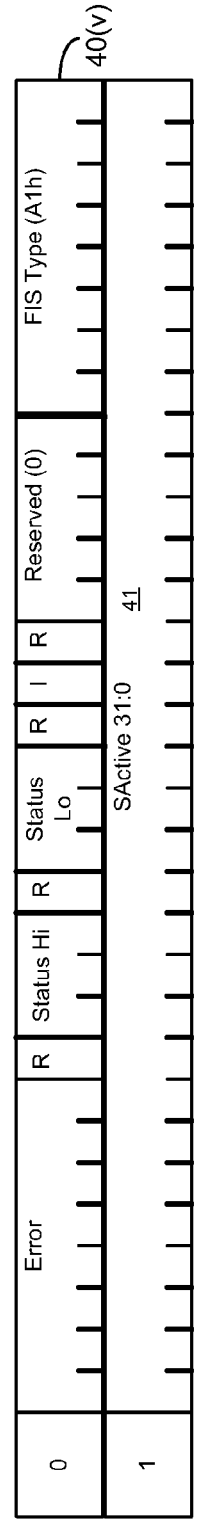
FIG. 1d(v) Set Device Bits FIS
(PRIOR ART)

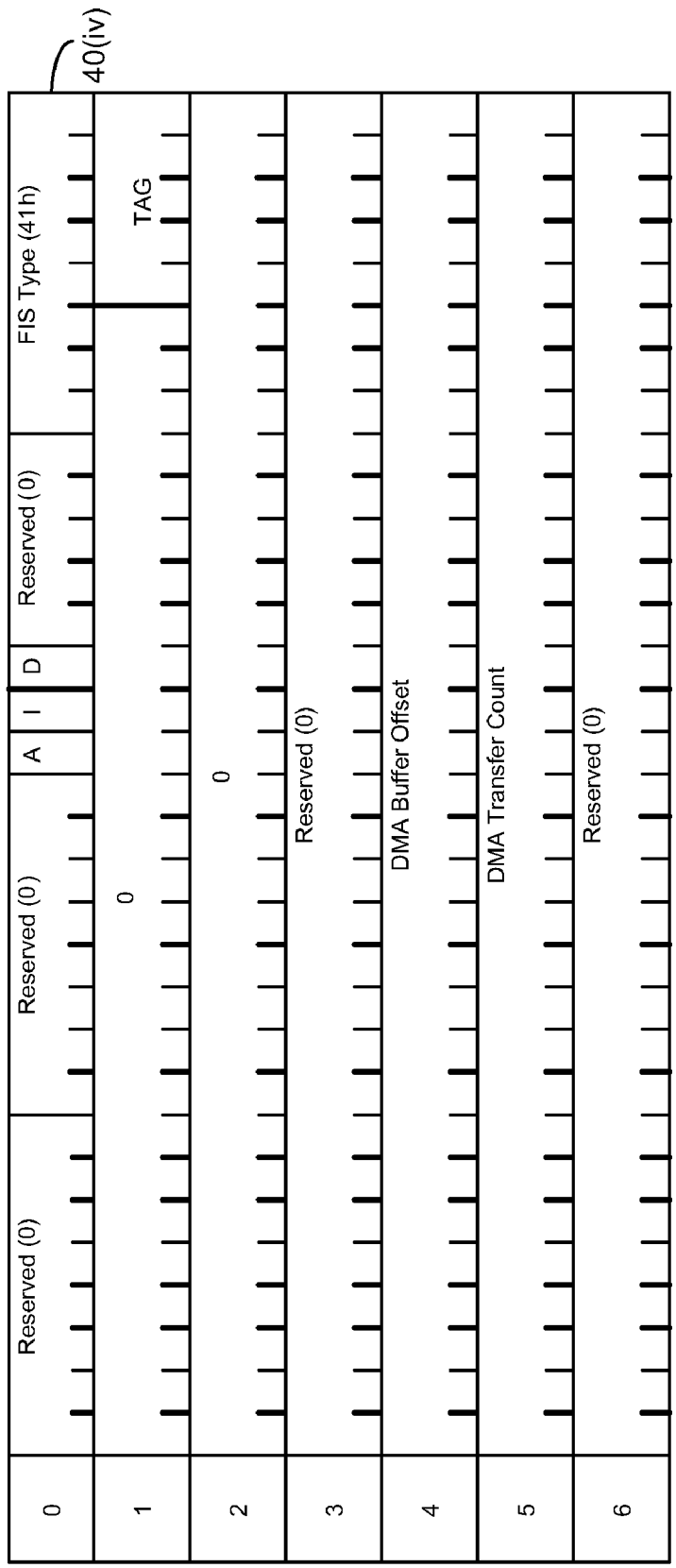
FIG. 1d(iv) DMA Setup FIS
(PRIOR ART)

| | | | | | |
|---|---|---|---|---|---|
| 0 | Error | Status | R | I | D | Reserved (0) | FIS Type (5Fh) |
| 1 | Dev / Head | Cyl High | Cyl Low | Sector Number |
| 2 | Reserved (0) | Cyl High (exp) | Cyl Low (exp) | Sector Number (exp) (0) |
| 3 | E_Status | Reserved (0) | Sector Count (exp) | Sector Count |
| 4 | Reserved (0) | Transfer Count |

FIG. 1d (vi) PIO Setup FIS
(PRIOR ART)

| | | | |
|---|---|---|---|
| 0 | Reserved (0) | R | R | R | Reserved (0) | FIS Type (46h) |
| ... | |
| ... | N Dwords of data |
| | (minimum of one Dword – maximum of 2048 Dwords) |
| n | |

FIG. 1d(vii) Data FIS
(PRIOR ART)

FIG. 1d (viii) BIST Activate FIS
(PRIOR ART)

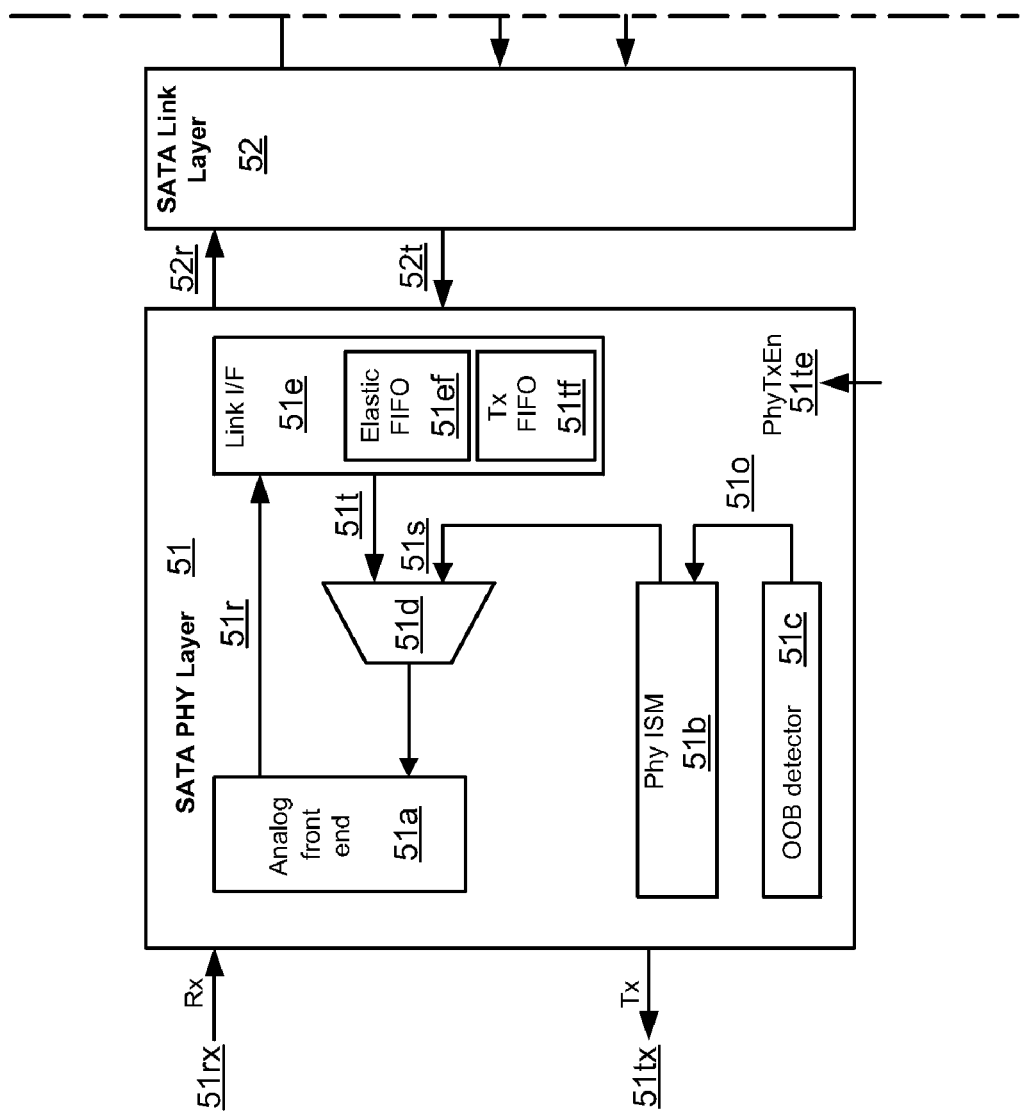
FIG. 2b(i) (PRIOR ART)

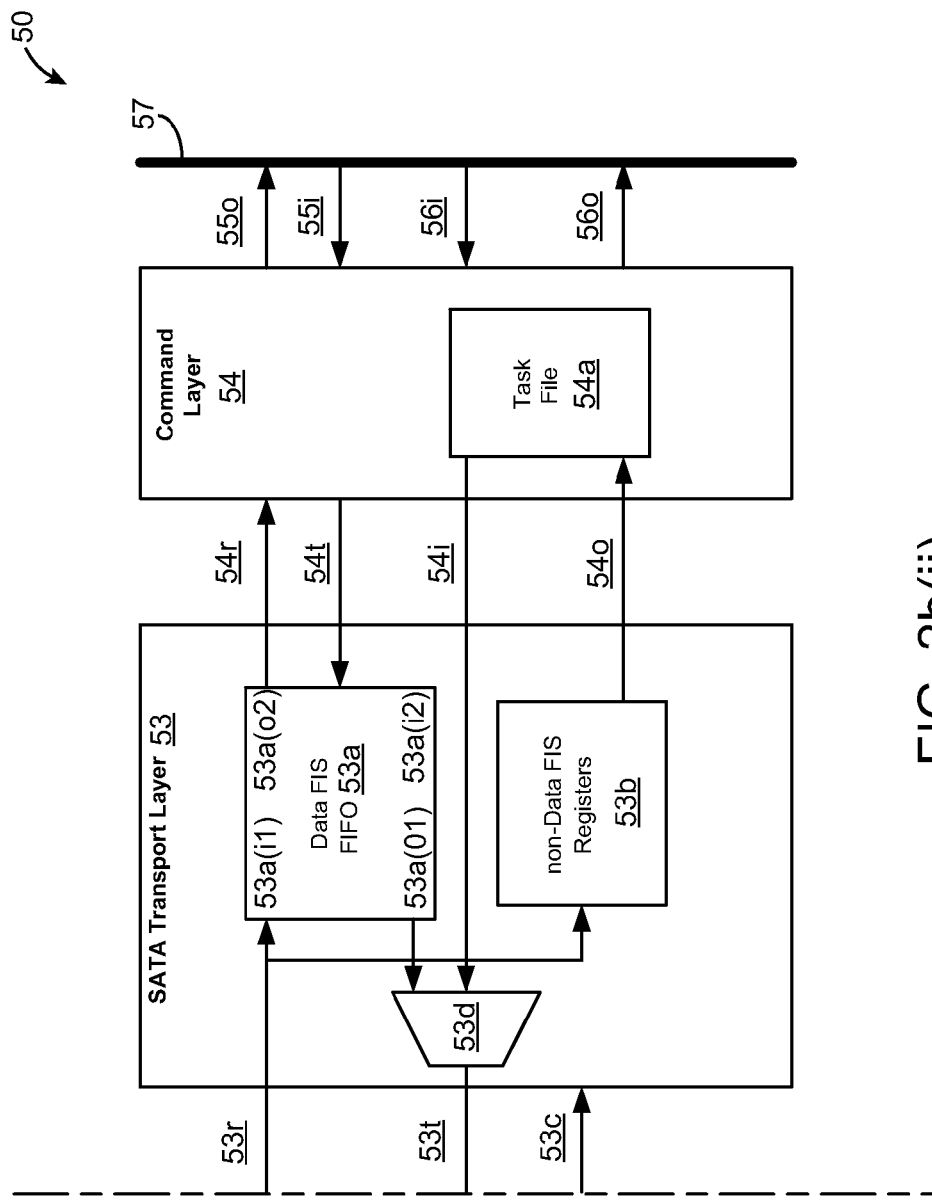
FIG. 2b(ii)
(PRIOR ART)

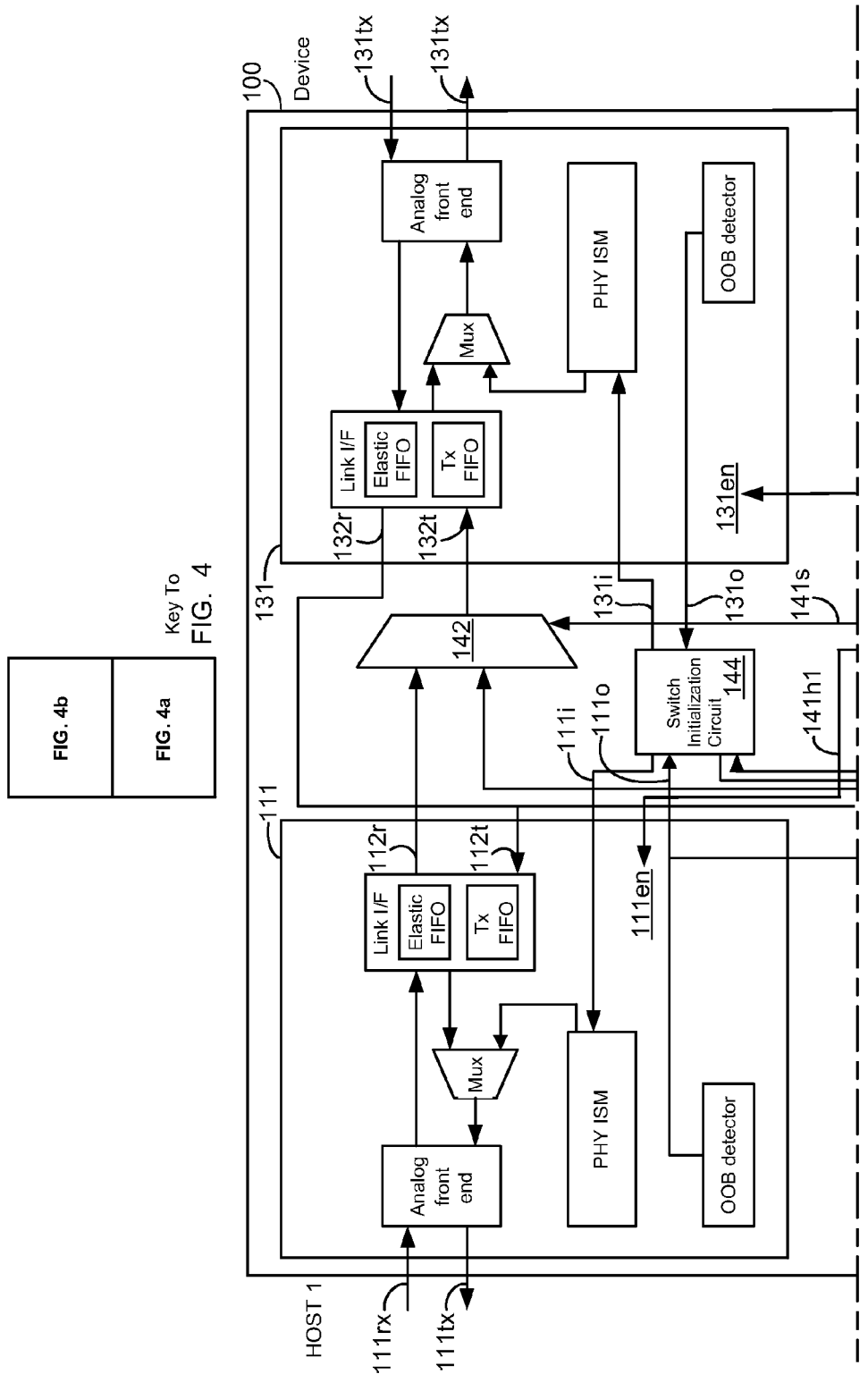

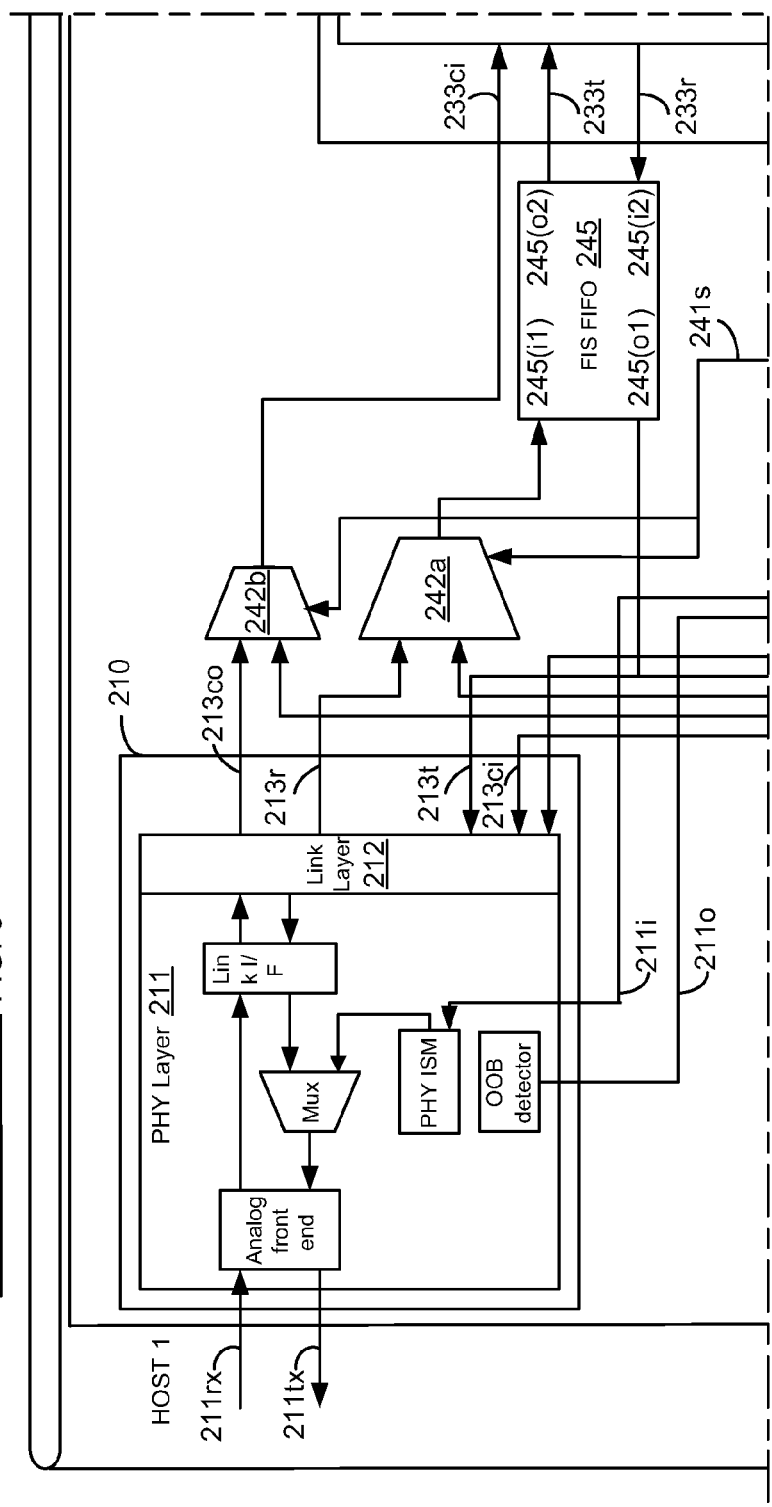
FIG. 5a
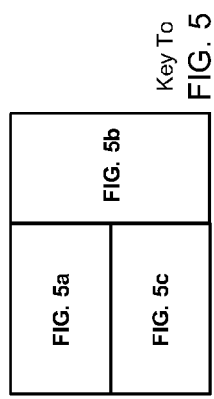
Key To FIG. 5
| FIG. 5a | FIG. 5b |
| --- | --- |
| FIG. 5c | |

FIG. 6a

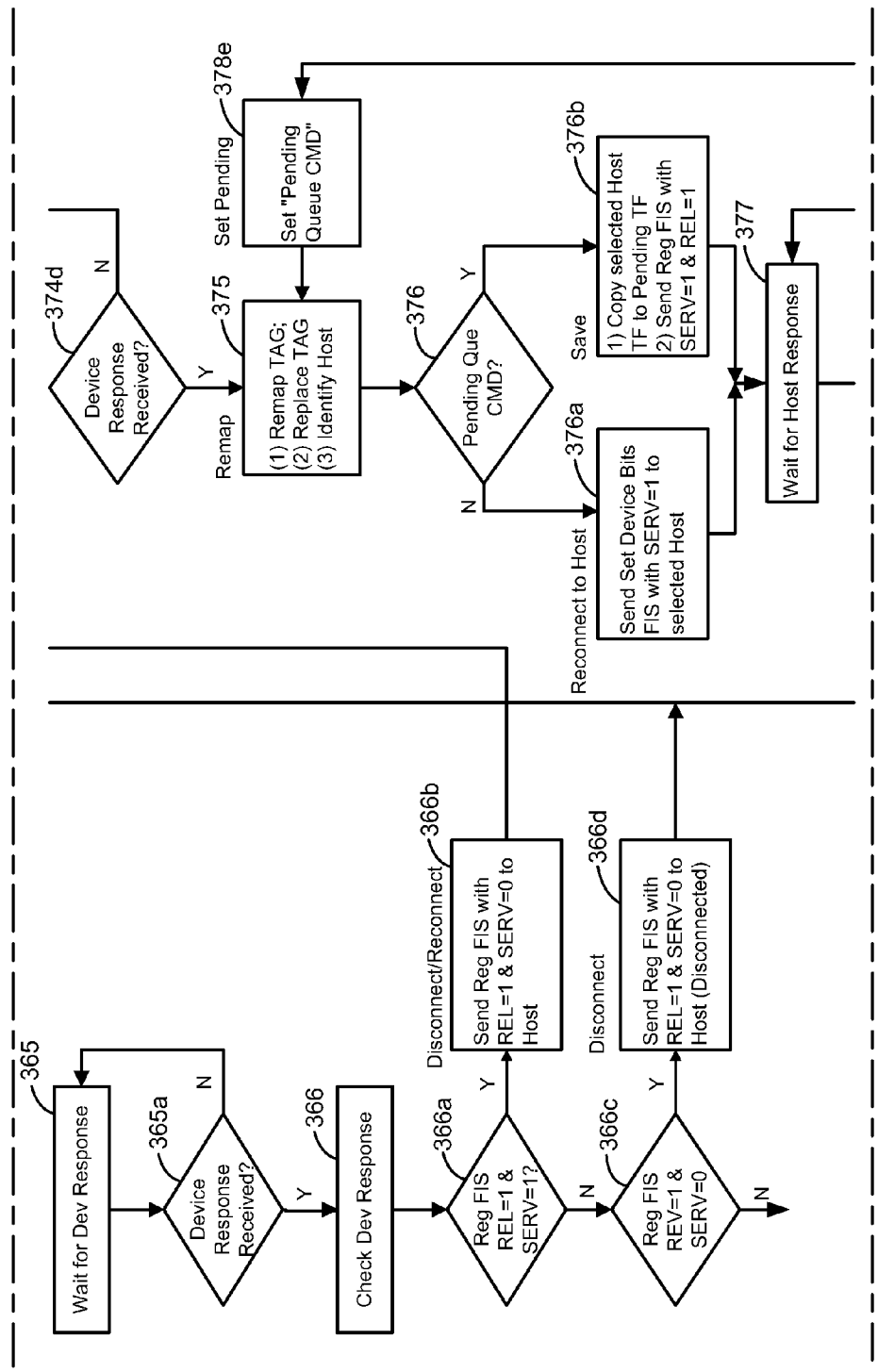
FIG. 8a(ii)

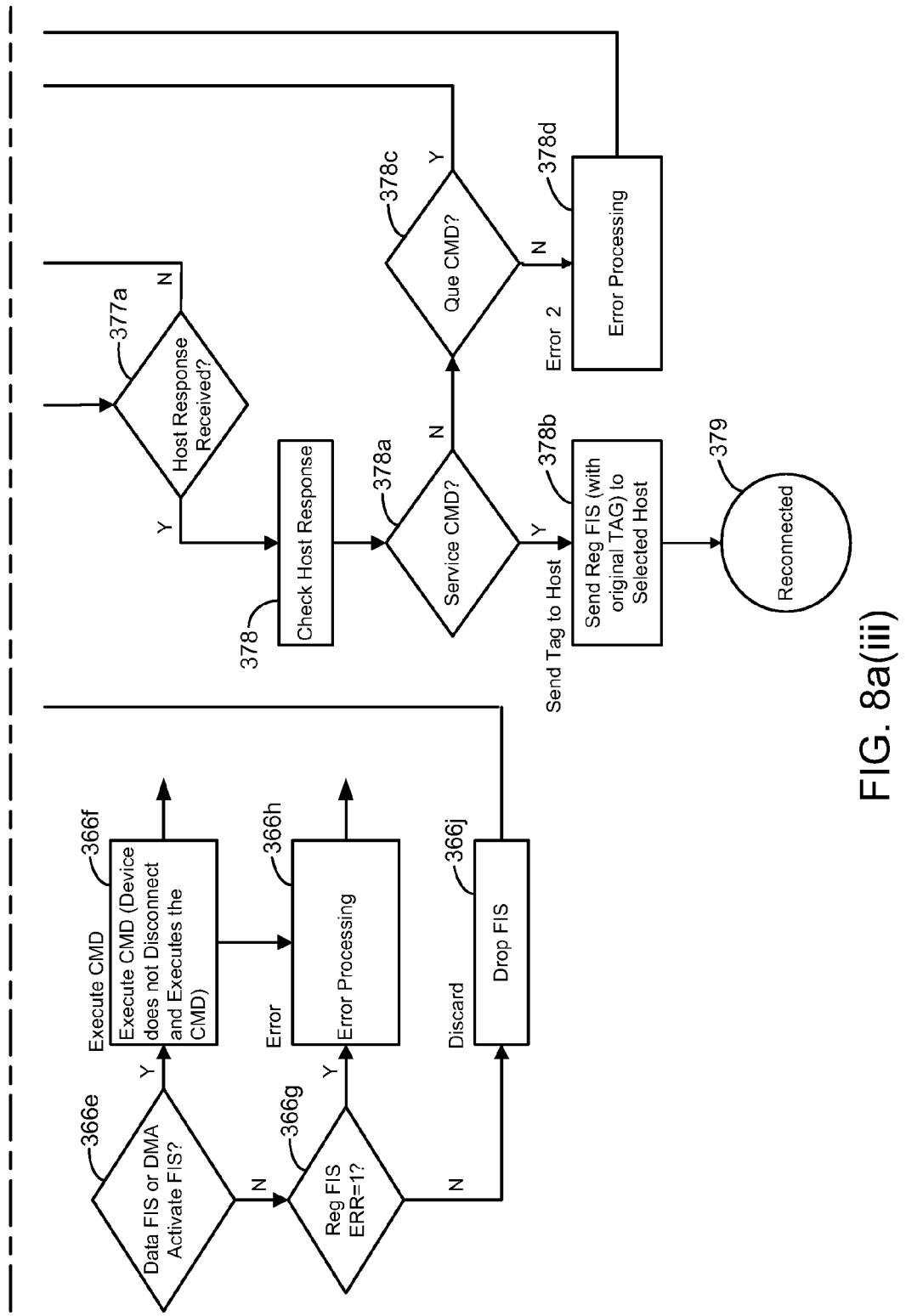
FIG. 8a(iii)

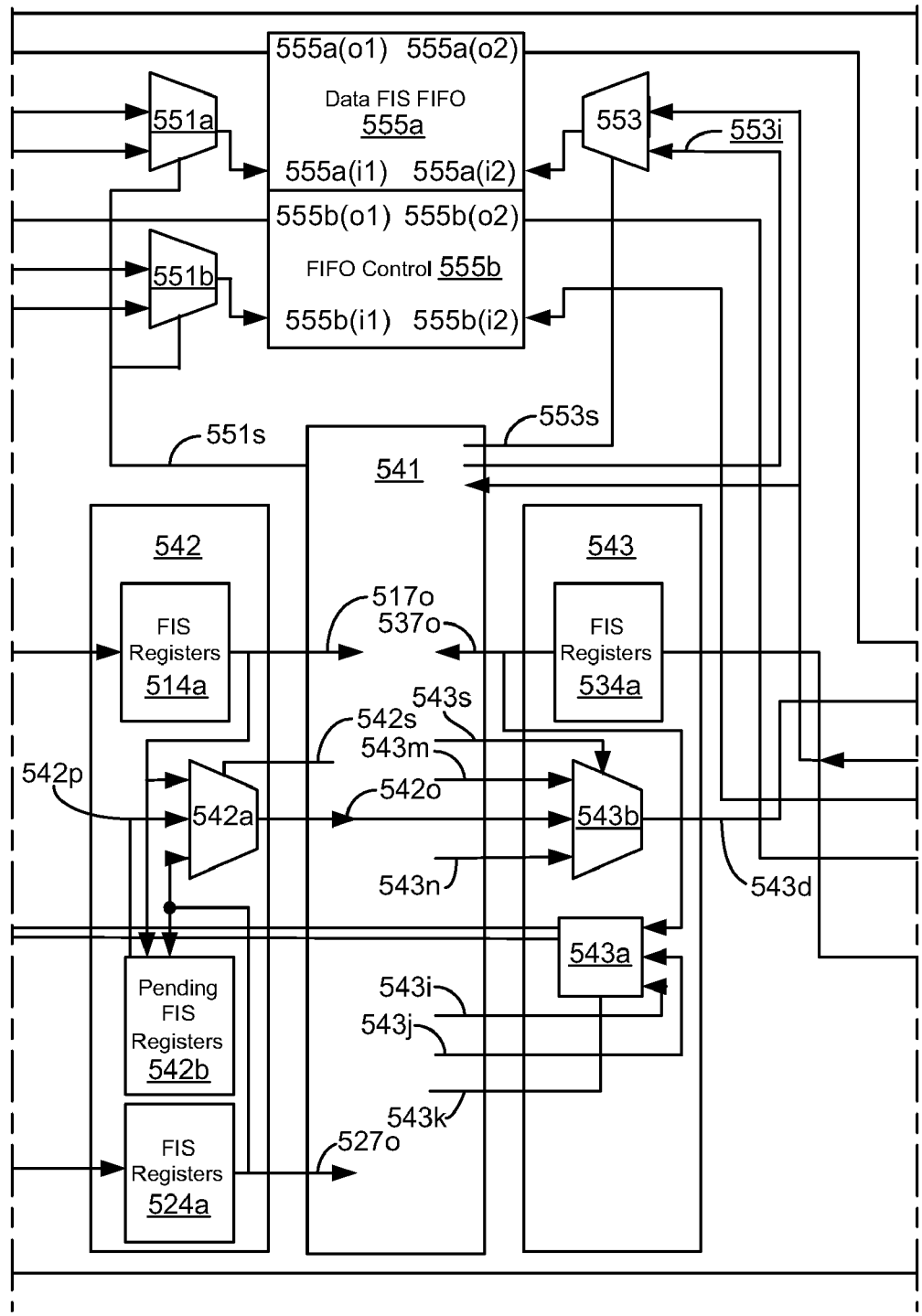
FIG. 10a(ii)

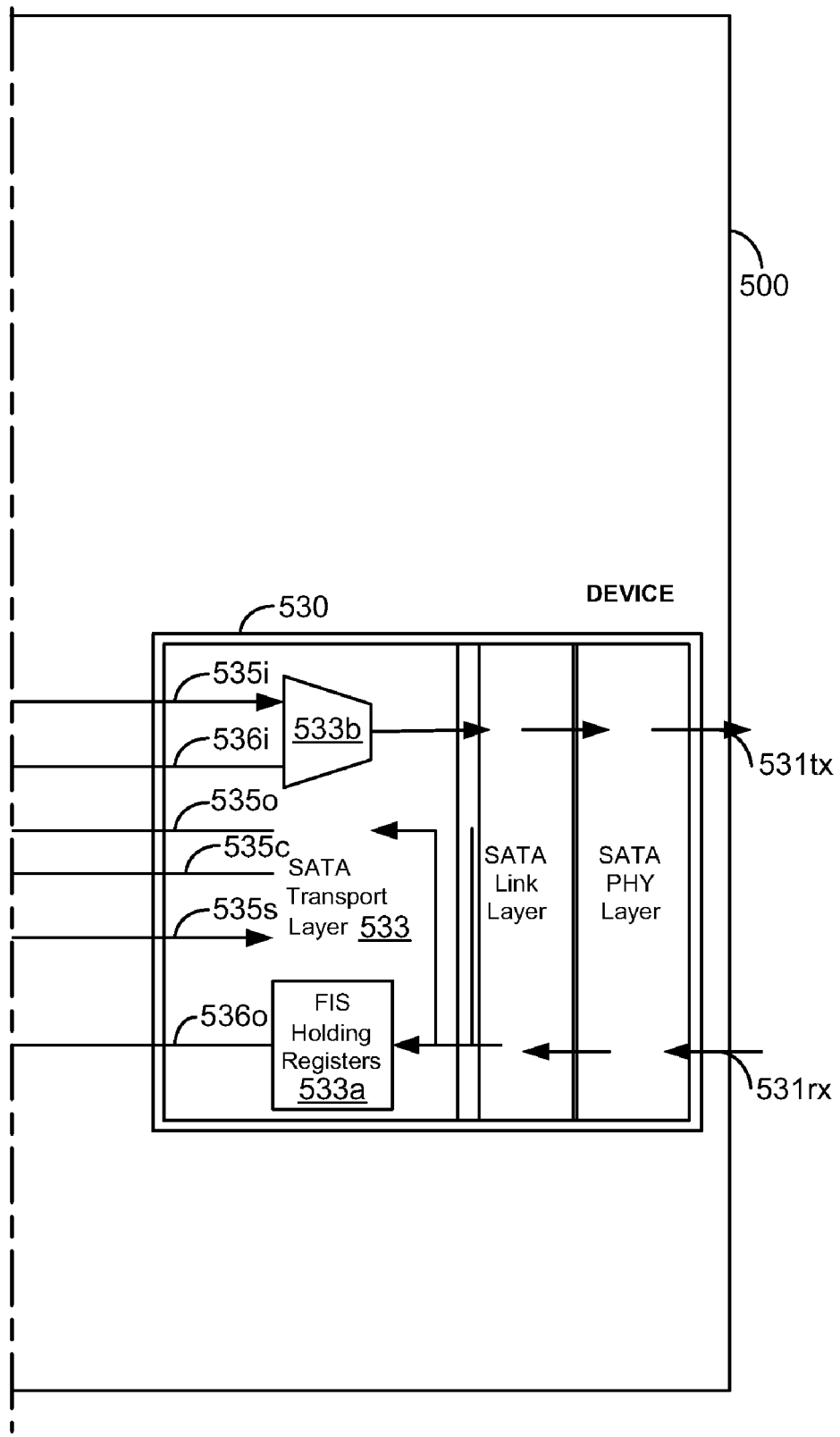
FIG. 10a(iii)

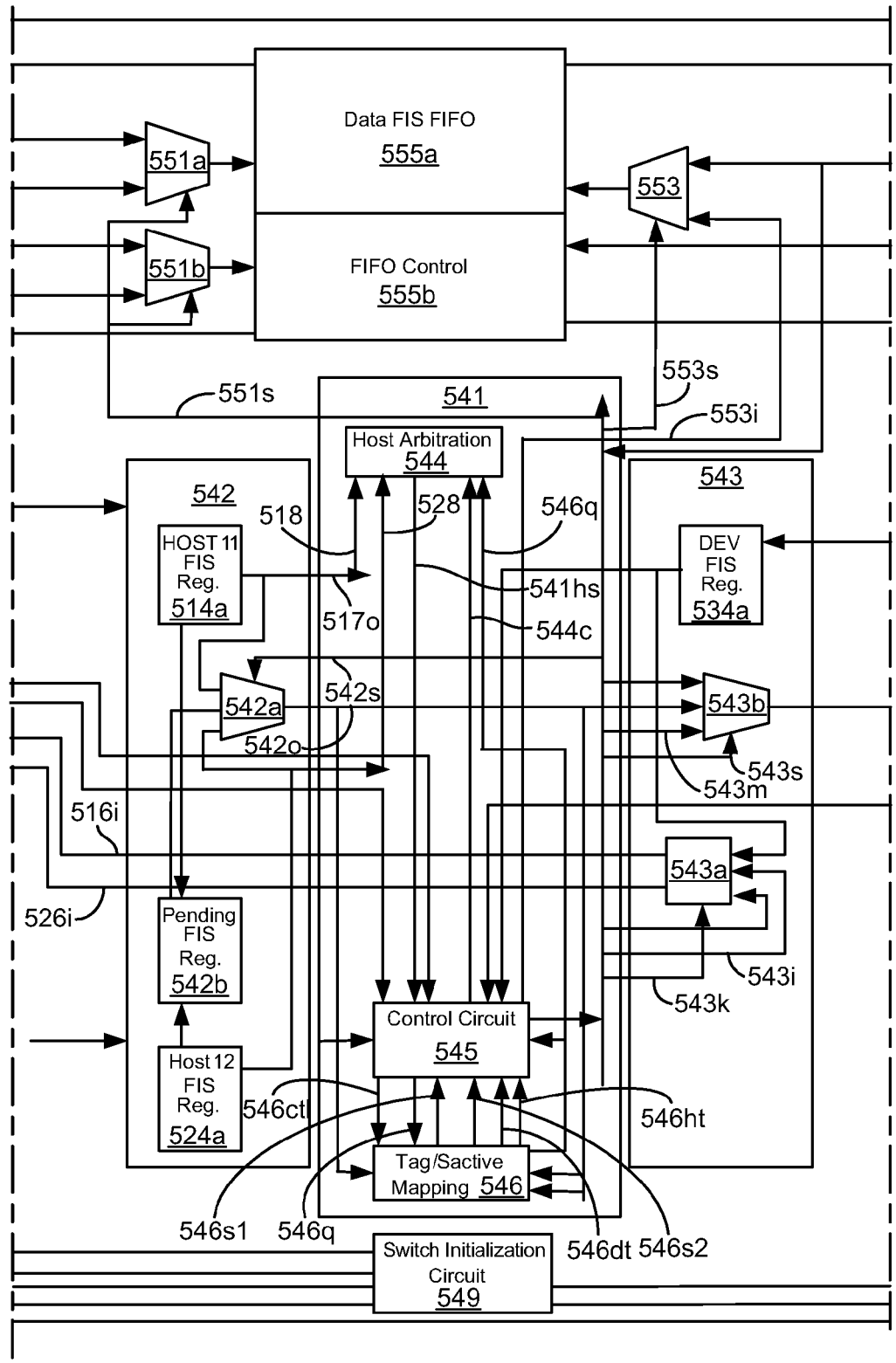
FIG. 10b(ii)

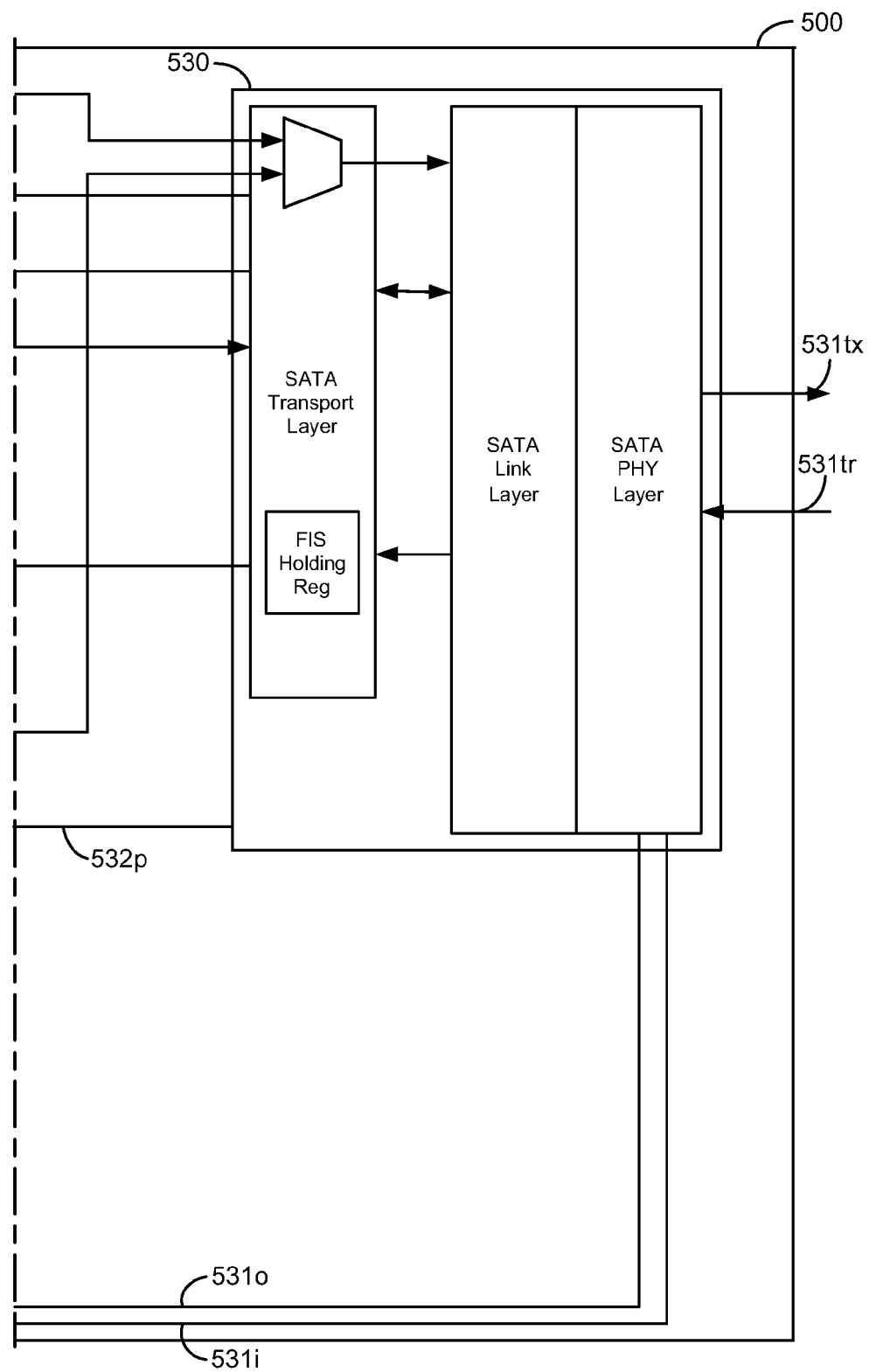
FIG.10b(iii)

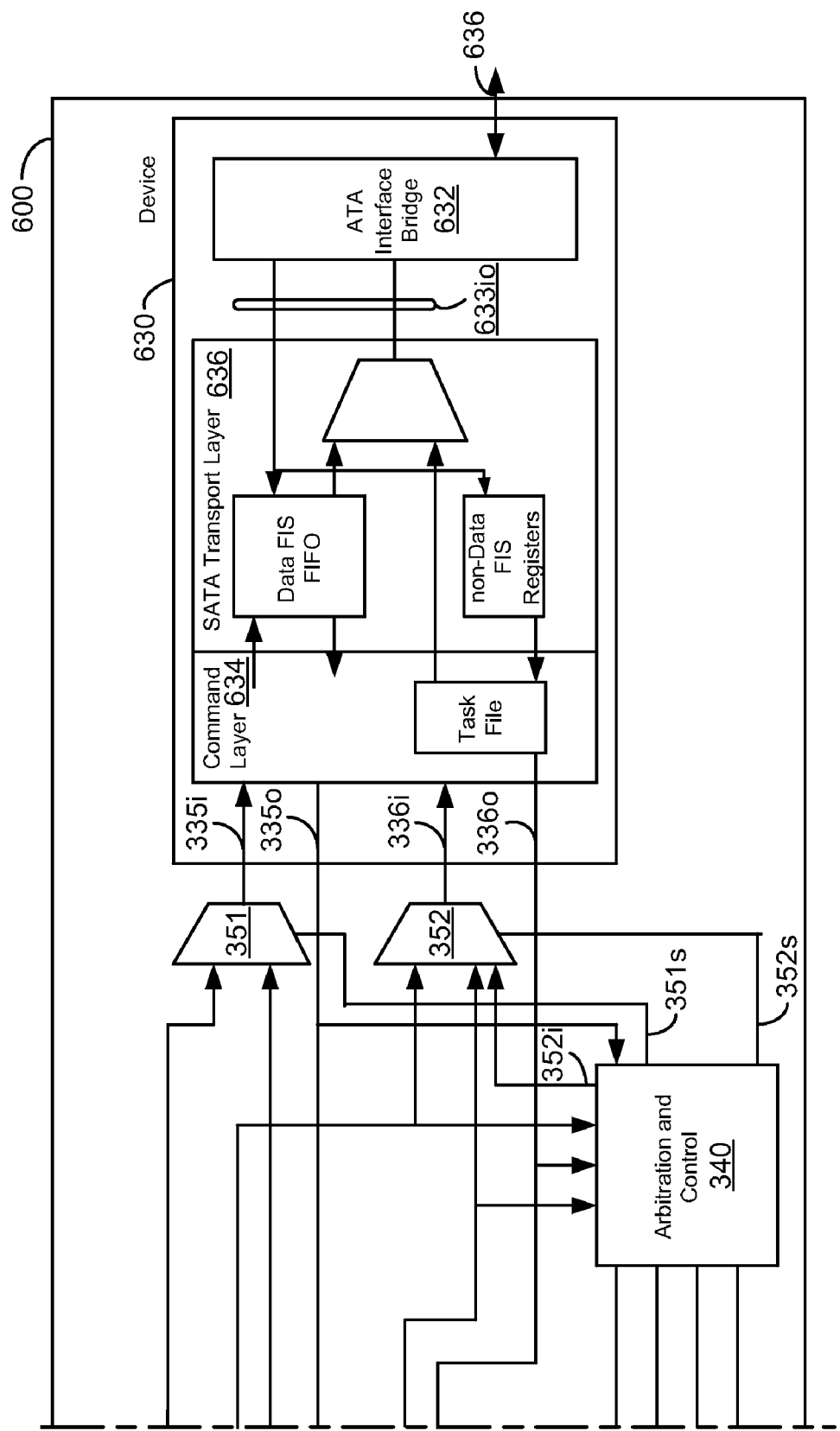
FIG.11a(ii)

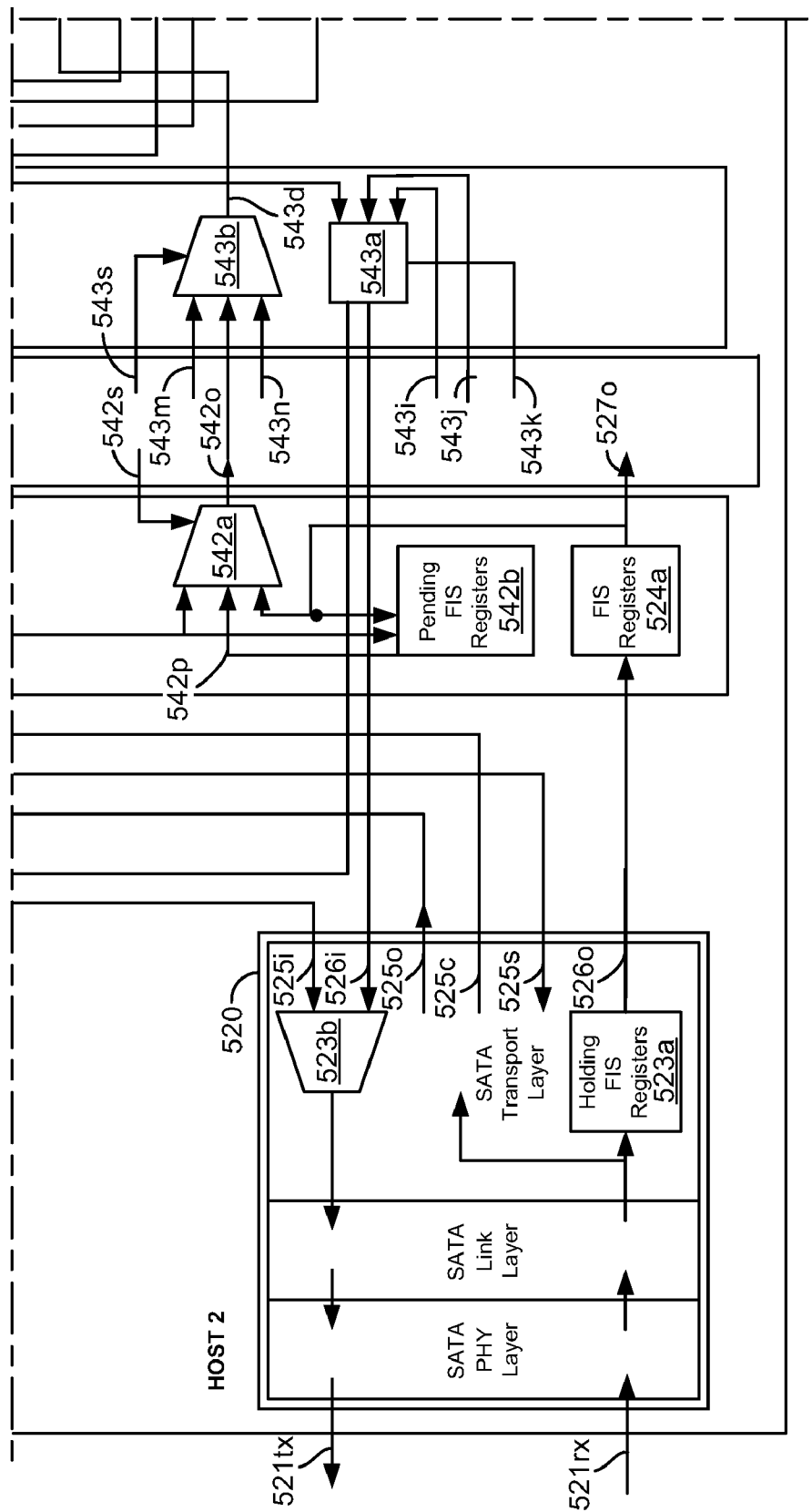
FIG.11b(ii)

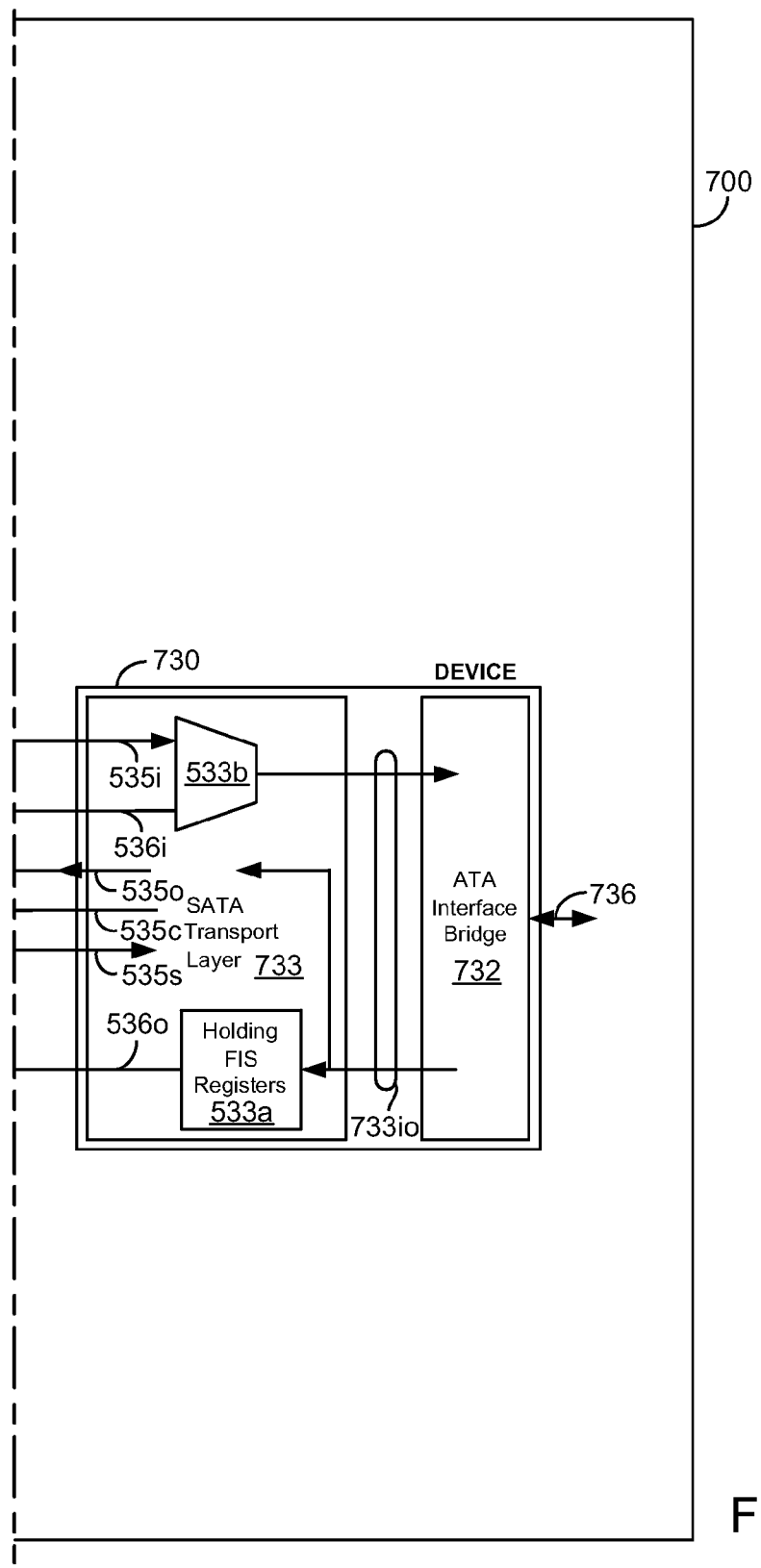
FIG.11b(iii)

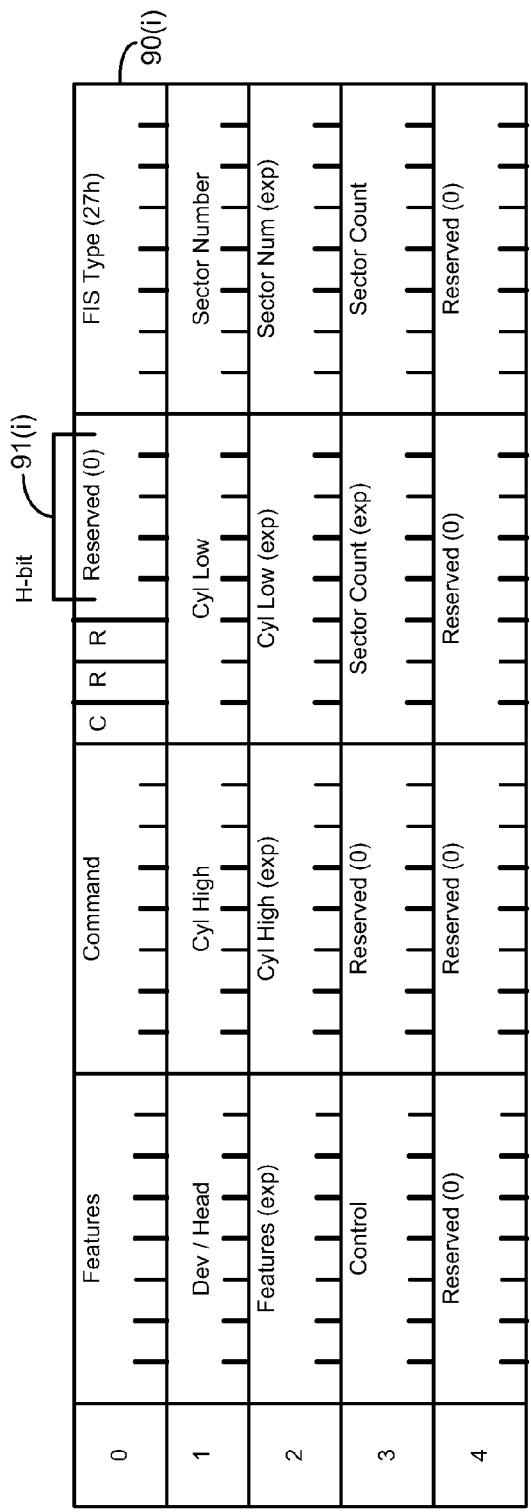
FIG. 12(i) Register FIS Host to Device
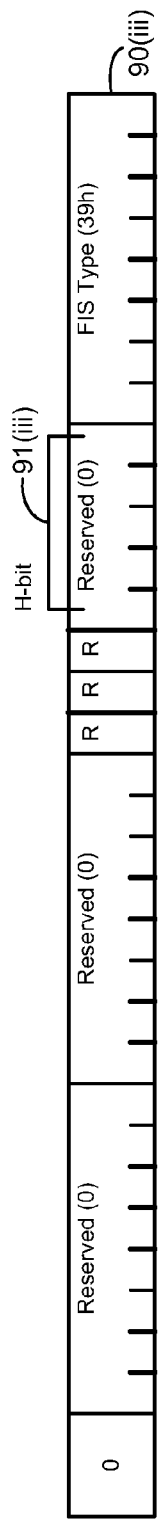
FIG. 12(iii) DMA Activate FIS, Device to Host

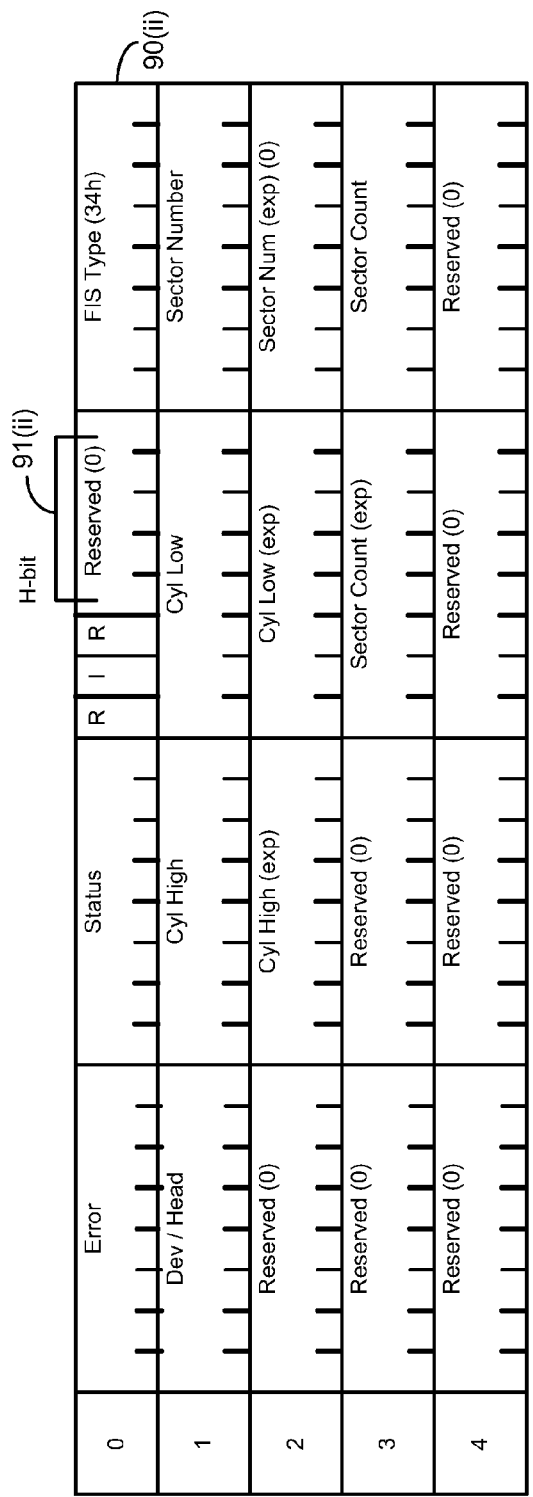
FIG. 12(ii) Register FIS Device to Host
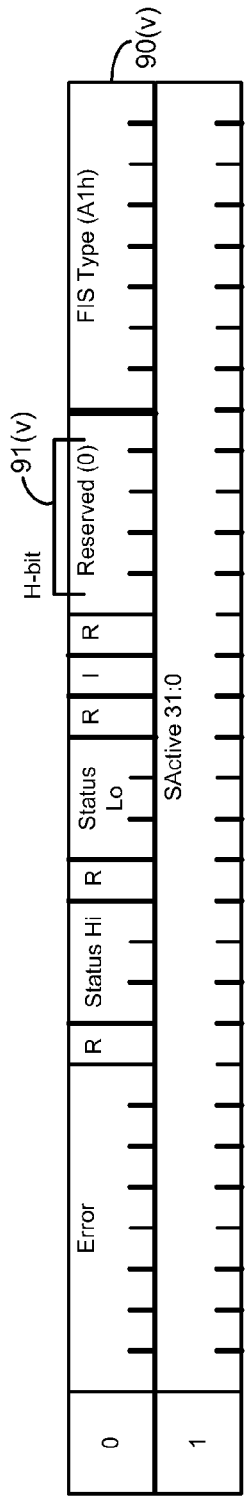
FIG. 12(v) Set Device Bits FIS

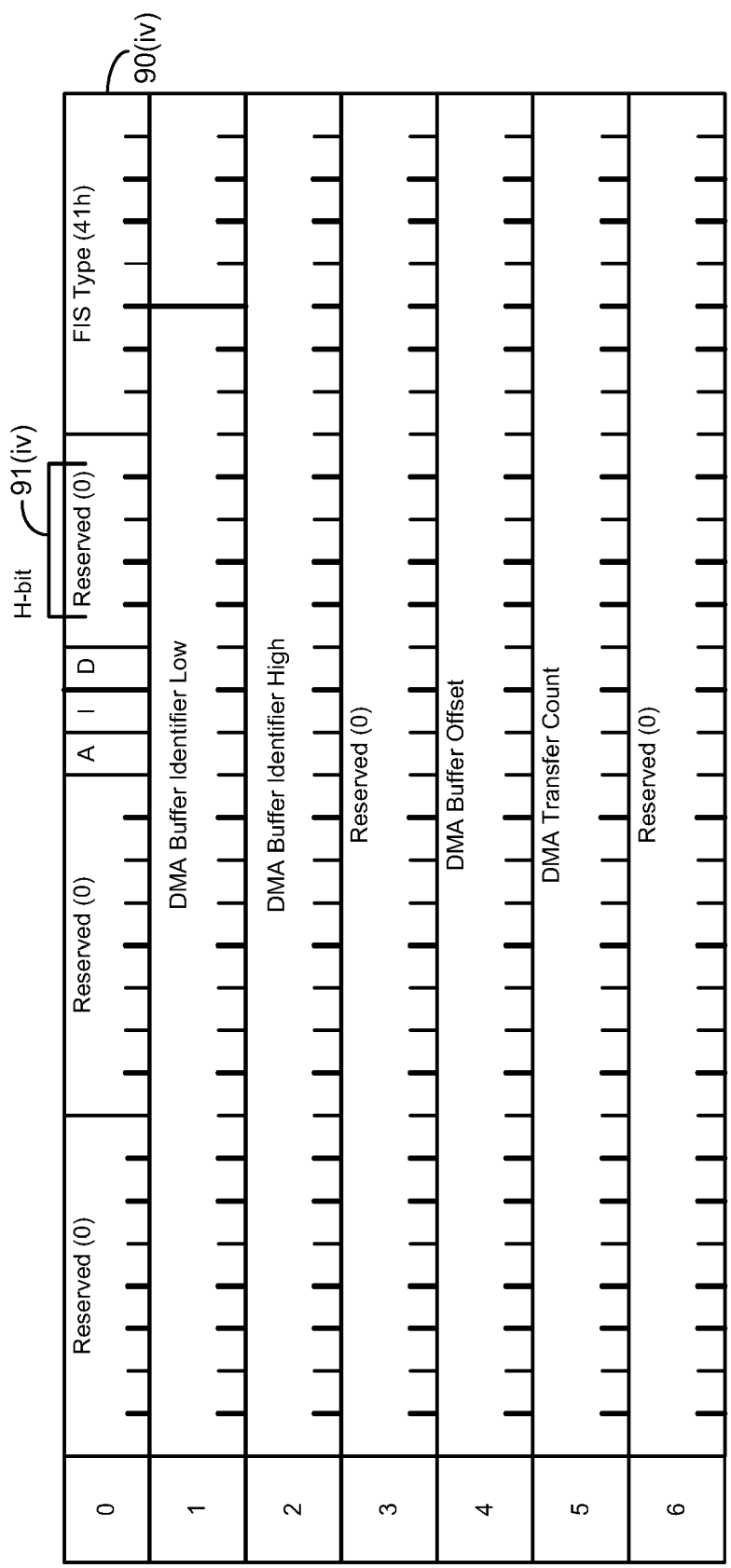
FIG. 12(iv) DMA Setup FIS

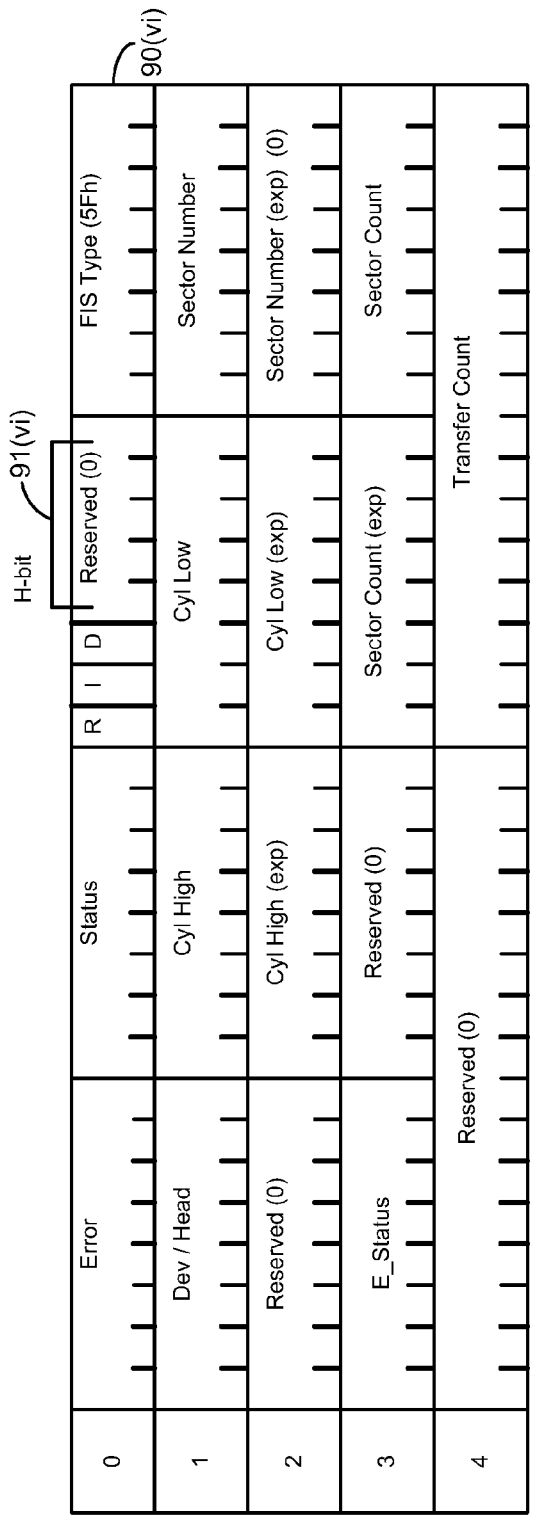
FIG. 12(vi) PIO Setup FIS
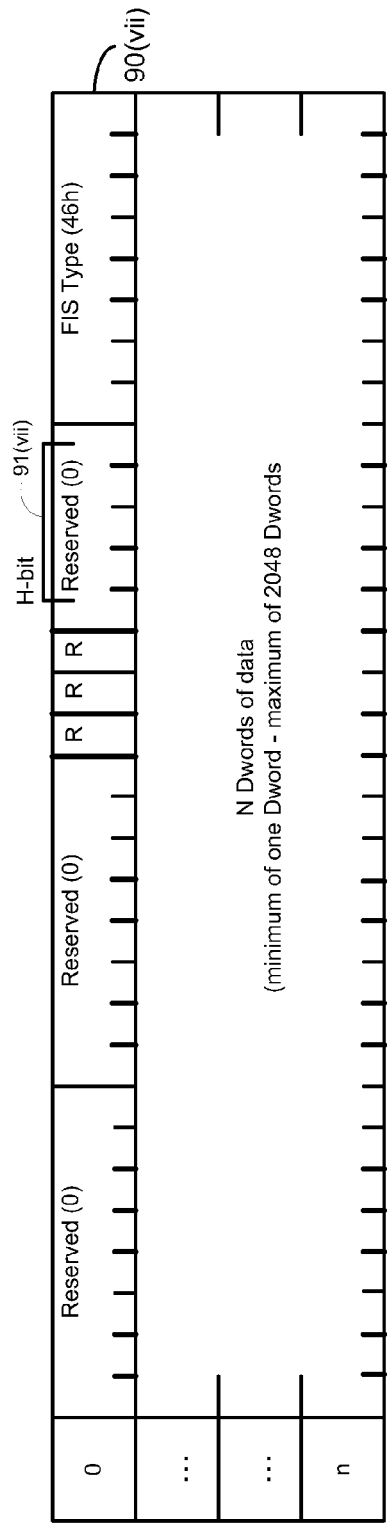
FIG. 12(vii) Data FIS

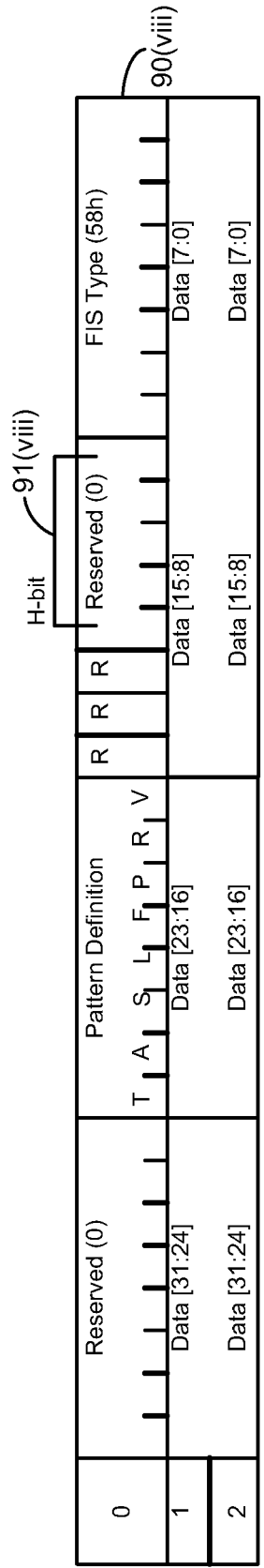
FIG. 12(viii)BIST Activate FIS

SWITCHING SERIAL ADVANCED TECHNOLOGY ATTACHMENT (SATA) TO A PARALLEL INTERFACE

CROSS REFERENCE TO RELATED APPLICATION

This application claims the benefit of U.S. provisional patent application, entitled "Serial ATA Switch", Application No. 60/477,857, filed on Jun. 11, 2003 and is a continuation-in-part of my U.S. patent application Ser. No. 10/775,488, filed on Feb. 9, 2004 and entitled "Serial Advanced Technology Attachment (SATA) Switch" and is a continuation-in-part of my U.S. patent application Ser. No. 10/755,553, filed on Feb. 9, 2004 and entitled "Route Aware Serial Advanced Technology Attachment (SATA) Switch".

FIELD OF THE INVENTION

The present invention generally relates to Serial Advanced Technology Attachment 1 ATA (SATA) switches, and in particular to switches having two host ports and one device port allowing for access by both host ports to the device port concurrently.

BACKGROUND OF THE INVENTION

Overview of SATA Protocol

A "device" as used herein refers to a peripheral adhering to any known standard adopted by the industry. SATA is a high-speed serial link replacement for the parallel Advanced Technology Attachment (ATA) attachment of mass storage devices. The serial link employed is a point-to-point high-speed differential link that utilizes gigabit technology and 8b/10b encoding known to those of ordinary skill in the art. The SATA protocol is based on a layered communication model similar to Open Systems Interconnection (OSI) Reference Model. An overview is presented below. For more detail, the reader is referred to the SATA standard incorporated herein by reference. The SATA specification is provided in the publication entitled "Serial ATA: High Speed Serialized ATA Attachment" Revisions 1.0, dated Aug. 29, 2001, and the publication entitled "Serial ATA II: Extensions to Serial ATA 1.0", Revision 1.0, dated Oct. 16, 2002, both of which are currently available at Serial ATA work group web site www.serialata.com.

In the SATA protocol, each layer of protocol communicates with its counterpart directly or indirectly. FIG. 1a shows the SATA protocol communication layers 20. The Physical (Phy) layer (PL) 21 manages the physical communication between the SATA units. The services of PL include:

serializing a parallel input from the link layer (LL) 22 and transmitting differential Non-Return to Zero (NRZ) serial stream.

receiving differential NRZ serial stream, extracting data (and optionally, the clock) from the serial bit stream, deserializing the serial stream, and providing a bit and a word aligned parallel output to the LL 22 performing the power-on sequencing, and performing speed negotiation, providing specified out of band (OOB) signal detection and generation The serial ATA link is defined by a protocol pursuant to a known standard, having four layers of communications, the physical layer for performing communication at a physical level, a link layer, a transport layer and an application layer or sometimes referred thereto as a command layer. A transmitter and a receiver, cannot directly communicate the latter with each other, rather, they must go through the other layers of their system prior to reaching a corresponding layer of the other. For example, for the physical layer of a transmitter to communicate with the transport layer of the receiver, it must first go through the link, transport and application layers of the transmitter and then through the serial ATA link to the application layer of the receiver and finally to the transport layer of the receiver.

The basic unit of communication or exchange is a frame. A frame comprises of a start of frame (SOF) primitive, a frame information structure (FIS), a Cyclic Redundancy Checksum (CRC) calculated over the contents of the FIS and an end of frame (EOF) primitive. The serial ATA organization has defined a specification in which the definition of a frame is provided and which is intended to be used throughout this document. Primitives are double word (Dword) entities that are used to control and provide status of the serial line. The serial ATA organization has defined a specification in which the definition of allowed Primitives is provided and which is intended to be used throughout this document FIG. 1b shows an example of a frame 30. The frame, in FIG. 1b, starts with an SOF primitive 30a, followed by a first FIS content 30b, followed by a HOLD primitive 30c indicating that the transmitter does not have data available, followed by a second FIS content 30d, followed by a HOLDA primitive 30e sent to acknowledge receipt of HOLD primitive, sent by the receiver, indicating that the receiver buffer is in a 'not ready' condition, followed by a CRC 30f and an EOF primitive 30g.

The frame, in FIG. 1b, includes two primitives a HOLD and a HOLDA primitive used for flow control. A HOLD primitive indicates inability to send or to receive FIS contents. A HOLDA primitive is sent to acknowledge receipt of a HOLD primitive. For example, when a receiving node detects that its buffer is almost full, it will send a HOLD primitive to a transmitting node, requesting the transmitter node to stop and when the buffer is ready to receive more data, the receiving node will stop sending a HOLD primitive. The transmitting node sends a HOLDA primitive to acknowledge receipt of the HOLD primitive. Until receipt of the HOLDA primitive, the receiving node continues receiving data. In order to prevent a buffer overrun, the SATA protocol requires a maximum delay of 20 Dwords between a node sending the HOLD primitive and receiving a HOLDA primitive.

There are a number of different frame types, as shown in FIG. 1d. For example, to send data via Direct Memory Access (DMA), a frame known as DMA setup FIS is utilized followed by a DMA data FIS. There are generally three types of FIS structures, one for commands, one for setting up a transfer and another for data relating to the transfer. Each frame structure is used for a different purpose. A command type of frame is sent to execute a command, a setup frame is used to prepare for the data transfer phase of the command and a data frame is used to transfer data. At the command layer, the system communicates with the command layer through the task file, mentioned hereinabove and shown in FIG. 1c. The command layer uses two distinct busses for communication, one is for transferring data FIS and the other is for transferring non-data FIS. Although 2 busses are discussed herein in a single bus may be employed.

The link layer (LL) 22 transmits and receives frames, transmits primitives based on control signals from the PL 21, and receives primitives from Phy layer (PL) 21 which are converted to control signals to the transport layer (TL) 23.

The transport layer (TL) 23 need not be cognizant of how frames are transmitted and received. The TL 23 simply constructs frame information structures (FIS's) for transmission and decomposes the received FIS's.

FIG. 1d shows the FIS types. The FIS types are summarized below:

Register FIS—host to device 40(i)
Register FIS—device to host 40(ii)
DMA Activate FIS 40(iii)
DMA Setup FIS 40(iv)
Set Device Bits FIS 40(v)
PIO Setup FIS 40(vi)
Data FIS 40(vii)
BIST Activate FIS 40(viii)

In the application layer of the serial ATA link, the host accesses a set of registers that are ATA registers, data port, error, features, sectors, cylinder low, cylinder high, status and command. Thus, the application layer communicates in the same language as the ATA standard, which is at the command layer. Thus, the command layer uses the same register set as the ATA link. The register set is known as task file registers.

The command layer (CL) or application layer (AL) 24 interacts with TL 23 for sending/receiving command, data, and status. The CL 24 includes register block register; also known as a task file (TF), used for delivering commands or posting status that is equivalent to that provided by a traditional parallel ATA.

FIG. 1c shows a simplified version of the Shadow Register Block organization 31 of parallel ATA. The Shadow Register Block comprises Data Port 31dp
Error Register 31e
Features Register 31f
Sector Count 31sc
Sector Number 31sn
Cylinder Low 31cl
Cylinder High 31ch
Device/Head 31dev
Status 31s
Command 31c
Alternate Status 31as
Device Control 31dc A SATA port, including part or all of the layer 1 functions, will be referred to herein as the SATA level 1 port. A SATA port, including part or all of the layers 1 and 2 functions, will be referred to herein as a SATA level 2 port. A SATA port, including part or all of the layers 1, 2, and 3 functions, will be referred to as a SATA level 3 port. A SATA port, including part or all of the layers 1, 2, 3 and 4 functions, will be referred to herein as a SATA level 4 port. The term SATA port refers to a generic port including level 1 or level 2 or level 3 or level 4. The SATA layers are for coupling to either the host or the device. The term SATA host port refers to a SATA port connected to a host. The term SATA device port refers to a SATA port connected to a device. For example, if the outbound high speed differential transmit signals 51tx and the inbound differential receive signals 51rx of FIG. 2a are connected to a host, the SATA port is a SATA host port. Similarly, if the outbound high speed differential transmit signals 51tx and the inbound differential receive signals 51rx of FIG. 2a are connected to a device, the SATA port is a SATA device port.

FIGS. 2a and 2b show block diagrams of a SATA port 50. The SATA port 50 includes a PL circuit 51, a LL circuit 52, a TL circuit 53 and a CL circuit 54. The PL circuit 51 is connected to outbound high speed differential transmit signals 51tx and inbound differential receive signals 51 rx, the PL circuit 51 is connected to the LL circuit 52 via a link transmit bus 52t, and a link receive bus 52r. The PL circuit 51 comprises an analog front end (AFE) 51a, a phy initialization state machine (Phy ISM) 51b, an out-of-band (OOB) detector 51c, a Phy/Link Interface 51e. The Phy/Link interface block optionally includes an elastic first-in-first-out (FIFO) 51ef and a transmit FIFO 51tf. The Phy/Link Interface 51e provides the coupling of the PL circuit 51 to the LL circuit 52 via the link transmit bus 52t, and the link receive bus 52r. A multiplexer 51d, controlled by the Phy ISM 51b, selects the link transmit data 51t or the initialization sequence 51s from the Phy ISM 51b. The AFE 51a includes the Phy receiver and Phy transmitter. The AFE 51a couples differential transmit signals 51tx and differential receive signals 51rx to the receive data 51r and to the transmit data 51td. The Phy transmitter is enabled by the Phy Transmitter Enable (PhyTxEn) signal 51te. When the Phy transmitter is disabled, the Phy output is in the idle bus state (Tx differential signal diminishes to zero). The OOB detector 51c detects out of band (OOB) signals 51o. The OOB signals 51o comprise COMRESET, COMWAKE.

The LL circuit 52 is connected to the PL circuit 51 via the link transmit bus 52t and the link receive bus 52r. The LL circuit 52 is connected to the TL circuit 53 via a transport transmit bus 53t, a transport receive bus 53r and a transport control/status bus 53c. The TL circuit 53 comprises a data FIS First-In-First-Out (FIFO) circuit 53a for holding the data FIS during transit, a block of non-Data FIS Registers 53b for holding non-Data FIS, and a multiplexer 53d. The data FIS FIFO 53a is a dual port FIFO, each port having separate input and output. The FIFO 53a comprises a first FIFO port 53a(1) and a second port 53a(2), the first port further including a first input port 53a(i1) and a first FIFO output port 53a(o1), the second port further including a second FIFO input port 53a(i2), and a second output port 53a(o2).

The first FIFO port 53a(1) is coupled to the LL circuit 52 via the said transport transmit bus 53t, the transport receive bus 53r and the transport control/status bus 53c. The second FIFO port 53a(2) is coupled to the CL circuit 54 via the data FIS receive bus 54r and the data FIS transmit bus 54t. The TL circuit 53 is coupled to the CL circuit 54 via a task file input bus 54i and a task file output bus 54o. The multiplexer 53d selects between the first FIFO output port 53a(o1) and the task file input bus 54i. The CL circuit 54 comprises a Task File 54a. The Task file 54a is coupled to the TL circuit 53 via the task file input bus 54i and the task file output bus 54o. The Task file 54a is coupled to the system bus 57 via the port task file input bus 56i and port task file output bus 56o, the CL circuit 54 additionally couples the Data FIS receive bus 54r and the Data FIS transmit bus 54t to system bus 57 via a data input bus 55i and the data output bus 55o. A configuration signal configures the operation of the SATA port for host or device operation The CL circuit 54 may be coupled to the system bus 57 via a single bus for data port and task file access.

The SATA switches of prior art allow two different hosts to connect to the same device, however, when one host is connected to the device, the other host can not access the device. Such limitations of prior art systems will be further explained. The SATA switches of prior art do not allow two hosts to access the device concurrently.

FIG. 3a shows a system 10 using a prior art SATA switch 14. The system 10 is shown to include a host 11 coupled to a SATA Host Bus Adaptor (SATA HBA) 11a, the SATA HBA 11a is shown to be coupled to a host port 14a of the SATA switch 14 via a SATA link 11b and a host 12, which is shown coupled to a SATA HBA 12a, which is shown coupled to a host port 14b of the SATA switch 14 via a SATA link 12b. The device port 14c of the SATA switch 14 is shown coupled to a storage unit 16, such as a hard disk drive (HDD) or a Tape Drive or Optical Drive via a SATA link 16a. The storage unit 16 is an example of a device.

A select signal 15 selects either the host port 14a or the host port 14b of the SATA switch 14. The port that is coupled to the currently-selected host on the SATA switch is considered an active port whereas the port that is not coupled to the currently-selected host is considered the inactive port. An active host as used herein indicates a host that is currently being selected.

Two methods are used to select the active port, side-band port selection and protocol-based port selection. In the side-band port selection method, the SATA switch 14 operatively couples either the host 11 or the host 12 to the device 16 based on the state of the select signal 15. The mechanism for generating the select signal 15 is system dependent. The protocol-based port selection uses SATA protocol on the inactive host port to cause a switch to activate. The protocol-based port selection uses a sequence of SATA OOB signals to select the active port. The aforementioned methods only allow access to a storage unit by a single host at any given time. This type of SATA switch is referred to as a simple failover switch.

FIG. 3b shows a system application of the SATA to ATA switch 64. The SATA to ATA Switch 64 comprises of a SATA port 64a coupled to a host 11, a SATA port 64b coupled to a host 12 and an ATA port 64c coupled to a storage unit 66. In system 60, the storage unit 66 has an ATA link and the ATA port 64c is coupled to a storage unit 66 via an ATA link 66a.

The use of the simple failover switch is in applications where in the event of failure of the primary host, the system switches to a standby secondary host, hence the name simple failover switch. In these types of systems, the operation of the system is interrupted and a "glitch" occurs. Obviously, mission-critical systems that cannot afford a failure, require uninterrupted system operation when a failure occurs. Mission-critical systems thus require concurrent access by both hosts to the storage unit, therefore, a mission critical system can not use a simple failover switch and instead uses dual-ported storage units, wherein the storage unit can be accessed concurrently from both ports. Fiber channel (FC) hard disk drives (HDDs) are typically dual-ported and are generally used in mission critical systems. FC HDDs are typically an order of magnitude more expensive than SATA HDDs. There is an economic need, however, to use the less expensive ATA or SATA HDDs in the storage units for mission-critical systems. However, ATA or SATA HDDs are single-ported and a simple failover switch does not allow concurrent access to the storage unit by multiple hosts.

Therefore, there is a need for electronic switches allowing access by host to devices, such as storage units wherein concurrent access is allowed from two or more host ports to a single-ported storage unit connected to the device port of a switch via a SATA link or an ATA link.

The SATA switch will cause additional delays in the signal path that may cause failure to meet the timing requirement of the SATA protocol timing requirement for signal path. There is a need for a SATA switch wherein, with the additional delay of the switch, the timing requirements of the SATA protocol are met. "Host", as used herein below, refers to either the host 11 or 12 of FIGS. 3a and 3b, depending on the context of the discussion. Similarly "device" as used herein below, refers to device 16 of FIGS. 3a, and 3b.

Prior Art SATA Switch

Simple failover switches of prior art systems perform switching within layer 1. FIG. 4 shows a block diagram of a prior art simple failover switch (SFX) 100, switching within the layer 1. The switch 100 is shown to include a PL circuit 111, a PL circuit 121, a PL circuit 131, an active host selection circuit 141, a multiplexer 142, and a switch initialization circuit 144. The PL circuits 111, 121, and 131 are modified versions of the PL circuit 51 (shown in FIG. 2b) providing the OOB signals and control signals 111i, 121i and 131i, the latter of which provide some of the control signals for PL circuits 111, 121, and 131, respectively. The PL circuit 111 is configured for connection to the host and is connected to the outbound high speed differential transmit signals 111tx and the inbound differential receive signals 111rx. The link receive bus 112r of the PL circuit 111 is connected to the multiplexer 142.

The link transmit bus 112t of the PL circuit 111 is connected to the link receive bus 132r of the PL circuit 131 and the OOB signals 111o of the PL circuit 111 is connected to the switch initialization circuit 144 and the active host selection circuit 141, the Phy ISM control signals 111i of PL Circuit 111 is connected to switch initialization circuit 144. The PhyTxEn 111en signal of PL circuit 111 is connected to active host selection circuit 141. The PL circuit 121 is configured for connection to a host and is connected to outbound high speed differential transmit signals 121tx and inbound differential receive signals 121rx, the link receive bus 122r of the PL 121 is connected to multiplexer 142, the link transmit bus 122t of PL circuit 121 is connected to the link receive bus 132r of the PL circuit 131, the OOB signals 121o of PL circuit 121 is connected to switch initialization circuit 144 and the active host selection circuit 141. The Phy ISM control signals 121i of the PL circuit 121 is connected to the switch initialization circuit 144. The PhyTxEn signal 121en of PL circuit 121 is connected to an active host selection circuit 141. The PL circuit 131 is configured for connection to a device and is connected to the outbound high speed differential transmit signals 131tx and the inbound differential receive signals 131rx, the link receive bus 132r of the PL circuit 131 is connected to the link transmit bus 112t of the PL circuit 111 and the link transmit bus 122t of the PL circuit 121. The link transmit bus 132t of the PL circuit 131 is connected to the output of multiplexer 142, the OOB signals 131o of PL 131 is connected to switch initialization circuit 144, the Phy ISM control signals 131i of the PL circuit 131 is connected to the switch initialization circuit 144. The PhyTxEn signal 131en of the PL circuit 131 is connected to the active host selection circuit 141 or alternatively is set to a level to enable the transmitter of the PL circuit 131 transmitter (not shown in FIG. 4).

The active host selection circuit 141 includes the SFX port selection detection circuit 141a and the SFX port selection detection circuit 141b. The SFX port selection detection circuit 141a monitors COMRESET for the occurrence of the port selection sequence and when the port selection sequence is detected, the circuit 141a generates an indication signal. The SATA protocol defines port selection sequence as a series of COMRESET signals with a specified timing requirement from assertion of one COMRESET signal to the assertion of the next.

There is no active host port selected upon power-up. The first COMRESET or COMWAKE received from a host port selects the host port from which it was received as the active host. Reception of the protocol-based port selection signal on the inactive host port causes the active host selection circuit 141 to deselect the currently active host port first and then to select the host port over which the selection signal is received. The inactive host is placed into quiescent power state by setting the PhyTxEn signal of the inactive port to a predefined level.

The active host selection circuit 141 generates a multiplexer select signal 141s for selecting one of two input signals to be directed to the output of the multiplexer 142, as its output. The active host selection circuit 141 also generates a first host active signal 141h1 that when is at a 'high' or logical one state, indicates that the host, which is connected to the PL circuit 111, is the active host. The active host selection circuit 141 also generates a host active signal 141h2 that when is at a 'high' or logical one level indicates the host which, is connected to PL circuit 121, is the active host.

The switch initialization circuit 144 receives the OOB signals 111o from the PL circuit 111, the OOB signals 121o from the PL circuit 121, and the OOB signals 131o from the PL circuit 131. The switch initialization circuit 141 generates the Phy ISM control signals 111i for the PL circuit 111, the Phy ISM control signals 121i for PL the circuit 121, and the Phy ISM control signal 131i to perform the following functions:

Relay (receive and then transmit) COMRESET from active host port to device port.
Relay COMINIT from device port to active host port
Relay COMWAKE from device port to active host port.
Relay COMWAKE from device port to active host port
Relay ALIGN primitive detection from device port to active host port
Relay host ALIGN primitive detection from active host port to device port.
Relay device port PHY_RDY to active host port.
Relay SYNC primitive from device port to active host port By way of clarification, an example of a device port is the circuit 131 when the signals 131rx and 131tx are connected to a device. Similarly, an example of a host port is the circuit 111 when the signals 111 tx and 111rx are connected to a host. Clearly, another example of a host port is the circuit 121 when the signals 121tx and 121rx are connected to a host.

One of the problems of prior art systems, such as the one shown herein, is that the switch 100 causes a delay in the signal path between active host port and device port such that the timing requirements of the SATA protocol are not met. In particular, pursuant to the SATA protocol standard, the HOLD/HOLD-ACKNOWLEDGE (HOLD/HOLDA) handshake, used for flow control, specifies a maximum delay of 20 DWORDS. The addition of the switch 100 in the signal path between an active host port and a device port causes failure to meet the maximum delay of 20 DWORDS timing requirement.

Thus, the switch 100 causes additional delays in the signal path that may cause the timing of signal path not to meet the SATA protocol timing requirement, in particular, the HOLD/HOLDA handshake delay should not exceed 20 DWORDS.

There is a need for a switch coupled between a plurality of host units and a device for arbitrating communication there between, the switch having associated therewith a delay of time, wherein despite the delay of the switch, the timing requirements of the SATA protocol are met.

The SATA switch 100 does not allow the inactive host to access the device. There is a need for electronic switches allowing concurrent access from two host ports to a single-ported storage unit connected to the device port of a switch via a SATA link or an ATA link.

SUMMARY OF THE INVENTION

Briefly, an embodiment of the present invention includes a switch including a first serial ATA port coupled to a first host unit, the first port includes a first host task file. The switch further includes a second serial ATA port coupled to a second host unit, the second port includes a second host task file. The switch further includes a third serial ATA port coupled to a storage unit, the third port includes a device task file. The switch additionally includes an arbiter for selecting one of a plurality of host units to be coupled to the storage unit through the switch when there is an indication of at least one pending command from one of the plurality of host units, wherein while one of the plurality of host units is coupled to the storage unit, another one of the plurality of host units sends ATA commands to the switch for execution by the storage unit.

IN THE DRAWINGS

FIG. 1d shows a prior art FIS structure of SATA protocol.

FIG. 2b shows a block diagram of a prior art SATA port including some circuits within each protocol layer.

FIG. 7b shows a block diagram of a Tag/Sactive Mapping Circuit 341 of FIG. 7a.

Figure 10A:
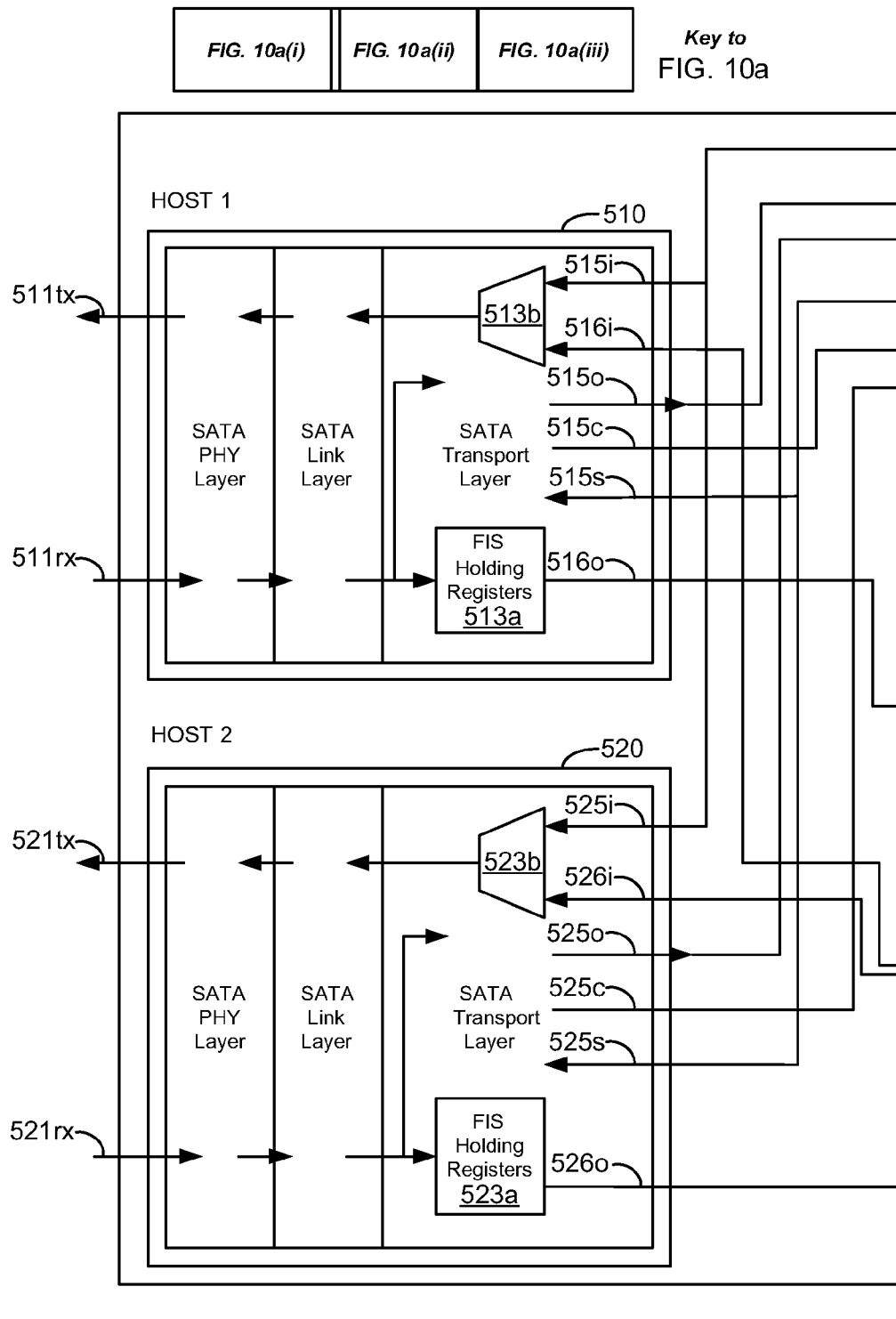
FIGS. 10a and 10b illustrates an active switch in accordance with an alternative embodiment of the present invention.
Figure 10B:
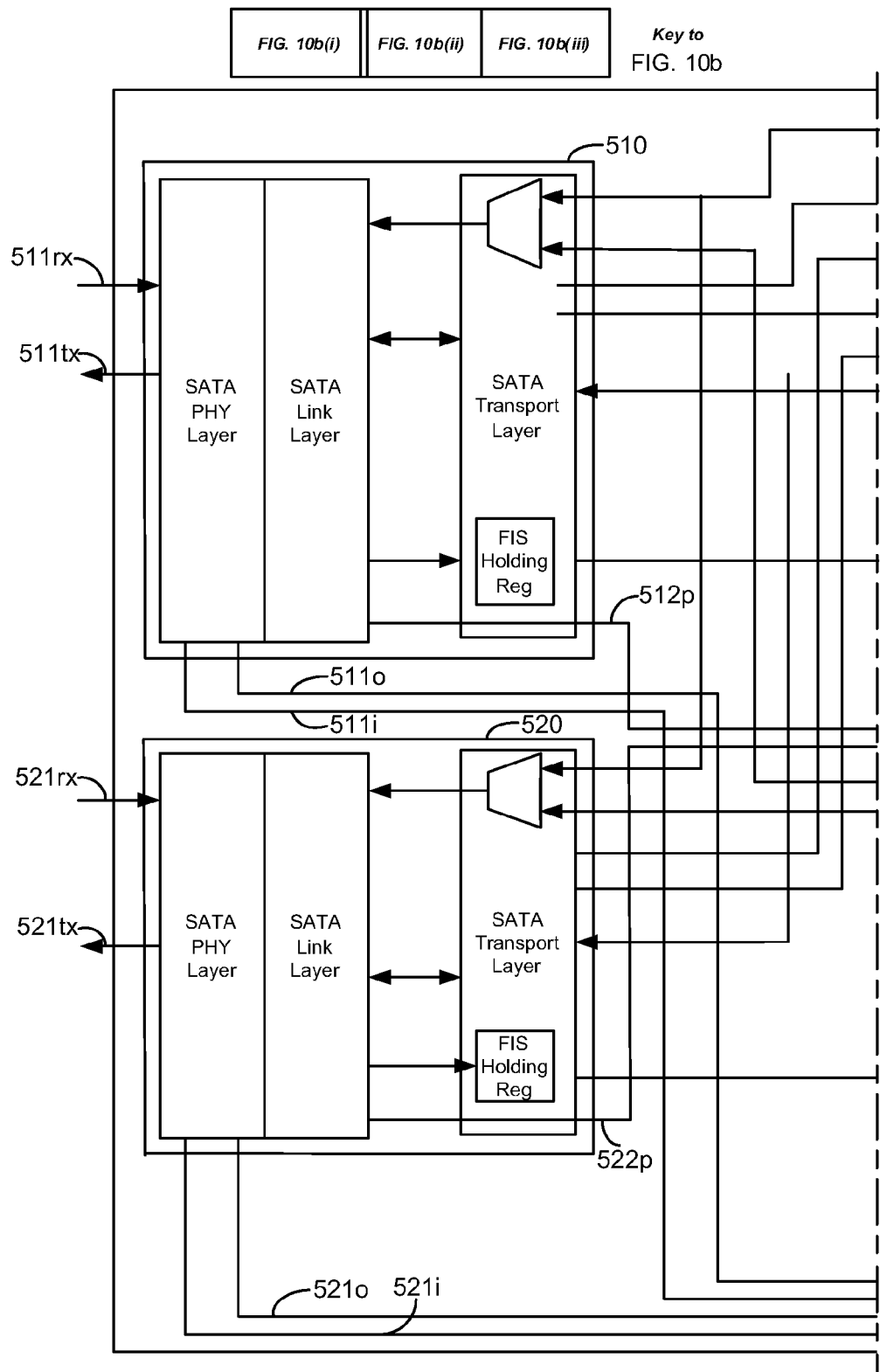
Figure 10C:
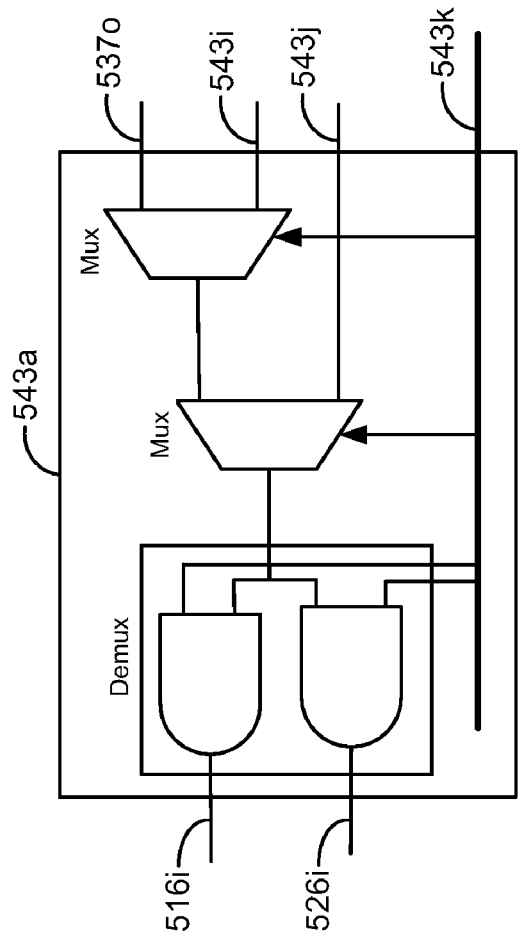
Figure 10C:
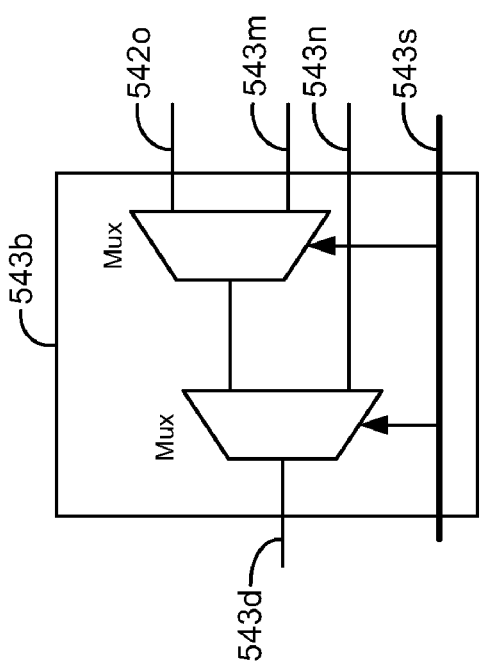

FIG. 10c illustrates embodiments of the mux-demux 543a and the multiplexer 543b of the switch of FIGS. 10a and 10b.

Figure 11A:
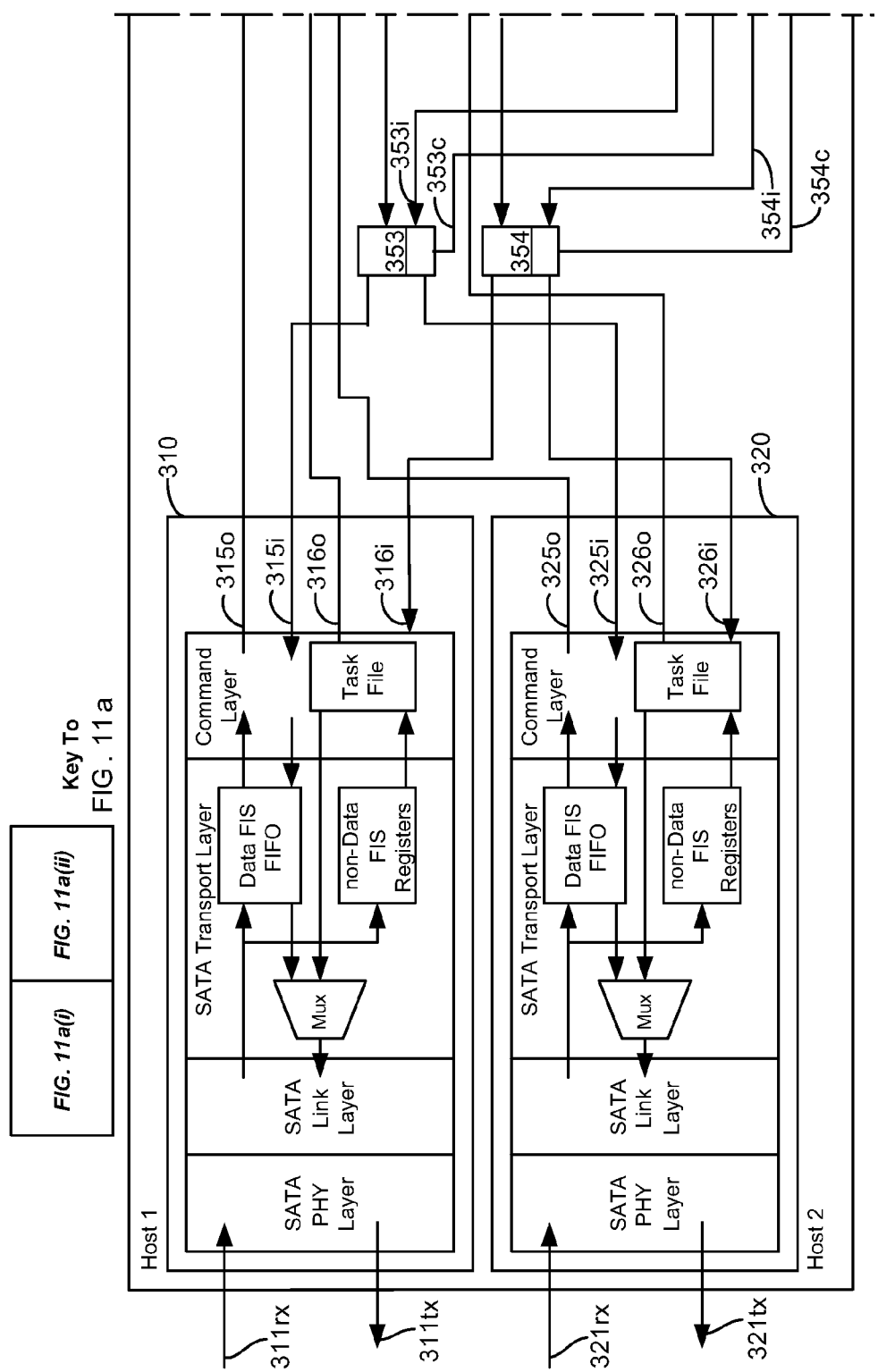
Figure 11B:
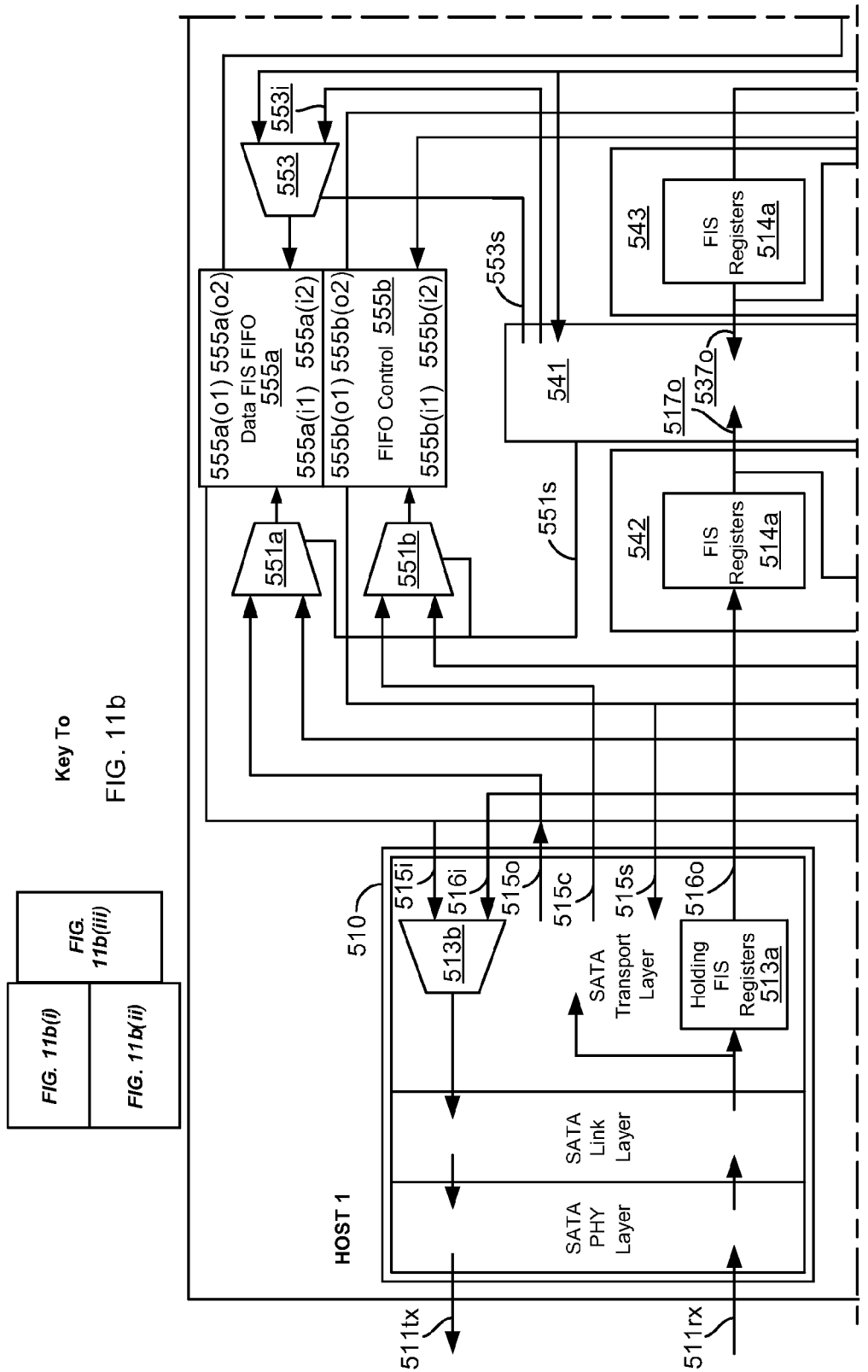

FIGS. 11a and 11b illustrate embodiments of an active SATA to ATA switch in accordance with an embodiment of the present invention.

FIG. 12 shows an embodiment of a route aware FIS structure used with yet another embodiment of the present switch.

DETAILED DESCRIPTION OF THE PREFERRED EMBODIMENTS

Figure 5B:
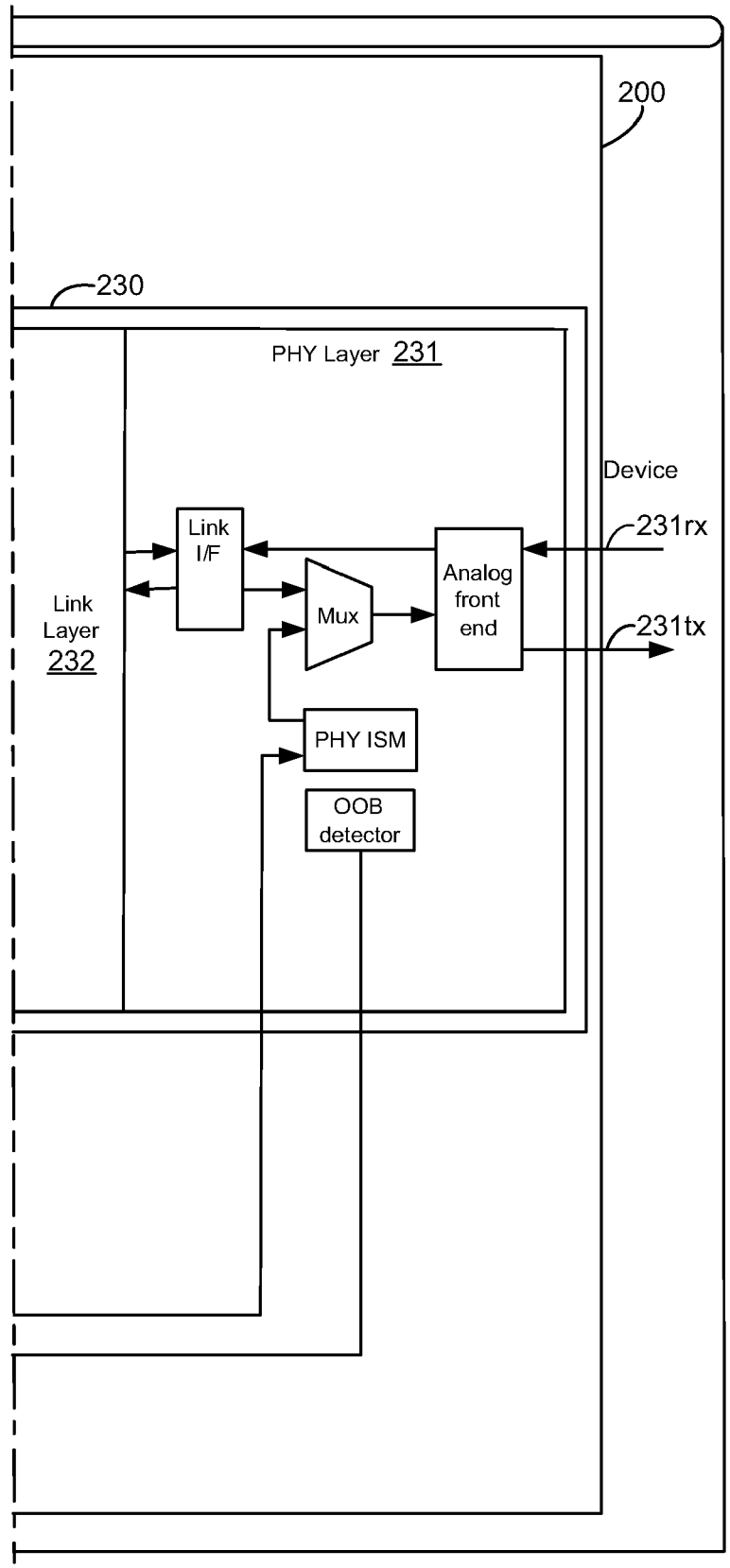
FIG. 5 illustrates a simple failover switch, switching at layer 2, in accordance with an embodiment of the present invention.
Figure 5C:
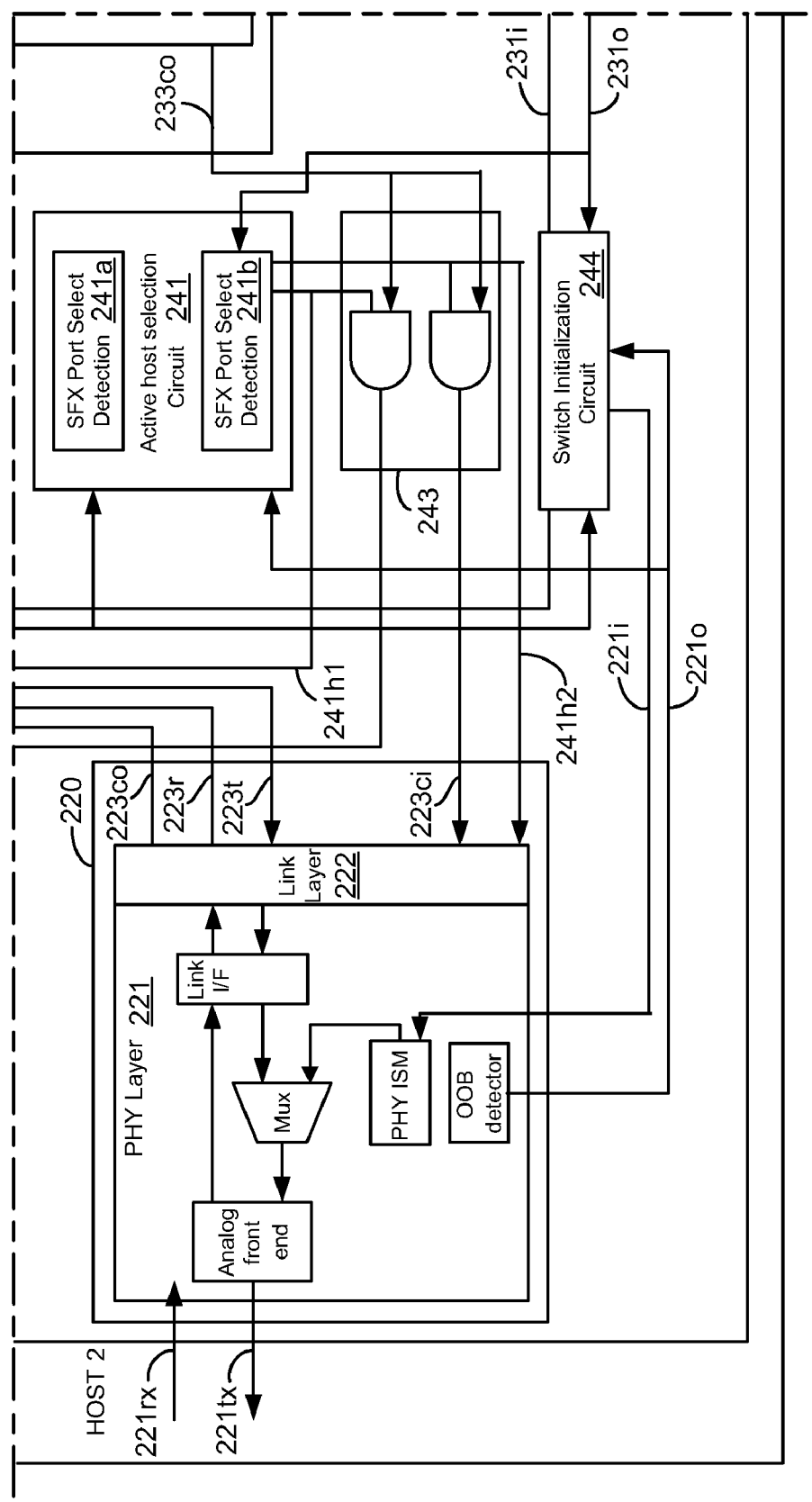

Referring now to FIG. 5, a method employed in one of the embodiments of the present invention uses a level 2 SATA port for host and device ports and a FIS FIFO between the host ports and device ports to avoid any data drop out. The level 2 SATA port responds immediately to HOLD/HOLDA rather than relaying the primitives and waiting for response from the other port. FIG. 5 shows a high-level block diagram of a switch 200, switching within layer 2 and in accordance with an embodiment of the present invention. The switch 200 is shown to comprise a SATA level 2 host port 210, a SATA level 2 host port 220, a SATA level 2 device port 230, a FIS payload FIFO 245, a multiplexer 242a, a multiplexer 242b, a demultiplexer 243, an active host selection circuit 241, and a switch initialization circuit 244.

The FIS FIFO 245 includes a dual ported FIFO comprising a FIS FIFO input port 245(i1), a FIS FIFO output port 245(o1), a FIS FIFO input port 245(i2) and a FIS FIFO output port 245(o2).

The SATA level 2 host port 210 comprises a PL circuit 211 and a LL circuit 212 and is connected to the outbound high speed differential transmit signals 211tx and to the inbound differential receive signals 211rx and includes a transport receive bus 213r, transport transmit bus 213t, a transport control/status bus 213co generated from the link layer 212 and a control/status bus 213ci being transmitted to the link layer 212. The transport receive bus 213r is connected to the multiplexer 242a. The control/status bus 213co is shown connected to the multiplexer 242b, the transport transmit bus 213t is shown connected to the FIS FIFO output port 245(o1), the OOB signals 211o are shown connected to the switch initialization circuit 244 and to the active host selection circuit 241. The switch initialization circuit 244 generates the Phy ISM control signals 211i.

The SATA level 2 host port 220 is shown to comprise a PL circuit 221, and a LL circuit 222, and is connected to the outbound high speed differential transmit signals 221tx and to the inbound differential receive signals 221rx. The port 220 is shown to include a transport receive bus 223r, a transport transmit bus 223t, a transport control/status bus 223co generated from the link layer 222, and a control/status bus 223ci being transmitted to the link layer 222. The transport receive bus 223r is connected to the multiplexer 242a, the control/status bus 223co is connected to the multiplexer 242b, the transport transmit bus 223t is connected to a FIS FIFO output port 245(o21), the OOB signals 221o is shown connected to the switch initialization circuit 244 and to the active host selection circuit 241. The switch initialization circuit 244 generates the Phy ISM control signals 221i.

The SATA level 2 device port 230 comprises a PL circuit 231 and a LL circuit 232 and is connected to the outbound high speed differential transmit signals 231tx and to the inbound differential receive signals 231rx. The port 230 is shown to include a transport receive bus 233r, a transport transmit bus 233t, a transport control/status bus 233co generated from the link layer 232 and a control/status bus 233ci coupled to the link layer 232. The transport receive bus 233r is connected to the FIS FIFO input port 245(i2), the control/status bus 233ci is connected to the multiplexer 242b output, the transport transmit bus 233t is connected the FIS FIFO output port 245(o2). The control/status bus 233co is provided as input to the demultiplexer 243, the OOB signals 231o is connected to the switch initialization circuit 244 and to the active host selection circuit 241. The switch initialization circuit 244 generates the Phy ISM control signals 231i.

Figure 4B:
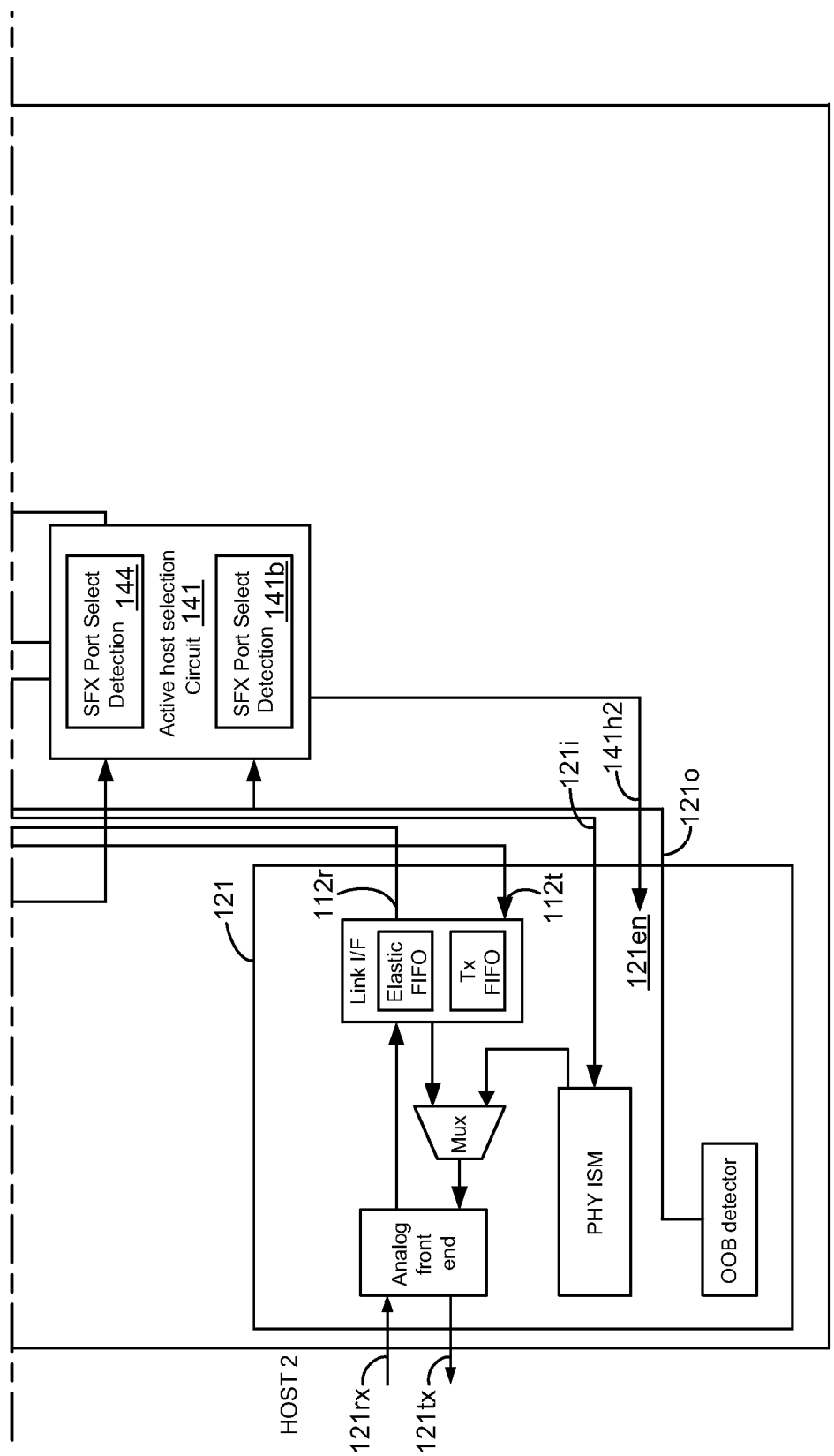
FIG. 4 shows an example of a prior art simple failover switch, switching at layer 1.

The active host selection circuit 241 is the same as the active host selection circuit 141 of FIG. 4. The SFX port selection detection circuits 241a and 241b of FIG. 5 are the same as the port selection detection circuits 141a and 141b, respectively. The active host selection circuit 241 generates a multiplexer select signal 241s that selects the input that is placed onto the output of the multiplexer 242a and the multiplexer 242b. The active host selection circuit 241 also generates a host active signal 241h1 that when active or at logical state 'one', indicates that the host port 210 is active. The host selection circuit 241 further generates a host active signal 242h2 that when active or at logical state 'one', indicates that the host port 220 is active. The host active signals 241h and 242h2 serve as input to the demultiplexer 243 and route the control/status bus 233co to the active host.

The switch initialization circuit 244 is the same as the switch initialization circuit 144 of FIG. 4. The function performed by the switch initialization circuit 244 can be distributed to the PL circuits 211, 221, and 231. Similarly, the SFX port selection detections circuits 241a and 241b can be distributed to the PL circuits 211 and 221, respectively. Alternative embodiments that distribute the functions of the switch initialization circuit 244 to the PL circuits 211, 221, and 231 or that distribute the functions of the SFX port selection detection circuits to the PL circuits 211, and 221 fall within the scope of present invention.

Although the layer 2 switch 200 of FIG. 5 eliminates the timing problems caused by the switch 100 delay, the switch 200 is not able to allow access by two hosts to a single port device via SATA links using standard FIS organization.

In order to allow access by two hosts to a single port device, a multiplexing method must be employed in accordance with an alternative embodiment of the present invention. A classical multiplexing method is time multiplexing. In time multiplexing, for alternating periods (of equal or different time), access is granted to one host or the other host. Such a classical time multiplexing method can not be employed with storage units since interruption of a command in progress results in performance degradation or loss of data.

A multiplexing method, as used in the present invention, is referred to as command based multiplexing. In command based multiplexing, the switch keeps track of idle condition (no command in progress), commands in progress, command completion, and pending commands (commands received and saved but not sent to a device because a command is in progress and device is busy) with this information the switch can implement an algorithm for providing access to the device by both hosts.

Command based multiplexing requires processing at layer 4. In contrast to SATA switches of prior art that perform switching at layer 1, the SATA switch of the present invention, employing command based multiplexing, perform switching at layer 4 ("layer 4 switching"). In the SATA switch of the present invention, an arbitration algorithm based on rotating priority is used to select the host that can send a command to the device. When there are pending commands from both hosts, the host with the highest priority will get to send its command to the device.

In operation upon power up initialization, priority is arbitrarily given to one of the hosts 11 or 12. The SATA switch of the various embodiments of the present invention keeps track of the priority and performs arbitration to select the host that can send commands to the device. When the device enters a state for accepting another command, the switch of the various embodiments of the present invention changes priority to the other host.

Figure 6A:
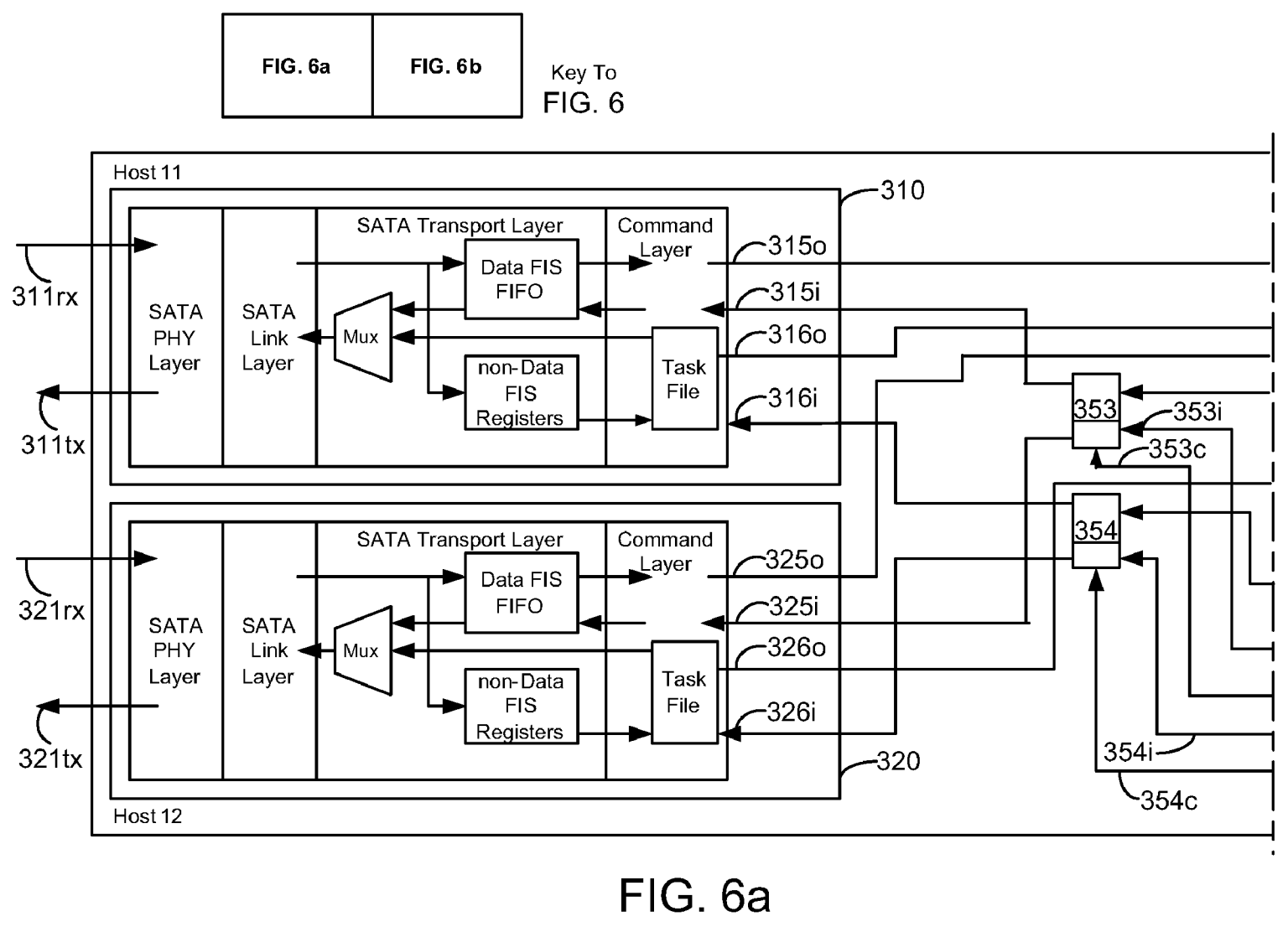
Figure 6B:
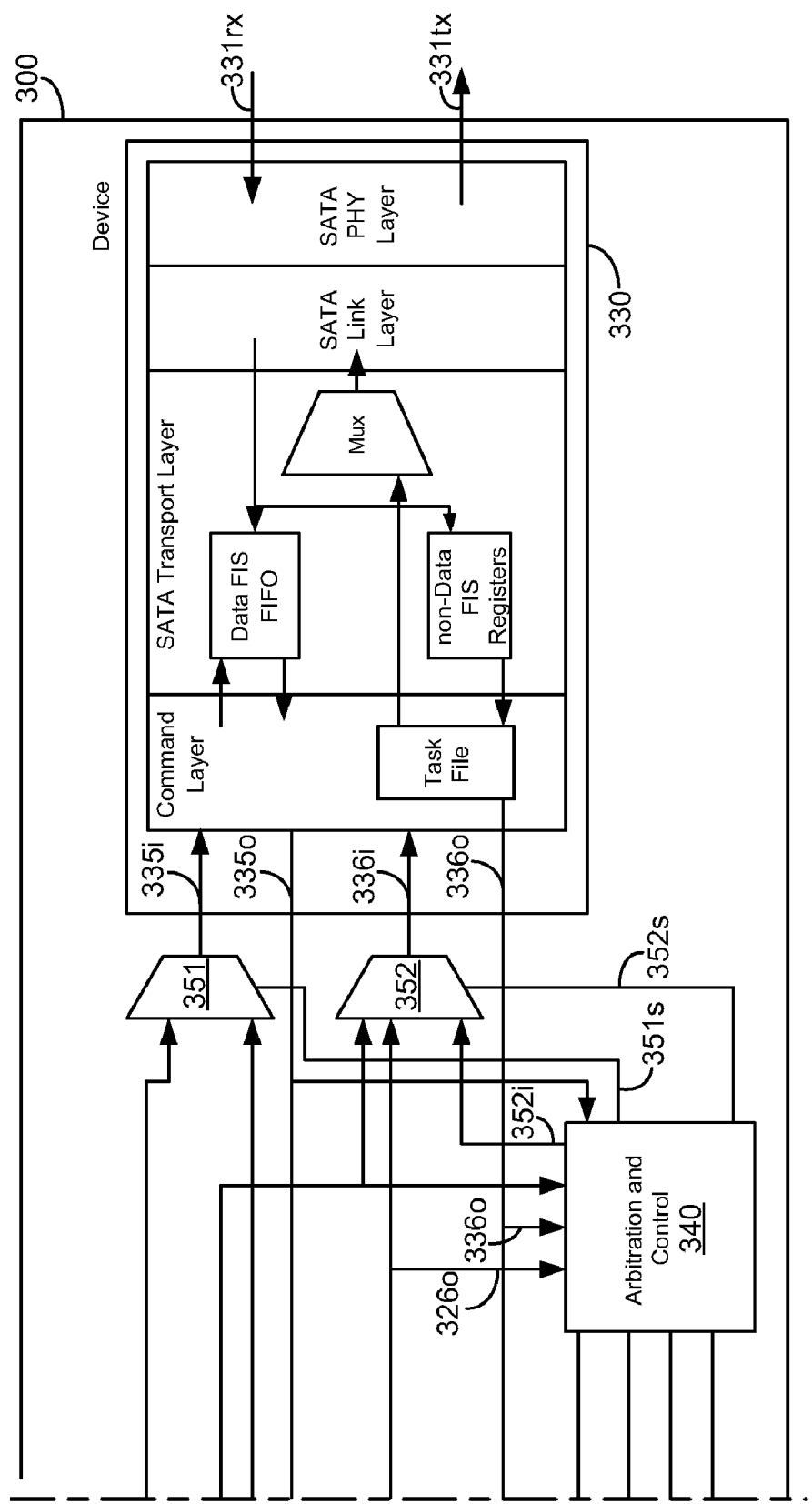
FIG. 6 shows a block diagram of a switch in accordance with an embodiment of the present invention

FIG. 6 shows a block diagram of the active switch 300 in accordance with an alternative embodiment of the present invention. The switch 300 is shown to include a SATA level 4 host port 310, a SATA level 4 host port 320, a SATA level 4 device port 330, an arbitration and control circuit 340, a multiplexer 351, a multiplexer 352, a mux-demux 353 and a mux-demux 354. The SATA level 4 host port 310 is shown connected to the outbound high speed differential transmit signals 311$tx$ and the inbound differential receive signals 311 rx and includes a host 11 command layer input bus 315$i$, a host 11 command layer output bus 315$o$, a host 11 task file input bus 316$i$, and a host 11 task file output bus 316$o$. The SATA level 4 host port 320 is shown connected to the outbound high speed differential transmit signals 321$tx$ and the inbound differential receives signals 321$rx$ and includes a host 12 command layer input bus 325$i$, a host 12 command layer output bus 325$o$, a host 12 task file input bus 326$i$ and a host 12 task file output bus 326$o$. The SATA level 4 device port 330 is shown connected to the outbound high speed differential transmit signals 331$tx$ and to the inbound differential receive signals 331$rx$ and includes a device command layer input bus 335$i$, a device command layer output bus 335$o$, a device task file input bus 336$i$ and a device task file output bus 336$o$.

The host 11 command layer output bus 315$o$ is shown connected to a first input of multiplexer 351. The host 12 command layer output bus 325$o$ is shown connected to a second input of the multiplexer 351 and the multiplexer 351 output is shown connected to the device command layer input bus 335$i$. The host 11 task file output bus 316$o$ is shown connected to an input of multiplexer 352 and the host 12 task file output bus 326$o$ is shown connected to an input of multiplexer 352. The arbitration and control circuit 340 generates the device control task file output bus 352$i$, which in turn is connected to one of the inputs of the multiplexer 352, as shown in FIG. 5, and also generates a control signal 352$s$, which is the control signal for the multiplexer 352. The multiplexer 352 output is shown connected to device task file input bus 336$i$. The function of the bus 352$i$ is to replace the data from the host in certain cases, which will be described herein below.

The device command layer output bus 335$o$ is shown connected to an input of a mux-demux 353. The device task file output bus 336$o$ is shown connected to an input of the mux-demux 354. The arbitration and control circuit 340 receives a host 11 task file output bus 316$o$, a host 12 task file output bus 326$o$ and a device task file output bus 336$o$. The arbitration and control circuit 340 generates a select signal 351$s$ that controls the operation of the multiplexer 351. The arbitration and control circuit 340 generates a control command layer output bus 353$i$ that is connected to an input of the mux-demux 353. The circuit 340 also generates a control signal 353$c$, which is the control signal for the mux-demux 353. The function of the bus 353$i$ is to replace the data from the device in certain cases, which will be described herein below.

The arbitration and control circuit 340 generates a control task file output bus 354$i$ that is connected to one of the inputs of the mux-demux 354 and, as shown, the control signal 354$c$ controls the operation of the mux-demux 354. The function of the bus 354$i$ is to replace the device task file output bus 336$o$ in certain cases, which are discussed herein below.

Figure 7A:
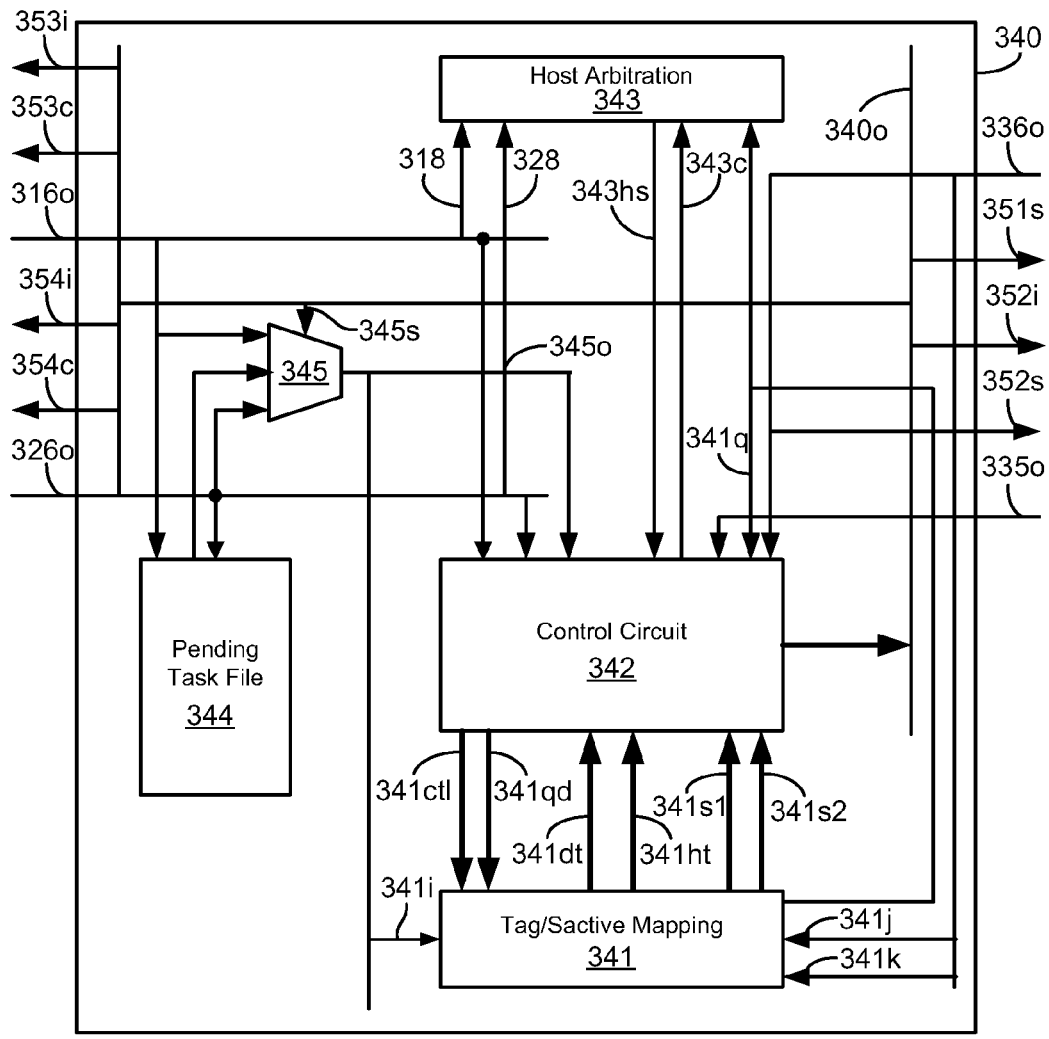
FIG. 7a shows a block diagram of an arbitration and control circuit of the switch of FIG. 6.
Figure 7B:
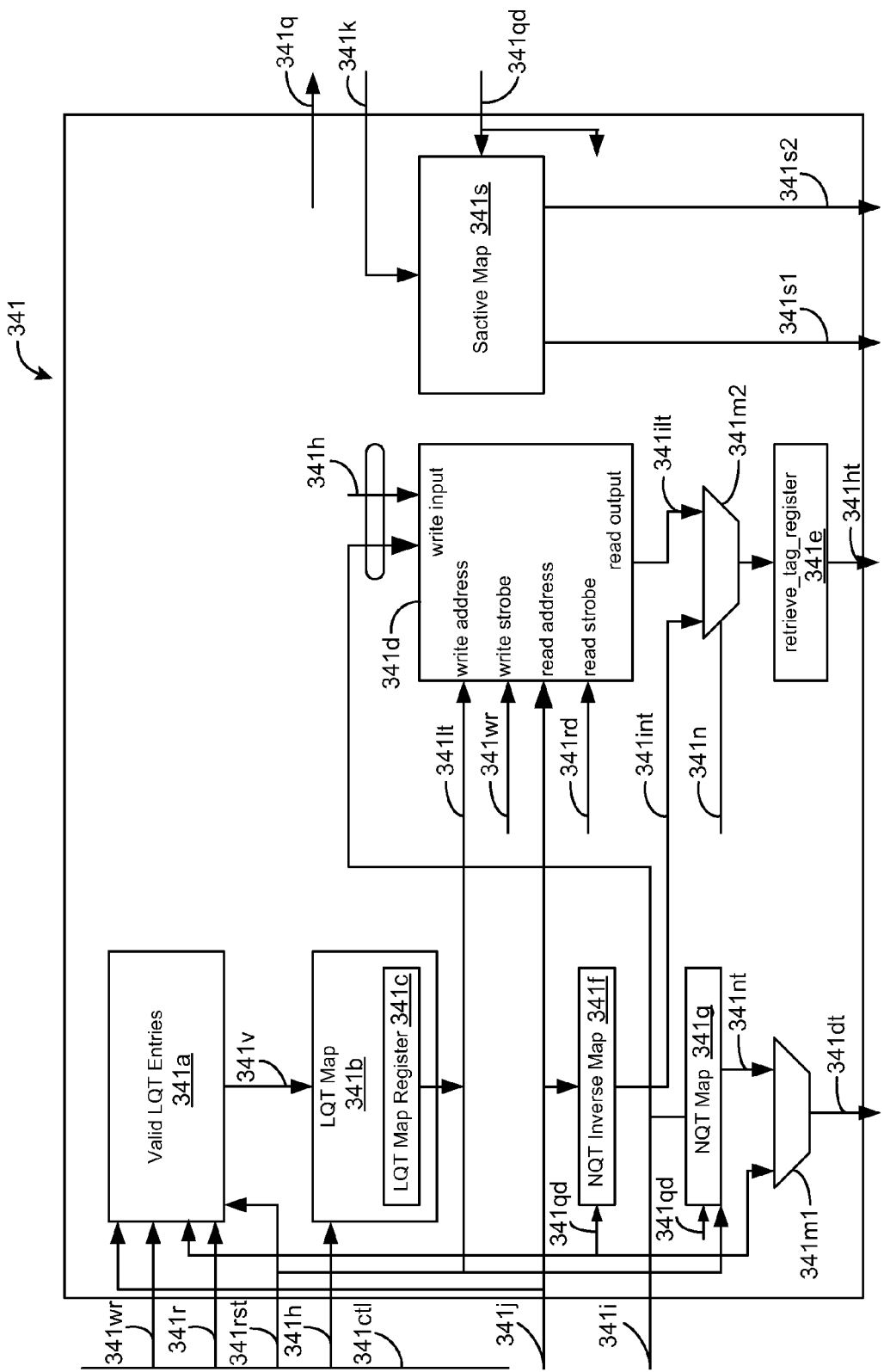
Figure 7C:
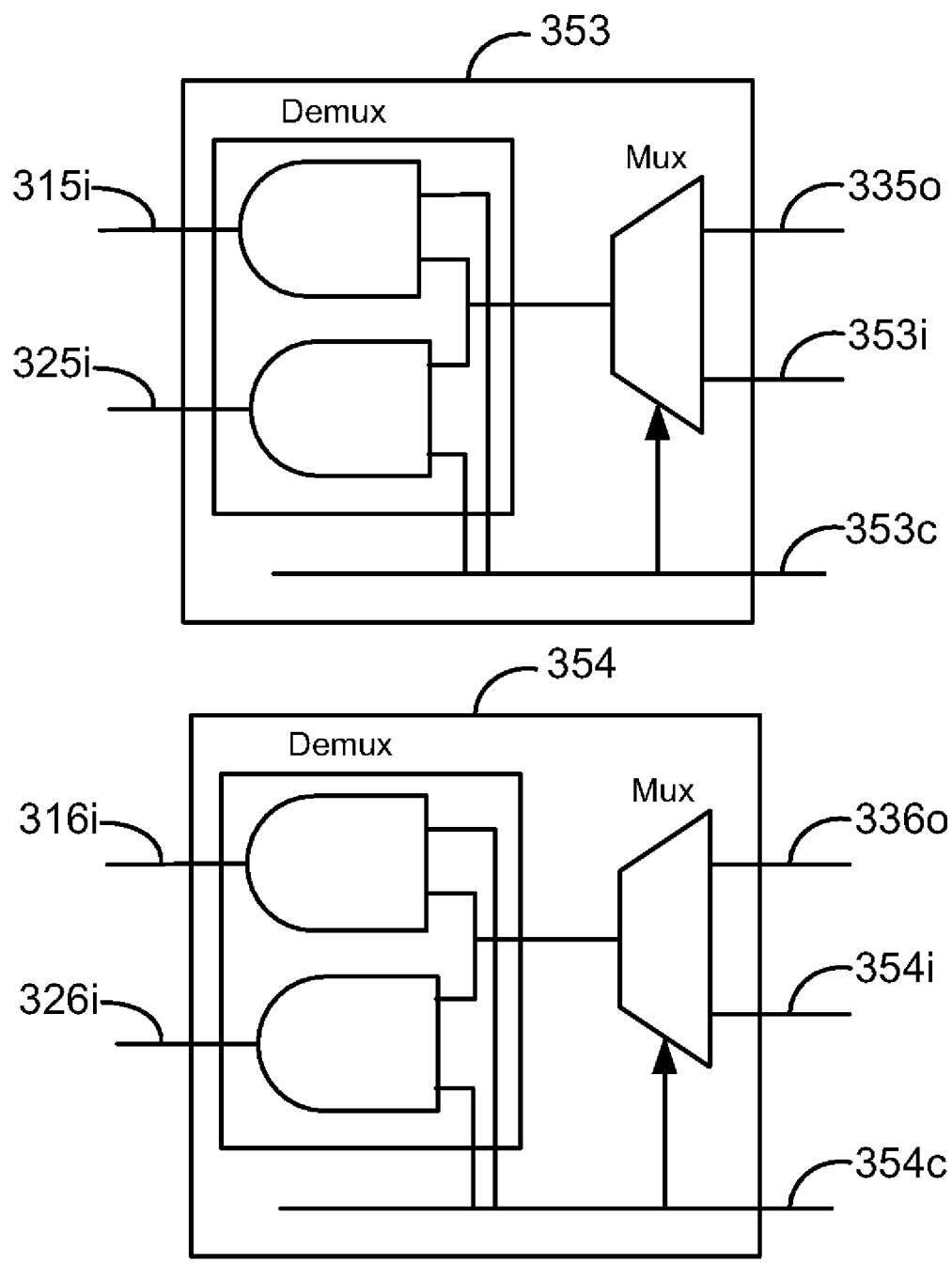
FIG. 7c shows a mux-demux 353 and mux-demux 354 of the switch of FIG. 6.

Referring now to FIG. 7$c$, The mux-demux 353 has two inputs 335$o$, 353$i$ and two outputs 315$i$, 325$i$. The mux-demux 353 performs two functions, the first function is selecting one of two inputs (multiplexing) and the second function is to route the selected one of the two inputs to a selected one of the outputs of mux-demux 353 and to set the unselected output of mux-demux 353 to an inactive voltage level (demultiplexing), The control signal 353$c$ is for controlling the multiplexing and demultiplexing functions of the mux-demux 353.

The mux-demux 354 has two inputs, 336$o$, 354$i$, and two outputs 316$i$ and 326$i$. The mux-demux 354 performs two functions, its first function is selecting one of two inputs (multiplexing) and its second function is to transmit the selected one of the two inputs to selected one of the outputs of mux-demux 354 and to set the unselected output of the mux-demux 354 to an inactive voltage level (demultiplexing). The control signal 354$c$ is for controlling the multiplexing and demultiplexing functions.

The operation of the switch 300 requires the switch 300 to be cognizant of the commands in progress and process certain commands differently than other commands. The arbitration and control circuit 340 receives the host 11 task file via the host 11 task file output bus 316$o$. The circuit 340 also receives the host 12 task file via the host 12 task file output bus 326$o$ and also receives the device task file via the device task file output bus 336$o$ and further receives the device command layer output bus 335$o$.

In addition to arbitration, the arbitration and control circuit 340 keeps track of commands in progress and pending commands and modifies data payload or FIS in some special cases. In special cases, when the data payload must be changed, the arbitration and control circuit 340 generates substitute data and provides the substitute data on the control command layer output bus 353$i$ that is connected to one of the input signals of the mux-demux 353 along with a value on the control signal 353$c$ to select the output bus 353$i$. In special cases, when the non-data FIS must be changed or a completely new non-data FIS must be sent, the arbitration and control circuit 340 generates a corresponding substitute task file and provides the substitute task file on the control task file output bus 354$i$ that is connected to one of the input signals of the mux-demux 354 along with a value on the control signal 354$c$ to select the output bus 354$i$.

Special cases that require changing data payload from the device include the case of an identify drive response, which is generated in response to an identify drive command from a host. The identify drive response includes 512 bytes (256 words) of data for providing predefined characteristics of the device.

In particular, the identify drive response includes the device capability for supporting queuing and a queue depth. As an example, bit 1 of word 83 of the identify drive response indicates if the Read/Write DMA queued commands (known to those of ordinary skill in the art) are supported, and bit 8 of word 76 of the identify drive response indicates if native queue commands (known to those of ordinary skill in the art) are supported and bits 0 through 4 of word 75 of the identify drive response include the value of queue depth minus one.

In one application, command queuing can be disabled by intercepting the identify drive response and replacing the queue depth value with zero and resetting bit 8 of word 76. In active switch applications that support queuing, the queue depth reported to each host must be altered so that the hosts do not send more commands than the device can support.

In the embodiment of FIG. 6, the arbitration and control circuit 340 intercepts the identify drive response sent from the device and replaces the original value in bits 0 through 4 of word 75 with a new generated value, representing a queue depth value, which is one half of the original queue depth value.

In the case where the original value represents an odd value as the queue depth, the new value represents a queue depth value which is one half of the original queue depth value after subtracting one. As mentioned above, the value in bits 4 through 0 of word 75 (75[4:0]) (this notation represents bit 0 through bit 4 of a 16-bit word 75) represents the queue depth value minus one. The operation of generating a new value for 75[4:0] is performed by bitwise shifting the original value of 75[4:0] and then conditionally subtracting a one if the original value of 75[4:0] represents an even value (the least significant bit (75[0]) is zero). The arbitration and control circuit 340 generates the new value on the control command layer output bus 353*i* and sets the value on the control signal 353*c* in accordance with the selection of the bus 353*i*, which is demultiplexed and then provided as input to the mux-demux 353.

Word 255 of the identify drive response is an integrity word. The use of this word is optional. If bits 7 through 0 of the word 255 (255[7:0], (this notation represents bit 0 through bit 7 of a 16-bit word) contain the value A5 (in hexadecimal notation), bits 15 through 8 of word 255 include a checksum which is the two's complement of the sum of all of the bytes in words 0 through 254 and the byte consisting of bits 0 through 7 in word 255. When the checksum is used and the arbitration and control circuit modifies part of the identify drive response, the arbitration and control circuit additionally modifies the checksum to reflect the correct value and then generates the new checksum and provides the same onto the control command layer output bus 353*i* and sets the value on the control signal 353*c* to select the bus 353*i*.

The operation of the active switch for supporting legacy and native command queuing of SATA protocol will now be described. However, a brief description of legacy and native command queuing between a host and a device will first be presented.

A legacy Read/Write DMA Queued Command (LQ CMD) includes a host tag having a value between decimal integers 0 and 31 regardless of the queue depth. The number of outstanding legacy Read/Write DMA Queued commands can not exceed the queue depth. If the host sends a LQ CMD command with an invalid host tag value then the device responds with an error condition. An example of such a case is when the queue depth is exceeded. After the host sends a LQ CMD command, the host waits for a response thereto from the The device sends a Register FIS 40(*ii*) wherein the REL bit in the Register FIS 40(*ii*) is set (equals logical 1) and the SERV bit in the Register FIS 40(*ii*) is reset (equals logical 0) to indicate that the device has queued the command and the command is "released". "Released" is the case wherein the device disconnects ("disconnecting", "connecting", and "reconnecting", are as defined in the Serial ATA specification referred to by reference herein above) after queueing the command for subsequent processing, and reconnects at a later time to complete the command. When the command is released, the host is allowed to send another legacy Read/Write DMA Queued command as long as the queue depth is not exceeded;

The device sends a Register FIS 40(*ii*) wherein both the REL bit and the SERV bit in the Register FIS 40(*ii*) are set, to indicate that the device has queued the command and is ready to service a queued command;

The device sends a Data FIS 40(*vii*) or a DMA Activate FIS 40(*iii*) to indicate that the device is executing the command;

The device sends a Register FIS 40(*ii*) wherein the BSY bit in the Register FIS 40(*ii*) is reset and the ERR bit in the Register FIS 40(*ii*) is set to indicate that an error occurred; or When the device is ready to reconnect to the host, the device sends a Set Device Bit FIS 40(*v*) or Register FIS 40(*ii*) to the host wherein the SERV bit in the Set Device Bit FIS 40(*v*) or Register FIS 40(*ii*) is set. The host responds thereto with a SERVICE command and the device sends a Register FIS 40(*ii*) back to the host including the host tag value. At this point, the host and the device are reconnected and command execution resumes. If the host sends a non-queue command or native queue command when the device has a non-empty queue of legacy queue commands, the queued commands are aborted.

In the case of native queue commands (NQ CMDs), the host tag values are restricted to values between 0 and the queue depth minus one (queue_depth_minus_one). After the host sends a native queue command, the host waits for a Register FIS 40(*ii*) from the device. If the BSY bit and DRQ in the Register FIS 40(*ii*) are reset, then the Register FIS from the device indicates that the command is queued and the command is released. If the BSY bit in the Register FIS 40(*ii*) is reset and ERR bit in the Register FIS 40(*ii*) is set, then the Register FIS 40(*ii*) from the device indicates that an error occurred. If the command is released, the host can send another native queue command as long as the queue depth is not exceeded. When the device is ready to reconnect to the host, the device sends a DMA Setup FIS 40(*iv*) which includes the host tag value.

At this point, the host and the device are reconnected and command execution resumes. The device sends completion status via the Set Device Bits FIS 40(*v*). The Sactive field 40(*v*)(*ii*) of the Set Device Bits FIS 40(*v*) has 32 bits and each bit corresponds to a tag (bit 0 correspond to tag value 0, bit 1 corresponds to tag value 1, and so on). A bit set in the Sactive field 40(*v*)(*ii*) of the Set Device Bits FIS 40(*v*) is indicative of corresponding queued commands having been completed. If the ERR in the Set Device Bits FIS 40(*v*) bit is not set, the commands have completed successfully without error. If the host sends a non-queue command or a legacy queue command when the device has a non-empty queue of native queue commands, the queued commands are aborted.

Since both hosts may use the same tag values, the switch maps the host tag values to a different value to be able to distinguish between the hosts when the device is reconnecting. When the switch of one of the embodiments of the present invention receives a queue command, the host tag is mapped to a unique device tag such that the host and the original host tag are identified when the device is reconnecting.

In the case of legacy queue commands, when the switch 300 receives from the device a Set Device Bits FIS 40(*v*) wherein the SERV bit in the Set Device Bits FIS 40(*v*) is set or Register FIS 40(*ii*) wherein the SERV bit in the Register FIS 40(*ii*) is set, the switch 300 can not forward the Set Device Bits FIS 40(*v*) since the tag value of the command that the device needs to service is not yet available. In order to obtain the tag value, the switch 300 sends a SERVICE command to the device, the device responds with a Register FIS 40(*ii*) including the tag. The switch 300 then remaps the tag to identify the host and the original host tag value. If there is no legacy queue command pending from the host in the switch 300, the switch then sends Set Device Bits FIS 40(v) to the host with the SERV bit set. If there is a legacy queue command pending in the switch, the switch 300 stores the command in pending task file 344 and when the device is ready to release the pending legacy queue command, the device responds with a Register FIS 40(ii) wherein the REL bit and the SERV bit in the Register FIS 40(ii) are set. When the host responds with a SERVICE command, the switch 300 responds with a Register FIS 40(ii) including the original host tag value.

In the case of native queue commands, when the switch 300 receives a DMA Setup FIS 40(vi) from the device, the switch 300 first remaps the tag in the DMA Setup FIS 40(iv)(ii) to identify the host and the original host tag value and then forwards the DMA Setup FIS 40(iv)(ii), with the tag replaced with the original host tag, to the identified host.

Figure 1A:
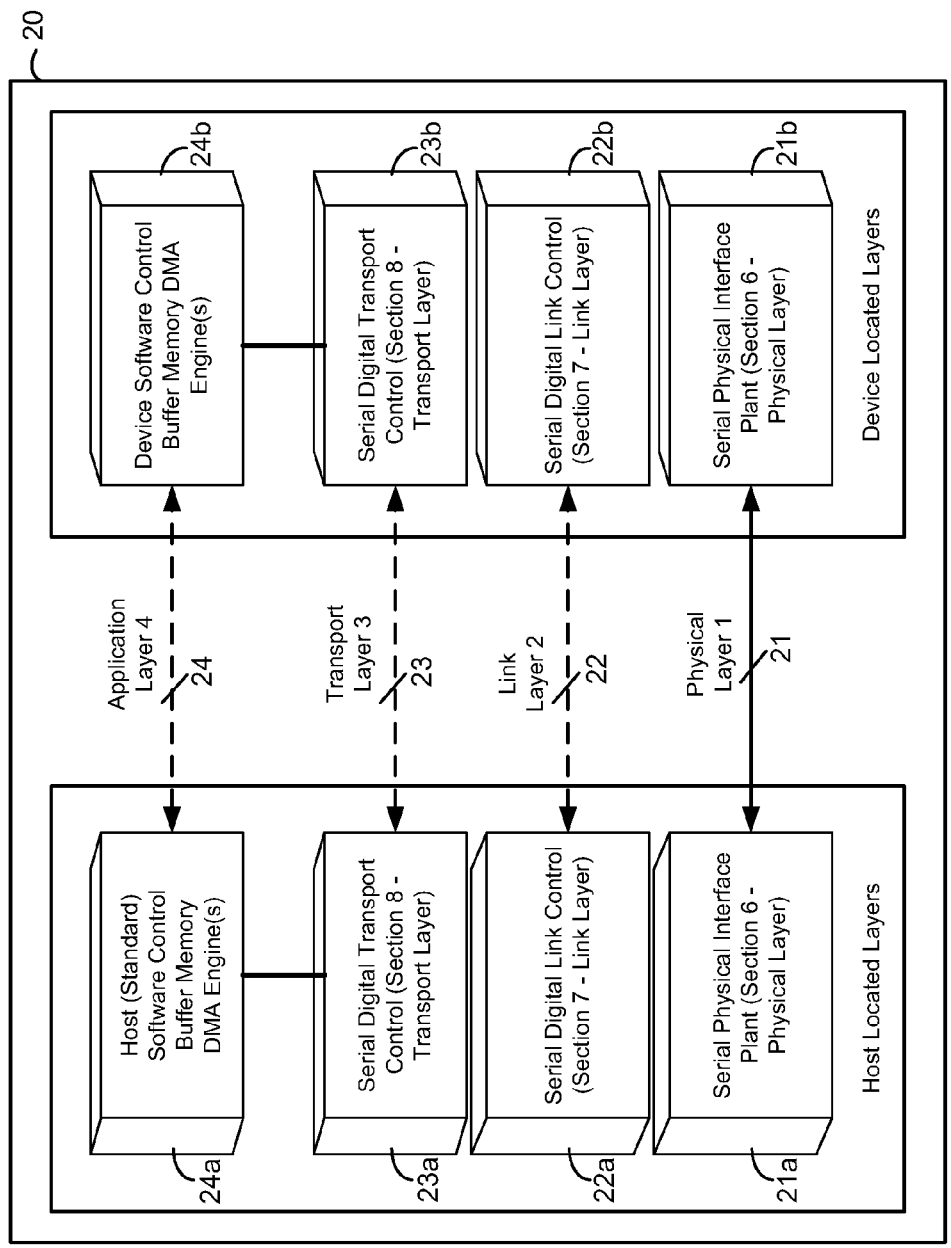
FIG. 1a shows prior art SATA protocol communication layers.
Figure 1B:
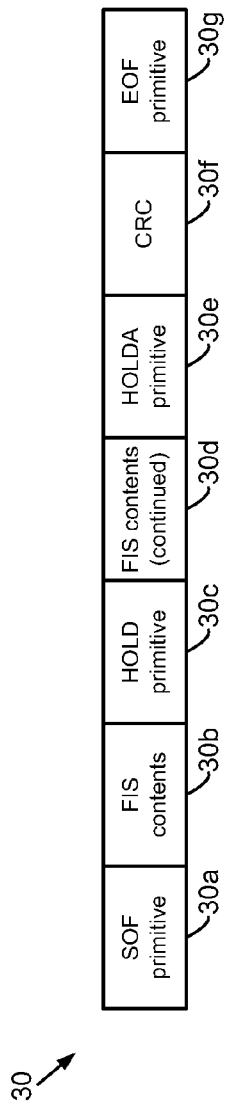
FIG. 1b shows an example of a prior art SATA frame structure.
Figure 1C:
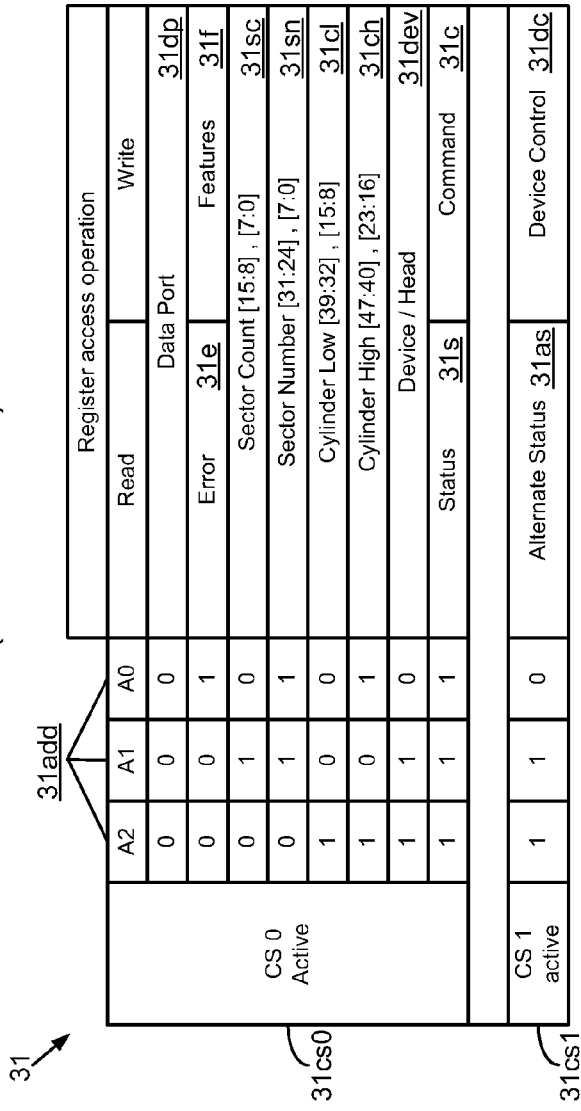
FIG. 1c shows an example of a prior art shadow register block of SATA.
Figure 3A:
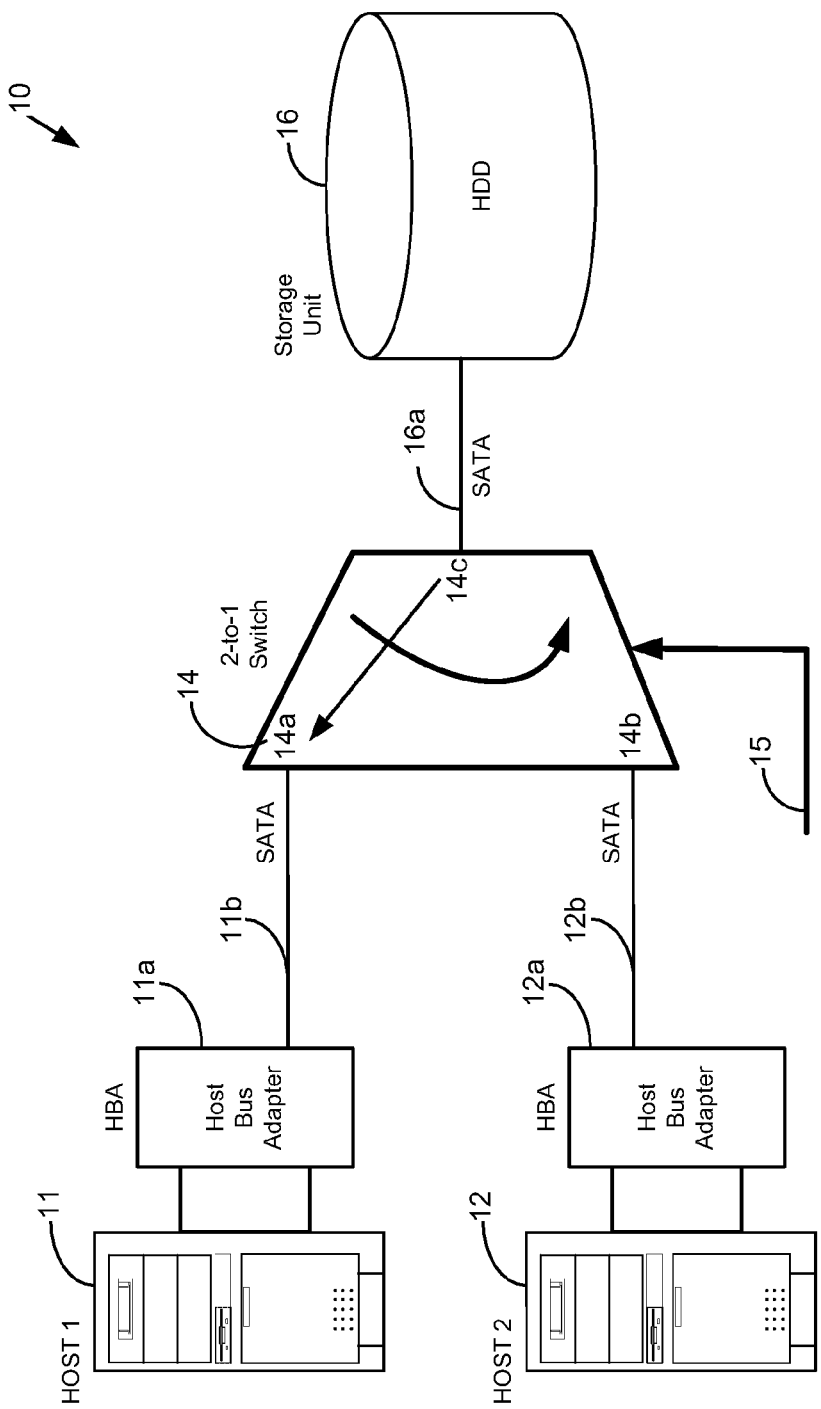
FIG. 3a shows a prior art system application of a SATA switch.
Figure 3B:
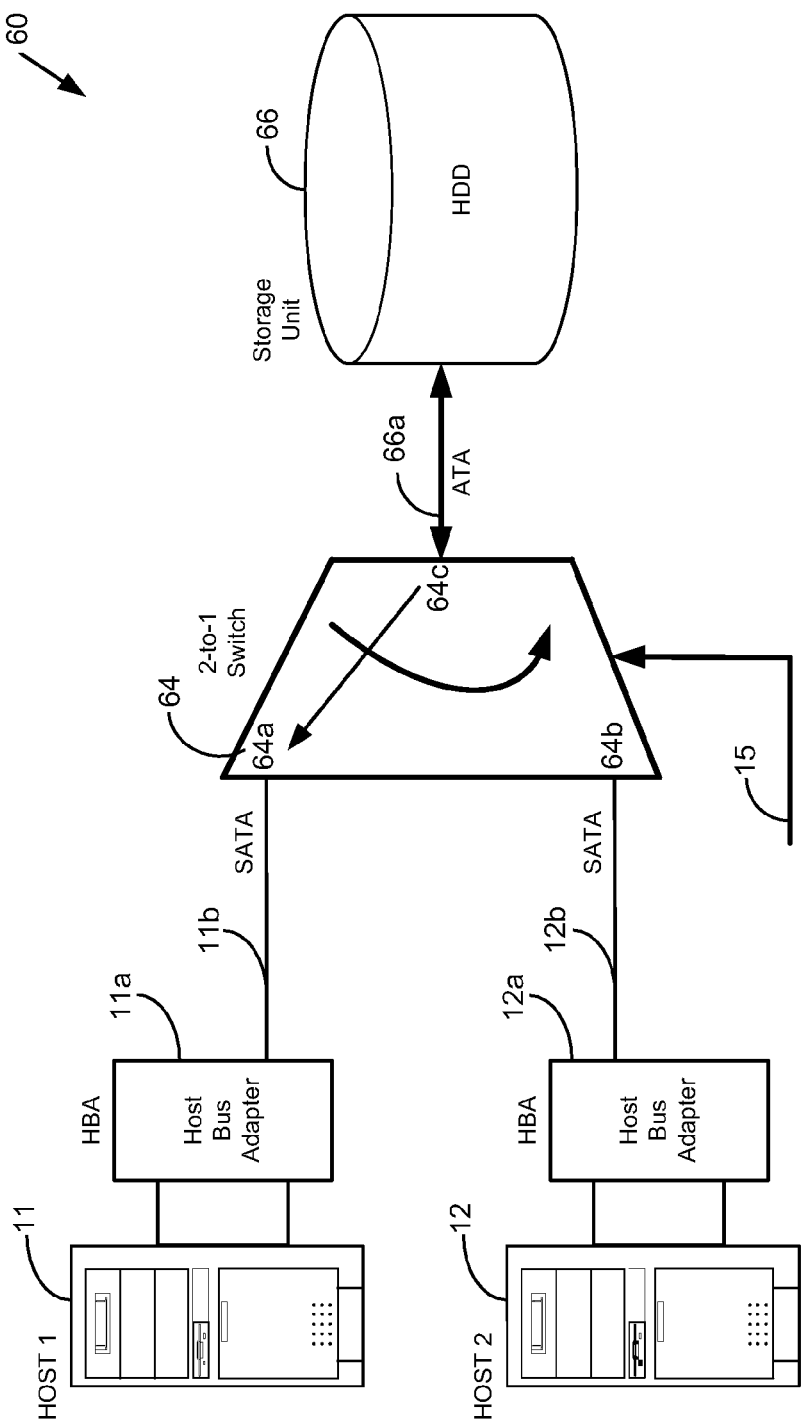
FIG. 3b shows a prior art system application of a SATA to ATA switch

In the case of native queue commands, when the switch 300 receives a Set Device Bits FIS 40(v), from the device, which includes a Sactive field 41 (shown in FIG. 1d(v)), indicating the status of completion of the native queue commands, the switch 300 generates a host 11 Sactive field and a host 12 Sactive field such that the host 11 Sactive field includes only the tags in the Sactive field 41 that belong to the host 11 (shown in FIG. 3a) and the host 12 Sactive field includes only the tags in the Sactive field 41 that belong to the host 12 (shown in FIG. 3a). The switch 300 forwards the Set Device Bits FIS 40(v) to the host 11 (shown in FIG. 3a) with the Sactive field replaced with the host 11 Sactive field and concurrently forwards the Set Device Bits FIS 40(v) to the host 12 (shown in FIG. 3a), with the Sactive field 41 replaced with the host 12 Sactive field.

Figure 8A:
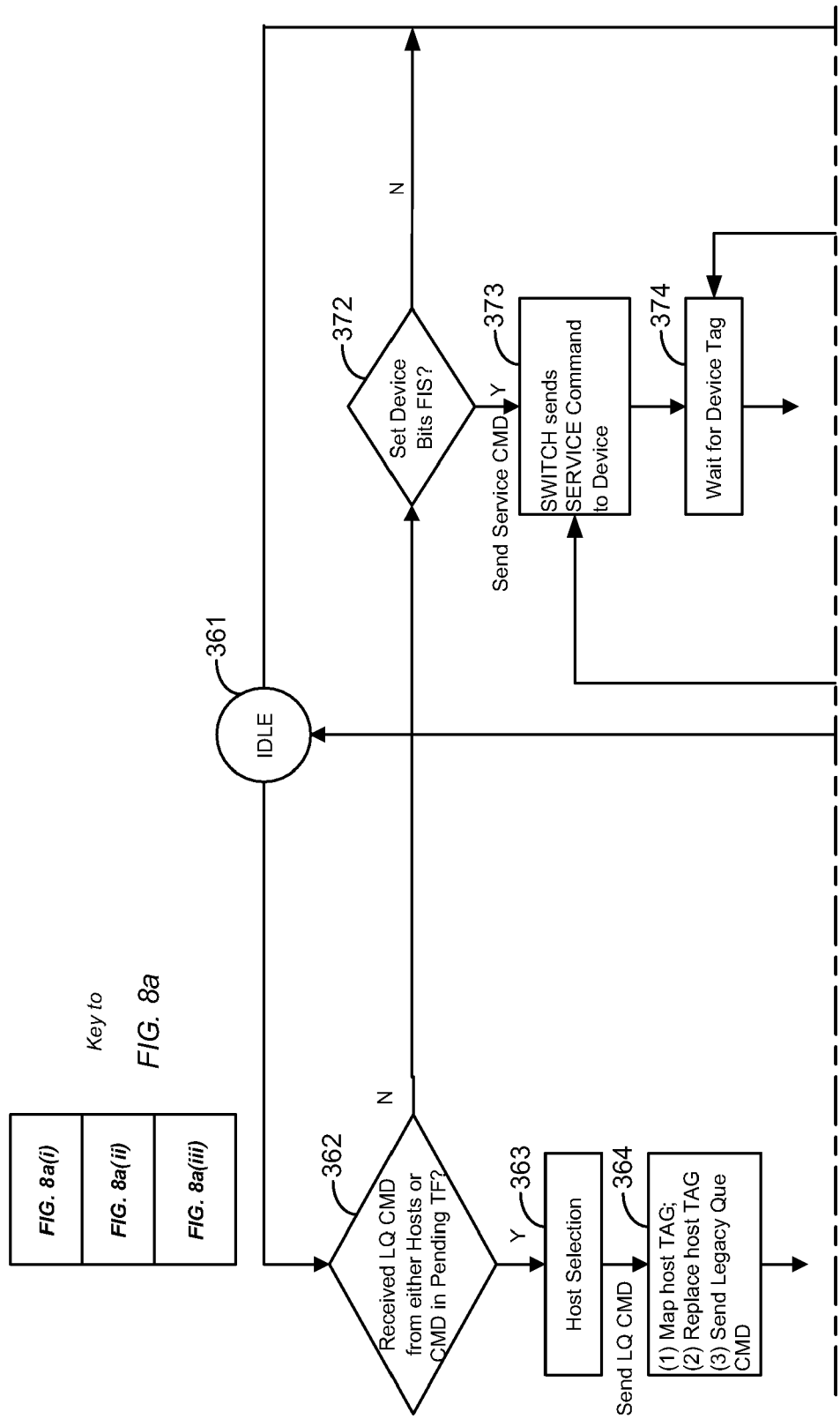
FIG. 8a shows a flow chart of the operation of the switch 300 of FIG. 6 for legacy queue commands.

FIG. 8a shows a flow chart of the operation of the switch 300 of FIG. 6 for legacy queue commands.

In idle state 361, if a legacy queue command is received from either hosts or there is a pending legacy queue command in the Pending Task File 344, then the switch 300 changes state to the host-selection state 363. Otherwise, if the Set Device Bits FIS 40(v) or the Register FIS 40(ii) with the SERV bit set is received from the device 372, then the switch 300 changes state to send service CMD state 373. Otherwise, the switch remains in idle state 361.

In the host-selection state 363, the switch 300 arbitrates between the hosts and selects the host whose pending command will be subsequently forwarded to the device. The pending command includes a selected host tag. The switch 300 then changes state to the send-LQ CMD state 364.

In the send-LQ CMD state 364, the switch 300 first maps the selected LQ host tag to a send device tag, replaces the selected LQ host tag with the send device tag and then forwards the pending command to the device. The switch 300 then changes state to wait for device response state 365. The send device tag refers to a tag that is sent to the device by the switch 300.

In the wait for device response state 365, if the device response is received, then the switch 300 changes state to the check-device-response state 366. Otherwise, the switch 300 remains in the wait for device response state 365. In the check-device-response state 366, if the device response is Register FIS 40(ii) with the REL bit set and the SERV bit set in the Register FIS 40(ii), the switch 300 changes state to the disconnect/reconnect state 366b. Otherwise, if the device response is Register FIS 40(ii) with REL bit set and SERV bit reset, the switch 300 changes state to disconnect state 366d. Still Otherwise, if the device response is Data FIS 40(vii) or DMA Activate FIS 40(iii), the switch 300 changes state to the execute state 366f. Yet otherwise, if the device response is Register FIS 40(ii) with ERR bit set, the switch 300 changes state to the error state 366h. Still otherwise, the switch changes state to the discard state 366j and discards the received FIS and changes state to the idle State 361.

In the disconnect/reconnect state 366b, the switch 300 sends a Register FIS 40(iii) with the REL bit set and the SERV bit reset to select a host and then changes state to send-service-CMD state 373. In the disconnect state 366d, the switch 300 sends a Register FIS with the REL bit set and the SERV bit reset to a selected host and then changes state to the idle state 361.

In the execute state 366f, the switch 300 awaits completion of the current command, the current command being the command that was sent in the send LQ CMD state 364. After successful completion of the current command, the switch 300 changes state to the idle State 361. Otherwise, the current command is terminated with error and then the switch 300 changes state to the error state 366h. In the error state 366h, the switch 300 performs error handling and after completion of the error handling, changes state to the idle state 361.

In the send-service CMD state 373, the switch 300 sends the service CMD to the device and changes state to the wait for device tag state 374.

While in the wait for device tag state 374, if the device response is received, the switch 300 changes state to the remap state 375, otherwise, the switch 300 remains in the wait for device tag state 374. In the remap state 375, the switch 300 remaps a received device tag, the tag that is received from the device by the switch 300, to identify the host and the original host tag and additionally, the switch 300 replaces the received device tag with the original host tag. If there is a pending queue CMD in the identified host task file, the switch 300 changes state to the save state 376b, otherwise, the switch 300 changes state to the reconnect to host state 376a. In the reconnect to host state 376a, the switch 300 sends a Set Device Bits FIS 40(v) with the SERV bit set to an identified host (a host that was identified in the remap state 375) and then changes state to the wait for the host response state 377.

In the wait for host response state 377, if the identified host's response is received, then the switch 300 changes state to the check-host-response state 378, otherwise, the switch 300 remains in the wait for host response state 377. In the check-host-response state 378, if the host response is a service command, the switch 300 changes state to the send-tag-to-host state 378b, otherwise, if the host response is another LQ CMD, then the switch 300 changes state to the set-pending state 378e, otherwise, the switch 300 changes state to the error 2 state 378d.

In the send tag to host state 378b, the switch 300 sends a Register FIS, with the original host tag, to the identified host and changes state to the reconnected state 379. In the set pending state 378e, the switch 300 sets a pending queue CMD flag to indicate that the host has sent another legacy queue command. In the save state 376b, the switch 300 saves the task file of the identified host in the pending task file and then sends a Register FIS 40(v), with the SERV bit set and the REL bit set to the identified host.

In the disconnect/reconnect state 366b, the reconnect to host state 376a, the save state 376b, and the send tag to host state 378b, a modified FIS or a new FIS are sent to the host. The arbitration and control circuit 340 generates the task file corresponding to the modified FIS (or the new FIS) and transmits the same onto the control task file output bus 354i, which is connected to an input of the mux-demux 354. The circuit 340 further sets the value of the control signal 354c to select the bus 354i and demultiplexes the same to serve as the output of the mux-demux 354.

In the disconnect/reconnect state 366b, the reconnect to host state 376a, the save-state 376b, and the send-tag-to-host state 378b, a modified FIS or a new FIS are sent to the host. The arbitration and control circuit 340 generates the task file corresponding to the modified FIS (or the new FIS) and transmits the same onto the control task file output bus 354i, which is connected to an input of the mux-demux 354. The circuit 340 further sets the value of the control signal 354c to select the bus 354i and demultiplexes the same to serve as the output of the mux-demux 354.

In the send LQ CMD state 364, the send service CMD 373, the modified FIS (or the new FIS) are sent to the device. The arbitration and control circuit 340 generates the task file corresponding either to the modified FIS or to the new FIS on the device control task file output bus 352i, which in turn is connected to one of the inputs of the multiplexer 352, as shown in FIG. 5, and sets the value of the select signal 352s to select the bus 352i as the output of the multiplexer 352, which in turn is connected to the device task file input bus 336i.

Figure 8B:
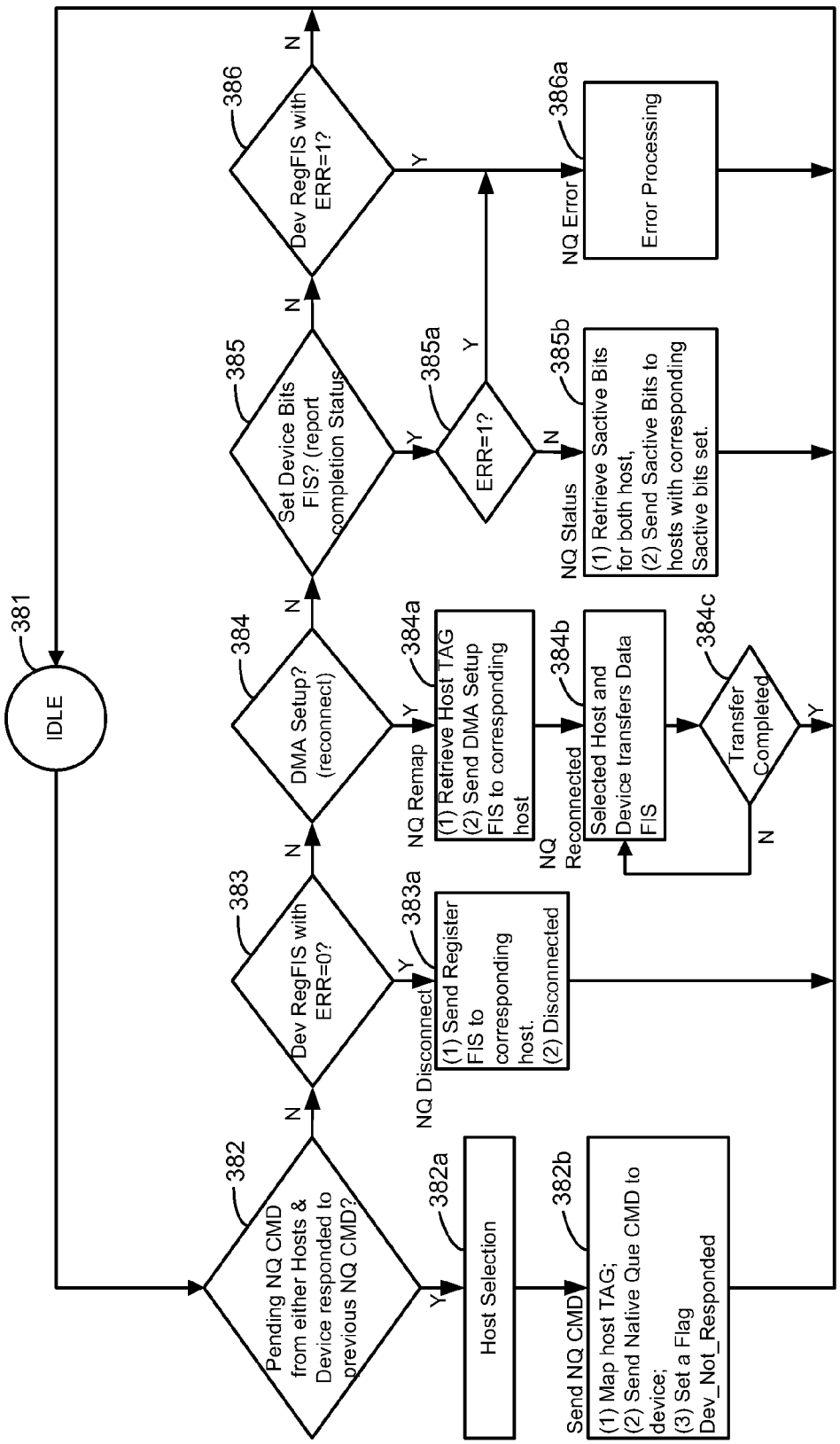
FIG. 8b shows a flow chart of the operation of the switch of FIG. 6 for native queue commands

FIG. 8b shows a flow chart of the operation of the switch 300 for the native queue commands (NQ CMDs). In the idle state 381, a number of decisions may be made as shown at 382-386. At 382, if a native queue command is received from either hosts and the device has responded to the previous NQ CMDs, then switch 300 changes state to the host-selection state 382a, otherwise, at 383, if the Register FIS, with the ERR bit reset, is received from the device, then the switch 300 changes state to the NQ-disconnect state 383a. Otherwise, at 384, if the DMA Setup FIS 40(iv) is received from the device, then the switch 300 changes state to the NQ remap state 384a. Still otherwise, at 385, if Set Device Bits FIS 40(v) is received, and at 385a, the ERR bit in the Set Device Bits FIS is reset, then the switch changes state to the NQ status state 385b, otherwise, if the ERR bit is set, then the switch 300 changes state to the NQ error state 386a. If at 385, the Set Device Bits FIS does not indicate completion status, at 386, if a Device Register FIS, with the ERR bit set, is received, then the switch 300 changes state to the NQ-error state 386a, otherwise, the switch 300 remains in the idle state 381.

In the host selection state 382a, the switch 300 arbitrates between the hosts and selects the host whose pending command will be subsequently forwarded to the device in the send-NQ CMD state 382b. The switch 300 then changes state to the send NQ CMD state 382b.

In the send NQ CMD state 382b, the switch 300 first maps the selected NQ host tag to a send device tag, replaces the selected NQ host tag with the send device tag, forwards the command that was sent in send-NQ CMD state 382b to the device and sets a flag, "device_not_responded", and changes state to the idle state 381. The flag, "device_not_responded", indicates that the device has not yet responded to a native queue command.

In the NQ disconnect state 383a, the switch 300 causes the Register FIS to be forwarded to the selected host, resets the flag "device_not_responded", and then changes state to the idle state 381. In the NQ remap state 384a, the switch 300 remaps the receive device tag to identify the host and the original host tag, and replaces the receive device tag with the original host tag in the DMA Setup FIS and sends the DMA Setup FIS to the identified host, and changes state to the NQ reconnected state 384b. In the NQ reconnected state 384b, the identified host is reconnected to the device, and the Data FIS is transferred between the reconnected host and the device. In the NQ reconnected state 384b, the switch 300 checks as to whether or not the DMA transfer count is exhausted at 384c. If the DMA transfer count is not exhausted, the switch 300 remains in the reconnected state 384b, otherwise, the switch 300 changes state to idle state 381. In the NQ status state 385b, the switch 300 processes the status of successfully completed NQ CMDs, which is reported by the device in the Sactive field 41 of the Set Device Bits FIS 40(v).

The switch 300 generates a host 11 Sactive field and a host 12 Sactive field from the Sactive field 41 such that the host 11 Sactive field includes only the tags in the Sactive field 41 that belong to the host 11 and the host 12 Sactive field includes only the tags in the Sactive field 41 that belong to the host 12. The switch 300 forwards the Set Device Bits FIS to the host 11 with the Sactive field 41 replaced with the host 11 Sactive field, and then forwards the Set Device Bits FIS to the host 12 with the Sactive field 41 replaced with the host 12 Sactive field. The switch 300 then changes to the idle state 381. In the NQ error state 386, the switch 300 performs error handling and after completion of error handling, changes state to the idle state 381.

In the NQ-remap state 384a and the NQ status state 385b, a modified FIS is sent to the host. The arbitration and control circuit 340 generates the task file corresponding to the modified FIS or the new FIS and transmits on control task file output bus 354i, that is connected to the second input of mux-demux 354 and sets the value on the control signal 354c to select and demultiplex the task file output bus 354i to the selected host.

In the send NQ CMD state 364, a modified FIS is sent to the device. The arbitration and control circuit 340 generates the task file corresponding to the modified FIS and transmits on device control task file output bus 352i that is connected to one of the inputs of the multiplexer 352 and sets the value on the select signal 352s to select the bus 352i as the output of multiplexer 352, which is connected to the device task file input bus 336i.

In one of the embodiments of the present invention, the device tag (send device tag and receive device tag) values are divided into two ranges, a host 11 range and a host 12 range. In one embodiment of the present invention, the host 11 range includes tags from a minimum host 111 tag value to a maximum host 11 tag value, and the host 12 range includes tags from a minimum host 12 tag value to a maximum host 12 tag value where the minimum host 11 tag value is 0, and the maximum host 11 tag value is equal to the host queue depth minus one. The minimum host 12 tag value is equal to host queue depth and the maximum host 12 tag value is equal to 2*host_queue_depth −1, and the host queue depth is the value reported to the host 11 and to the host 12 in response to the identify drive command, which was discussed earlier.

For example, if the device supports a queue depth of 32, then the host queue depth that will be reported in response to the identify drive command will be 16, and the host 11 range will be tags from 0 to 15, and the host 12 range will be from 16 to 31. In another example, if the device supports a queue depth of 31, then the host queue depth that will be reported in response to identify drive command will be 15, and the host 11 range will be tags from 0 to 14, and the host 12 range will be tags from 15 to 30. Alternative embodiments with different queue depth for the host 11 and the host 12 fall within the scope of present invention.

Referring to FIG. 7a, the arbitration and control circuit 340 comprises a host arbitration circuit 343, Tag/Sactive mapping circuit 341, and control circuit 342. The functions performed by the Tag/Sactive Mapping circuit 341 include:

mapping a host tag to a send device tag and in the case of a legacy queue tag saving the result of the mapping in a tag memory, and keeping a list of the valid queue tags.

inverse mapping a receive device tag to identify the host and to obtain the original host tag and in case of the LQ CMD, invalidating queue tag when directed by the control circuit 342 at the completion of the command.

mapping a Sactive field 41 to a host 11 Sactive field and a host 12 Sactive field corresponding to the host 11 and to the host 12, respectively.

The host 11 task file output bus 316o includes a host 11 FIS request 318, which includes a host 11 FIS request indication and a queue command indication. The host 11 FIS request indication is generated from decoding the write to the host 11 task file command or device control registers. The host 11 queue command indication is generated by decoding writing a legacy or native queue command to the host 11 task file command register.

The host 12 task file output bus 326o includes a host 12 FIS request 328 which includes a host 12 FIS request signal and a queue command signal. The host 12 FIS request signal is generated from decoding write to the host 12 task file command or device control registers. The host 12 queue command signal is generated by decoding writing a legacy or native queue command to the host 12 task file command register.

The host arbitration circuit 343 receives the host 11 FIS request 318, the host 12 FIS request 328, the control signals 343c from control circuit 342, and the queue status signals 341q from the Tag/Sactive mapping circuit 341. In response to the control signal 343c from the control circuit 342, the host arbitration circuit 343 generates a host select signal 343hs that serves as input to the control circuit 342. A logical zero on the host select signal 343hs indicates that the host 11 can send commands to the device and logical one indicates that the host 12 can send commands to the device. The operation of host arbitration 343 is described in Table 1.

The functions performed by the control circuit 342 include:
generating a select signal 351s that controls the operation of multiplexer 351;
generating a device control task file output bus 352i that is connected to an input of multiplexer 352, and a select signal 352s that controls the operation of said multiplexer 352;
generating a control command layer output bus 353i, that is connected to an input of mux-demux 353, and a control signal 353c which is the control signal for mux-demux 353;
generating a control task file output bus 354i, connected to an input of mux-demux 354, and a control signal 354c that controls the operation of said mux-demux 354;
generating control signal 343c for host arbitration circuit 343;
generating control signals 341ctl for Tag/Sactive mapping circuit 341; and
generating control signal to save the identified host task file in pending task file 344 and control operation of multiplexer 354.

FIG. 7b shows the Tag/Sactive mapping circuit 341, used in one of the embodiments of the present invention. The Tag/Sactive Mapping circuit 341 includes a tag memory 341d, a valid LQT register 341a for indicating whether or not the corresponding LQT is valid, a LQT map 341b, a NQT map 341g, a NQT inverse map 341f, a device tag multiplexer 341m1, a host tag multiplexer 341m2, a retrieve tag register 341e and a Sactive Map 341s. The Tag/Sactive mapping circuit 341 inputs includes device tag input 341j, a host tag input 341i, a Sactive input 341k, host queue depth input 341qd, and a control bus 341ctl. The Tag/Sactive mapping circuit 341 generates certain outputs including a mapped host tag 341dt, a retrieved host tag 341ht, a host 11 Sactive output bus 341s1 and a host 12 Sactive output bus 341s2.

In the case of native queue commands, the host tag values are restricted between 0 and host_queue_depth minus_one. The mapping and inverse mapping is achieved using an adder/subtractor. The device tags corresponding to the host 11 tag are the same as the host 11 tag and the device tags corresponding to the host 12 tags are equal to the host 12 tag value plus the host queue depth.

This operation of mapping the NQ tag is performed by the NQT map 341g. The NQT map 341g receives a selected host tag input 341i and a host queue depth 341qd, and its output 341nt is connected to an input of the device tag multiplexer 341m1. If the selected host tag input 341i is from the host 11 (signal 341h is logical zero), then the output of the NQT map is equal to the selected host tag input 341i, otherwise if the host tag input 341i is from the host 12 (signal 341h is logical one), then the output of the NQT map is equal to the selected host tag input 341i plus the host queue depth.

The inverse mapping for the NQ Tag is performed by the NQT inverse map 341f. The NQT inverse map 341f receives a receive device tag input 341j, the host queue depth 341qd, and its output 341int includes a binary valued signal that identifies the host (a logical zero indicates the host 11 is identified and a logical 1 indicates the host 12 is identified) concatenated with corresponding original host tag value. The output 341int is connected to an input of host tag multiplexer 341m2. If the receive device tag input 341j is less than the host queue depth 341qd, then the output is equal to logical zero signal (indicating host 11) concatenated with the device tag input 341j, otherwise the output 341int is equal to logical one signal (indicating host 12) concatenated with the receive device tag 341j minus the host queue depth 341qd.

In the case of legacy queue commands, the host tag values are between 0 and 31 regardless of the host queue depth. As mentioned above, the device tags from 0 to host queue_depth_minus_one are assigned to the host 11 range, and device tags from host queue_depth to (2*host queue_depth −1) are assigned to the host 12 range. A tag memory unit 341d is used to store the host tag values corresponding to the device tags. This reduces the complexity associated with the function performed by the reverse mapping in that the tag memory unit 341d is accessed at the address corresponding to the received device tag.

The tag memory 341d stores the host tags corresponding to the device tags. In one of the embodiments of the present invention, the tag memory 341d has 32 entries, entry 0 (address 0) stores the host tag corresponding to the device tag value 0, entry 1 (address 1) stores the host tag corresponding to the device tag value 1 and so forth. Not all entries in the tag memory are valid. The tag memory 341d is a conventional memory unit with separate read and write access ports. The tag memory 341d read access ports include a read address port, a read strobe port, and read output port. The tag memory 341d write access ports include a write input port, a write address port, and a write strobe port. The tag memory 341d read address port is connected to the receive device tag input 341j, the read strobe is connected to a control signal 341rd, and the read output is connected to a tag memory output bus 341ilt. The tag memory 341d write address port is connected to output of LQT Map 341lt, the write strobe port connected to control signal 341wr, and write input bus connected to a bus formed by concatenating control signal 341h and selected host tag input 341i. A valid LQT entries 341a includes a valid_lqt_bit for every device tag value. When the value of valid_lqt_bit is logical 1, this indicates that the corresponding device tag value is used, whereas a logical value 0 indicates that the corresponding device tag value is not used. The valid_lqt_bus 341v is a bus including all valid_lqt_bits. The valid_lqt_bus 341v is provided as input to LQT map 341b. When the control signal 341h is at a logical 0, the LQT map 341b finds the first tag value in the host 11 range that is not used and places it on LQT map output 341lt. When the control signal 341h is at a logical 1, the LQT map 341b finds the first tag value in the host 12 range that is not used and places it on the LQT map output 341lt. The LQT map output 341lt is connected to an input of the device tag multiplexer 341m1. The control signal 341n selects the input of the host tag multiplexer 341m1 that is placed on the device tag multiplexer output 341dt. When the control signal 341wr is asserted, the values on the selected host tag input 341i and the control signal 341h are written to the tag memory 341d at the entry corresponding to the LQT map output 341lt and the valid_lqt_bit corresponding to LQT map output 341lt is set to a logical 1.

The inverse mapping for the LQ Tag is performed by accessing the tag memory 341d at an entry with an address equal to the receive device tag input 341j. The receive device tag input 341j is shown connected to the read address port of tag memory 341d and when the control signal 341rd is asserted, the tag memory 341d is accessed and entry at the address corresponding to the receive device tag input 341j is placed on to the output. The tag memory output 341ilt is connected to an input of the host tag multiplexer 341m2. The control signal 341n selects the input of the host tag multiplexer 341m2 that is placed on the output of the multiplexer 341m2. The output of the host tag multiplexer 341m2 is saved in the retrieve tag register 341e. The retrieve_tag_register output 341ht includes a signal that indicates which host is the original host and a corresponding host tag value.

The Sactive map 341s receives the Sactive input 341k and the host queue depth 341qd and generates a host 11 Sactive output bus 341s1 and a host 12 Sactive output bus 341s2. The bits 0 thru host_queue_depth_minus_one of the Sactive input 341k are placed in corresponding bits of the host 11 Sactive output bus 341s1, the remaining bits of the host 11 Sactive output bus 341s1 are reset (logical 0). The bits host_queue_depth thru (2*host_queue_depth −1) of the Sactive input 341k are placed in bits 0 thru host_queue_depth_minus_one of the host 12 Sactive output bus 341s2, the remaining bits of the host 12 Sactive output bus 341s2 are reset (logical 0).

The operation of the host arbitration 343 is described in Table 1 below. As mentioned earlier, the host arbitration 343 uses a rotating priority to select the host that can send commands to the device. Initially, the priority is arbitrarily assigned to the host 11. The arbitration circuit keeps track of the priority and performs arbitration to select the host that can send commands (FIS) to the device. When the device enters a state that accept another command, the arbitration circuit is notified and the arbitration circuit changes the priority to the other host.

The signals in Table 1 describing the operation of arbitration circuit are as follows:

H1_fis_req when set indicates that host 11 has a FIS request

H2_fis_req when set indicates that host 12 has a FIS request

H1_Qcmd when set indicates host 11 has issued a Queue command, when reset a non-queue command H2_Qcmd when set indicates host 12 has issued a queue command, when reset a non-queue command H1_Qempty when set indicates host 11 has an empty queue, when reset a non-empty queue H2_Qempty when set indicates host 12 has an empty queue, when reset a non-empty queue

TABLE 1

Host Arbitration Operation

| | H1_fis_req | H2_fis_req | H1_Qcmd | H2_Qcmd | H1_Qempty | H2_Qempty | Host Arbitration Action |
|---|---|---|---|---|---|---|---|
| 1 | 1 | 0 | x | x | 1 | 1 | Grant to host 11 |
| 2 | 0 | 1 | x | x | 1 | 1 | Grant to host 12 |
| 3 | 1 | 1 | 0 | 0 | 1 | 1 | Grant to host with the priority, |
| 4 | 1 | 1 | 0 | 1 | 1 | 1 | Grant to host 11 |
| 5 | 1 | 1 | 1 | 0 | 1 | 1 | Grant to host 12 |
| 6 | 1 | 1 | 1 | 1 | 1 | 1 | Grant to host with the priority, |
| 7 | 1 | 0 | x | x | 0 | 1 | Grant to host 11 |
| 8 | 0 | 1 | x | 0 | 0 | 1 | Grant is not issued [3] |
| 9 | 0 | 1 | x | 1 | 0 | 1 | Grant to host 12 |
| 10 | 1 | 1 | 0 | 0 | 0 | 1 | Grant to host 11 [1] |
| 11 | 1 | 1 | 0 | 1 | 0 | 1 | Grant to host 11 [1] |
| 12 | 1 | 1 | 1 | 0 | 0 | 1 | Grant to host 11. Alternatively if legacy queue command then Grant to host 11, elseif native queue command no Grant is issued [4] |
| 13 | 1 | 1 | 1 | 1 | 0 | 1 | Grant to host with the priority |
| 14 | 1 | 0 | 0 | x | 1 | 0 | Grant is not issued [3] |
| 15 | 1 | 0 | 1 | x | 1 | 0 | Grant to host 11 |
| 16 | 0 | 1 | x | x | 1 | 0 | Grant to host 12 |
| 17 | 1 | 1 | 0 | 0 | 1 | 0 | Grant to host 12 [2] |
| 18 | 1 | 1 | 0 | 1 | 1 | 0 | Grant to host 12. Alternatively if legacy queue command Grant to host 12, elseif native queue command no Grant is issued [4] |
| 19 | 1 | 1 | 1 | 0 | 1 | 0 | Grant to host 12 [2] |
| 20 | 1 | 1 | 1 | 1 | 1 | 0 | Grant to host with the priority |
| 21 | 1 | 0 | 0 | x | 0 | 0 | Grant to host 11 [1] |
| 22 | 1 | 0 | 1 | x | 0 | 0 | Grant to host 11 |
| 23 | 0 | 1 | x | 0 | 0 | 0 | Grant to host 12 [2] |

TABLE 1-continued

Host Arbitration Operation

| | H1_fis_req | H2_fis_req | H1_Qcmd | H2_Qcmd | H1_Qempty | H2_Qempty | Host Arbitration Action |
|---|---|---|---|---|---|---|---|
| 24 | 0 | 1 | x | 1 | 0 | 0 | Grant to host 12 |
| 25 | 1 | 1 | 0 | 0 | 0 | 0 | Grant to host with the priority |
| 26 | 1 | 1 | 0 | 1 | 0 | 0 | Grant to host 12 |
| 27 | 1 | 1 | 1 | 0 | 0 | 0 | Grant to host 11 |
| 28 | 1 | 1 | 1 | 1 | 0 | 0 | Grant to host with the priority |
| 29 | 0 | 0 | x | x | x | x | Grant is not issued. |

Notes:
(1) Host 11 issues a non-queue command while it has a non-empty queue. The Switch will forward the command to Device. In response to receipt of non-queue command with non-empty queue the Device will set Error (ERR). Receipt of Error with non-empty queue will cause the Switch to flush non-empty queue commands and sending ERR status to Hosts with non-empty queue.
(2) Host 12 issues a non-queue command while it has a non-empty queue. The Switch will forward the command to Device. In response to receipt of non-queue command with non-empty queue the Device will set Error (ERR). Receipt of Error with non-empty queue will cause the Switch to flush non-empty queue commands and sending ERR status to Hosts with non-empty queue.
(3) Since the Host sending the non-queue command has an empty queue and the other Host has a non-empty queue sending the non-queue command will cause the Device to set Error and result in queue being Flushed. Therefore when the sending Host has and empty queue and sends a non-queue command while the other Host has a non-empty queue, the command is held until the other Host queue is emptied.
(4) As mentioned earlier when a Host with an empty queue issues a non-queue command while the other Host has a non-empty queue, the non-queue command is held until the queue is emptied. In this case in order to allow the queue to empty when the Host with non-empty queue sends another queue command it is desirable to hold the newly received queue command until the queue is emptied and the non-queue command is sent. In the case of a Legacy Queue Command it is not practical to hold the newly received legacy queue command, since the Switch has to release it when the Device is reconnecting. However this limitation does not apply to native queue command, and in case of native queue command The active switch 300 of FIG. 6 was described hereinabove using an arbitration algorithm based on rotating priority. Alternative embodiments using different arbitration algorithms fall within the true spirit and scope of the present invention. Such alternative arbitration algorithms include, but are not limited to, arbitration algorithms that provide bandwidth to each host based on static or dynamic weights (weight is the ratio of "allocated bandwidth to a host" to a "total available bandwidth"). Such arbitration algorithms use a method for measuring bandwidth such as, but not limited to, average transfer count (number of user data) per command, in the arbitration algorithm.

In layer 4, switching the received frame is processed from layer 1 up to layer 4 of the first protocol stack and then passed to layer 4 of the second protocol stack and then processed from layer 4 down to layer 1 of the second protocol stack. In order to reduce the circuitry associated with the switch 300 as well as to reduce the delay through the switch 300 several changes have been introduced in accordance with an embodiment of present invention. Theses changes are summarized and described in more detail below.

The host protocol stack and device protocol stack share the same Data FIS FIFO

Figure 9:
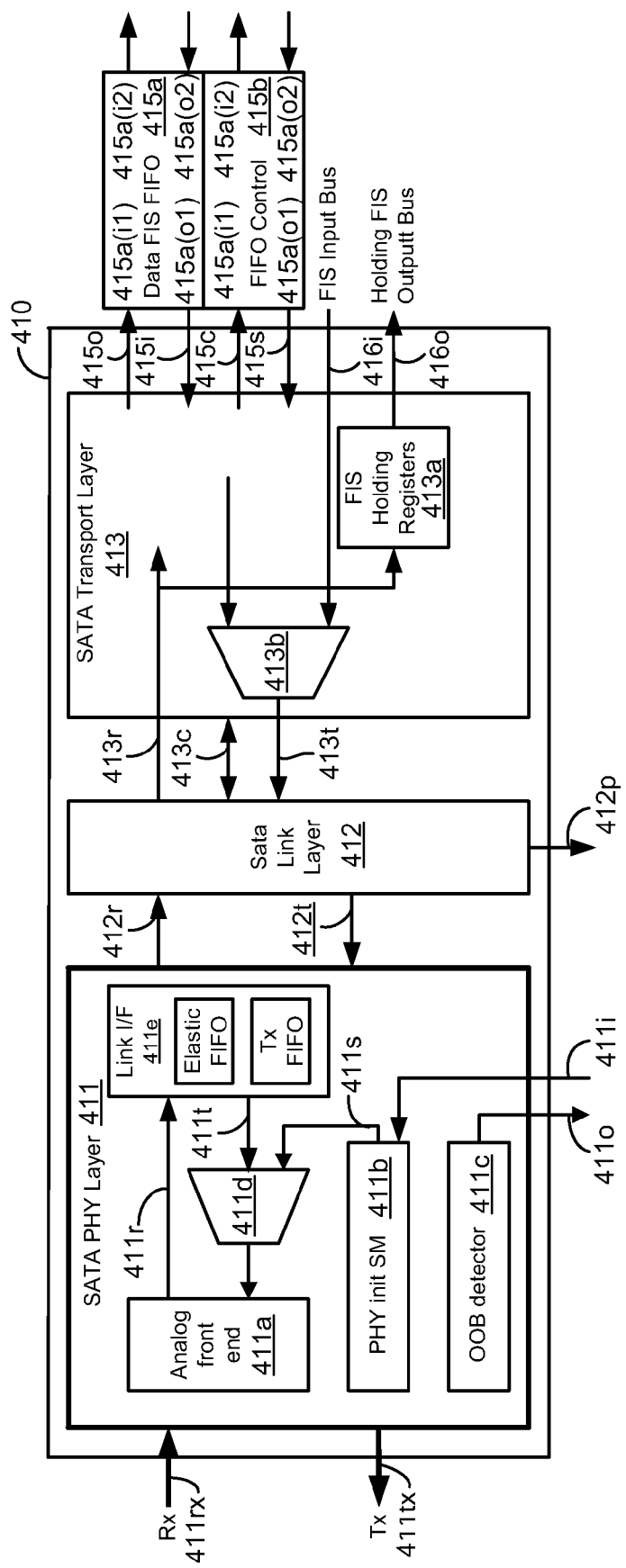
FIG. 9 illustrates a block diagram a SATA level 3 port used in an embodiment of active switch in accordance with the present invention.

Avoid sending task file form layer 4 to another layer 4, by sending FIS from layer 3 to layer 3 thereby reducing delay through the switch FIG. 9 shows a SATA level 3 port 410, used in the embodiments of the active switch 500 (FIG. 10a). SATA level 3 port 410 includes a PL circuit 411, a LL circuit 412, and a TL circuit 413. The PL circuit 411 comprises an Analog Front End circuit (AFE) 411a, a Phy/Link interface circuit 411e, a Phy Initialization State Machine (Phy ISM) 411b and an OOB detector 411c. The PL circuit 411 is shown connected to the outbound high speed differential transmit signals 411tx and the inbound differential receive signals 411rx. The PL circuit 411 is shown connected to the LL circuit 412 via a link transmit bus 412t and a link receive bus 412r. The OOB detector 411c detects OOB signals and transmits OOB detected signals on 411o. A multiplexer 411d controlled by the Phy ISM 411b selects the transmit data 411t or Phy ISM output 411s for transmission. The Phy ISM 411b control signals include signals 411i. The LL circuit 412 is shown connected to the PL circuit 411 via a link transmit data bus 412t and a link receive data bus 412r. The LL circuit 412 provides power down states and power down request on the signal 412p. The LL circuit 412 is shown connected to the TL circuit 413 via a transport transmit bus 413t, a transport receive bus 413r, and a transport control/status bus 413c. The TL circuit 413 comprises of FIS Holding Registers 413a and a multiplexer 413b. The TL circuit 413 does not include the Data FIS FIFO. The Data FIS FIFO 415a and associated FIFO Control 415b are moved out of the TL circuit 413 and are generally located externally to the SATA level 3 port 410. This modification of the TL circuit, i.e. moving the FIFO and FIFO control physically externally to the TL circuit is key in reducing the number of FIFOs and reducing the delay associated with the active switch. The SATA level 3 port 410 is shown connected to the external Data FIS FIFO 415a via a FIFO input bus 415i and a FIFO output bus 415o. The SATA level 3 410 port is shown connected to an external FIFO control 415b via a FIFO control bus 415c and a FIFO status bus 415s. The FIS input bus 416i and a holding FIS output bus 416o (collectively the "FIS bus structure") of the SATA level 3 port 410 provide additional input and output interfaces externally. In the embodiment of FIG. 9, the Data FIS FIFO includes only the payload of the Data FIS, the first Dword of Data FIS will be on the FIS input or output bus. The FIS bus structure allows passing non-Data FIS and the first transmitted Dword of Data FIS among SATA ports at layer 3 without passing FIS through layer 4. The external FIFO architecture allows passing the payload of the Data FIS among the SATA ports without passing the payload of the Data FIS through the layer 4. In an alternative embodiment, the Data FIS FIFO includes the complete Data FIS including the first Dword of the Data FIS. The FIS input bus and the holding FIS output bus generally include non-Data FIS.

FIGS. 10a and 10b show block diagrams of another embodiment of the active switch 500 of present invention. One of the features of the architecture of the active switch 500 is use of a common FIFO 555a, 555b for passing payload of Data FIS among the SATA ports without passing Data through the layer 4, thus reducing the delay associated with the switch as well as the number of FIFOs. Another feature of the active switch 500 is the FIS bus structure that allows passing non-Data FIS and first Dword of Data FIS among SATA ports at layer 3 without passing FIS through the layer 4, thereby reducing the delay thru the active switch 500.

Referring to FIG. 10a, the active switch 500 comprises a SATA level 3 host port 510, a SATA level 3 host port 520, a SATA level 3 device port 530, a Data FIS FIFO 555a, a FIFO Control 555*b*, a data multiplexer 551*a*, a control multiplexer 551*b*, a data multiplexer 553, a host FIS circuit 542, a device FIS circuit 543, and an arbitration and control circuit 541. The SATA level 3 ports 510, 520 and 530 architecture is the same as the architecture of SATA level 3 port 410 described above and shown in FIG. 9. The host FIS circuit 542 comprises a host FIS registers 514*a*, host FIS registers 524*a*, a pending host FIS registers 542*b* and a host FIS multiplexer 542*a*. The host FIS output 517*o*, the host FIS output 527*o*, and the pending host FIS output 542*p* are shown connected to inputs of the multiplexer 542*a*. The output of the host FIS multiplexer 542*a* is shown connected to the host FIS output bus 542*o*. The device FIS circuit 543 comprises a device FIS registers 534*a*, a device FIS mux-demux 543*a*, and a device FIS multiplexer 543*b*. The device FIS output 537*o*, a FIS bus 543*i*, and a sub-FIS bus 543*j* are shown connected to the inputs of the device FIS mux-demux 543*a*. The mux-demux 543*a*'s first output is the host FIS input bus 516*i*, and the mux-demux 543*a*'s second output is the host FIS input bus 526*i*. A control signal 543*k* controls the operation of device FIS mux-demux 543*a*. The host FIS output bus 542*o*, a FIS bus 543*m*, and a sub-FIS bus 543*n* are shown connected to the inputs of the device FIS multiplexer 543*b*. The device FIS multiplexer output 543*d* is shown connected to the device FIS input bus 536*i*. The device FIS multiplexer select signal 543*s* controls the operation of multiplexer 543*b*.

Referring to FIG. 10*c*, the mux-demux 543*a* operation is a two level multiplexing followed by a demultiplexing. At the first level multiplexing, as indicated by the control signal 543*k*, either the device FIS output bus 537*o* or the FIS bus 543*i* is selected and passed to a second level multiplexing where if it is indicated by control signal 543*k*, then a portion of the output of the first level multiplexing is substituted with the sub-FIS bus 543*j* and the result of second level multiplexing is demultiplexed to the two outputs of the mux-demux 543*a*. The control signal 543*k* includes control signals for the multiplexing and demultiplexing functions. The demultiplexing function passes the result of the second level multiplexing to the selected output and sets the other output of the mux-demux 543*a* to an inactive level. The multiplexer 543*b* operation is a two level multiplexing, at the first level, as indicated by the control signal 543*s*, either the host FIS output bus 542*o* or the FIS bus 543*m* is selected and is passed to the second level of multiplexing where it is placed onto the output 543*d*, or otherwise, as indicated by the control signal 543*s*, a portion of the output of the first level multiplexing is substituted with the sub-FIS bus 543*n* and then placed on the output 543*d*.

Referring to FIG. 10*a*, the Data FIS FIFO 555*a* is a dual ported FIFO, including a Data FIFO input 555*a*(i1), a Data FIFO output 555*a*(o1), a Data FIFO input 555*a*(i2) and a Data FIFO output 545*a*(o2). The FIFO control 555*b* includes a FIFO control input 555*b*(i1), FIFO status output 555*b*(o1) providing control and status of the Data FIFO port 555*a*, a control input 555*b*(i2) and a FIFO status output 555*b*(o2) providing control and status of the Data FIFO port 555*b*. The SATA level 3 host port 510 is shown connected to the outbound high speed differential transmit signals 511*tx* and the inbound differential receive signals 511 rx. The host FIFO output bus 515*o* is shown connected to the multiplexer 551*a*. The host FIFO input bus 515*i* is shown connected to the Data FIFO output port 555*a*(o1). The host FIFO control bus 515*c* and the FIFO status bus 515*s* are shown connected to the multiplexer 551*b* and to the FIFO status port 555*b*(o1), respectively.

The host holding FIS output bus 516*o* is shown connected to an input of host FIS registers 514*a*. The output of mux-demux 543*a* is shown connected to the host FIS input bus 516*i*. The SATA level 3 host port 520 is shown connected to the outbound high speed differential transmit signals 521*tx* and the inbound differential receive signals 521*rx*. The host FIFO output bus 525*o* is shown connected to the multiplexer 551*a*. The host FIFO input bus 525*i* is shown connected to the Data FIFO output port 555*a*(o1). The host FIFO control bus 525*c* and the FIFO status bus 525*s* are shown connected to the multiplexer 551*b* and to the FIFO status port 555*b*(o1), respectively. The host holding FIS output bus 526*o* is shown connected to the input of the host FIS registers 524*a*. The host FIS input bus 526*i* is shown connected to an output of mux-demux 543*a*.

The SATA level 3 device port 530 is shown connected to the outbound high speed differential transmit signals 531*tx* and the inbound differential receive signals 531*rx*. The device FIFO output bus 535*o* is shown connected to the multiplexer 553. The device FIFO input bus 535*i* is shown connected to the Data FIFO output port 555*a*(o2). The device FIFO control bus 535*c* and the device FIFO status bus 535*s* are shown connected to FIFO control port 555*b*(i2) and to the FIFO status port 555*b*(o2), respectively. The device holding FIS output bus 536*o* is shown connected to the input of device FIS registers 534*a*. The device FIS input bus 536*i* is shown connected to the device FIS multiplexer output 543*d*.

The arbitration and control circuit 541 receives the host 11 FIS output bus 517*o*, the host 12 FIS output bus 527*o*, the host FIS output bus 542*o*, and the device FIS output bus 537*o*. The arbitration and control circuit 541 generates a select signal 551*s* to select the active host which is the control signal for multiplexer 551*a* and 551*b*. The arbitration and control circuit 541 generates a control command layer output bus 553*i* that is connected to an input of the multiplexer 553, and a select signal 553*s*, which is the control signal for the multiplexer 553. The function of the bus 553*i* is to replace the data from the device in certain cases which were described earlier.

The arbitration and control circuit 541 generates host FIS multiplexer control signals 542*s* that control the operation of the multiplexer 542*a* to select one of the inputs of the multiplexer 542*a* and to place the selected input on the output 542*o*. The arbitration and control circuit 541 generates a FIS bus 543*i* and a sub-FIS bus 543*j* that are connected to inputs of the device FIS mux-demux 543*a*. The circuit 541 also generates a device FIS control signal 543*k* that control the operation of said mux-demux 543*a*. The arbitration and control circuit 541 generates a FIS bus 543*m*, a sub-FIS bus 543*n* that are connected to inputs of device FIS multiplexer 543*b*, and a device FIS select signal 543*s* that controls the operation of the multiplexer 543*b*.

As described earlier, FIGS. 8*a* and 8*b* show flow charts of the operation of the switch of the present invention for legacy queue commands and native queue commands (NQ CMDs) respectively. FIGS. 8*a* and 8*b* apply to the embodiment of FIGS. 10*a* and 10*b* of the switch 500 of the present invention.

In the disconnect/reconnect state 366*b*, the save state 376*b*, the send-tag-to-host state 378*b*, the NQ-remap state 384*a*, and the NQ-status state 385*b*, a modified FIS is sent to the host. The arbitration and control circuit 541 transmits the modified FIS and places the same onto the sub-FIS bus 543*j* that is connected to an input the of device FIS mux-demux 543*a*. The circuit 541 also sets the value on select signal 543*k* to substitute a portion of the device FIS output 537*o* with sub-FIS bus 543*j* and then demultiplexes to the outputs of mux-demux 543*a* which are connected to host FIS input buses.

In the reconnect-to-host state 376*a*, a new FIS is sent to the host. The arbitration and control circuit 541 transmits the new FIS on to the FIS bus 543*i* that is connected to an input of device FIS mux-demux 543a and sets the value on the select signal 543k to select the bus 543i and then demultiplexes to the outputs of mux-demux 543a which are connected to host FIS input buses.

In the send LQ CMD state 364 and the send NQ CMD state 382b, a modified FIS is sent to the device. The arbitration and control circuit 541 generates the modified FIS and places the same onto a sub-FIS bus 543n that is connected to an input of the device FIS multiplexer 543b and sets the value on the select signal 543s to substitute a portion of the host FIS output 542o with the sub-FIS bus 543n as the output of multiplexer 543b. The output of multiplexer 543b is connected to the device FIS input bus 536i.

In the send-service-CMD state 373, a new FIS is sent to the device. The arbitration and control circuit 541 transmits the new FIS on to a FIS bus 543m that is connected to an input of the device FIS multiplexer 543b and sets the value on the select signal 543s to select the bus 543m as the output of multiplexer 543b. The output of multiplexer 543b is connected to the device FIS input bus 536i.

Referring to FIG. 10b, the arbitration and control circuit 541 comprises a host arbitration circuit 544, a Tag/Sactive mapping circuit 546, and a control circuit 545.

The Tag/Sactive mapping circuit 546 is the same as that which is shown in FIG. 7b and the functions performed by Tag/Sactive mapping circuit 546 include:
  mapping a selected host queue tag to a send device tag and in the case of a legacy queue tag saving the result in a tag memory 341d, and keeping a list of valid queue tags
  inverse mapping a receive device queue tag to identify the host and obtaining the original host tag and in case of legacy queue tag invalidate queue tag when directed by control circuit at the completion of command.
  mapping a Sactive field to the host 11 Sactive field and the host 12 Sactive field corresponding to host 11 and host 2 respectively The host 11 FIS output bus 517o includes a host 11 FIS request 518, which includes the host 11 FIS request signal and the FIS type. The host 12 FIS output bus 527o includes a host 12 FIS request 528 which includes host 12 FIS request signal and the FIS type. The host arbitration circuit 544 receives the host 11 FIS request 518, the host 12 FIS request 528, control signals 544c from the control circuit 545, and the queue status signals 546q from the Tag/Sactive mapping circuit 546. In response to the control signal 544c from the control circuit 545, the host arbitration circuit 544 generates a host select signal 544hs that serves as an input to the control circuit 545. The operation of the host arbitration 544 was described hereinabove with respect to Table 1.

The functions performed by control circuit 545 include:
  generating a select signal 551s that controls the operation of the multiplexers 551a and 551b
  generating a control command layer output bus 553i that is connected to an input of multiplexer 553 and a select signal 553s which is the control signal for the multiplexer 553
  generating a FIS bus 543i, and a sub-FIS bus connected to inputs of device FIS mux-demux 543a and a device control signal 543k that controls the operation of the mux-demux 543a.
  generating a FIS bus 543m and a sub-FIS bus connected to the inputs of the device FIS multiplexer 543b and a device FIS multiplexer select signal 543s that controls the operation of the multiplexer 543b
  generating control signals for Tag/Sactive mapping circuit 546
  generating control signals for host arbitration 544

The embodiment of the FIG. 10b additionally includes the switch initialization circuit 549 and a power down state and request signals from the SATA ports.

The power down state and request signals 512p of SATA level 3 port 510 are shown connected to the control circuit 545. The OOB detector signals 511o of the SATA level 3 port 510 are shown connected to the switch initialization circuit 549. The Phy ISM control signals 511i of SATA level 3 port 510 are shown connected to the switch initialization circuit 549.

The power down state and request signals 522p of the SATA level 3 port 520 are shown connected to the control circuit 545. The OOB detector signals 521o of the SATA level 3 port 520 are shown connected to the switch initialization circuit 549. The Phy ISM control signals 521i of the SATA level 3 port 520 are shown connected to the switch initialization circuit 549.

The power down state and request signals 532p of the SATA level 3 port 530 are shown connected to the control circuit 545. The OOB detector signals 531o of SATA level 3 port 530 are shown connected to the switch initialization circuit 549. The Phy ISM control signals 531i of the SATA level 3 port 530 are shown connected to the switch initialization circuit 549. The switch initialization circuit 549 is the same as the switch initialization circuit 244 of FIG. 5. The function performed by the switch initialization circuit 549 can be distributed to the SATA PL circuits within the SATA ports 510, 520, and 530. Alternative embodiments that distribute the functions of the switch initialization circuit 549 to the SATA PL circuits within the SATA ports 510, 520, and 530 fall within the scope of present invention.

It is obvious to one of ordinary skill the art to extend embodiments of an SATA active switch of the present invention to an ATA Active Switch. FIGS. 11a and 11b show such embodiments of SATA to ATA active switch that allow concurrent access by two hosts connected to a switch via a SATA link to a storage unit connected to a switch via an ATA link.

FIG. 11a shows an embodiment of SATA to ATA switch 600 according to the present invention. The switch 600 is the same as the switch 300 of FIG. 6 with the following differences:
  The SATA level 4 device port 330 in switch 300 is replaced with a SATA layer 4 to ATA Bridge 630
  The SATA link 331tx, 331rx in switch 300 are replaced with an ATA link 636.

Figure 2A:
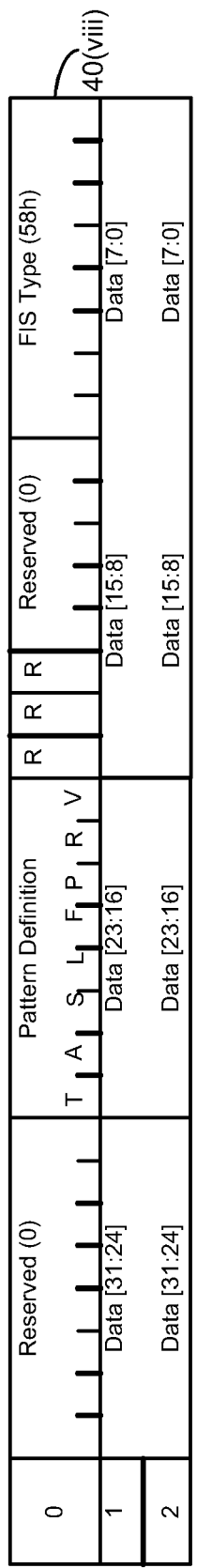
FIG. 2a shows a block diagram of a prior art SATA port including protocol layers 1-4.
Figure 2A:
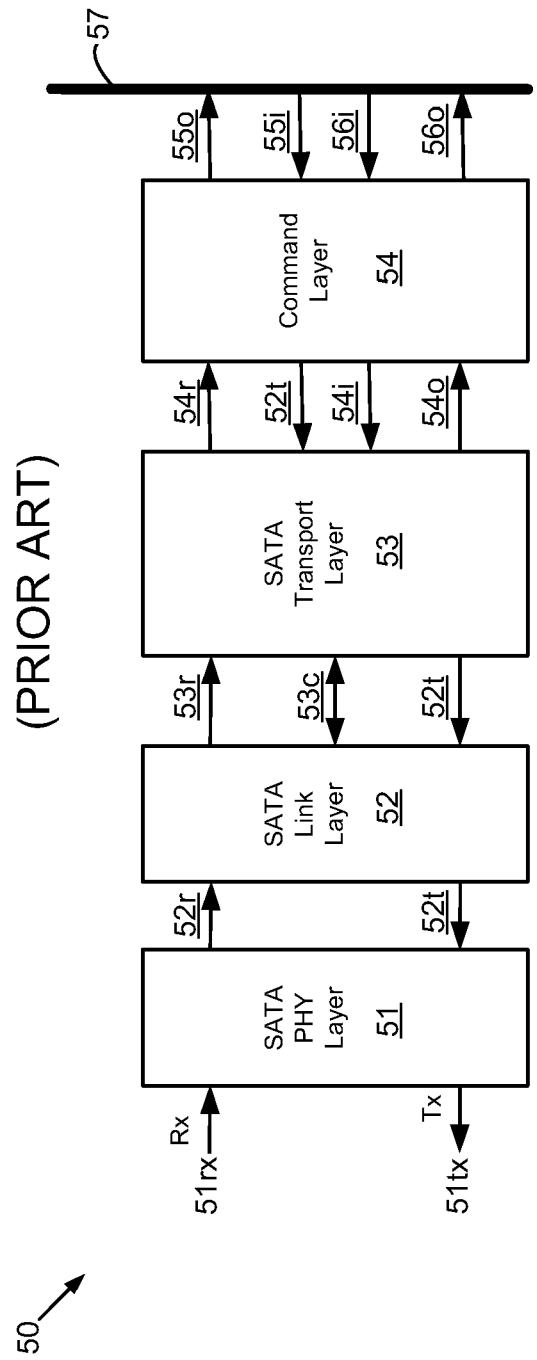

The SATA layer 4 to ATA Bridge 630 comprises a SATA Command layer 634, a ATA Transport Layer 633, and a ATA Interface Bridge 632. The ATA Interface Bridges 632 is shown connected to the ATA link 636 and converts (bridges) the activity on the ATA bus 636 to the activity on the Transport layer interface 633io and visa versa. The SATA Command Layer 634 and Transport Layer 633 are the same as the Command Layer 54 and the Transport Layer 53 of FIG. 2b.

FIG. 11b shows another embodiment of SATA to ATA switch 700 according to an embodiment of the present invention. The switch 700 is the same as the switch 500 of FIG. 10a with the following differences:
  The SATA level 3 device port 530 in switch 500 is replaced with a SATA layer 3 to ATA Bridge 730
  The SATA link 531tx, 531rx in switch 500 are replaced with an ATA link 736.

The SATA layer 3 to ATA Bridge 730 comprises a SATA Transport Layer 733, and a ATA Interface Bridge 732. The ATA Interface Bridge 732 is connected to the ATA link 736 and converts (bridges) the activity on the ATA bus 736 to the activity on the Transport layer interface 733*io* and visa versa. The Transport Layer 733 is the same as the Transport Layer 413 of FIG. 9.

Embodiments of FIGS. 11*a* and 11*b* have been described using parallel ATA bus. It is obvious to one skilled in the art that the invention can be extended to use other parallel buses. The scope of present invention includes using other parallel buses in addition to a parallel ATA bus.

FIG. 12 shows a modification to the SATA FIS organization to provide routing information. That is, in accordance with yet another embodiment of the present invention, the SATA port includes a route aware frame information structure for identifying which host is the origin and which is the destination. As shown in FIG. 1*d*, the SATA FIS organization has few reserved bits in the first Dword (Dword 0) of the FIS, specifically bits 8 thru 12 of Dword 0. By using one of these reserved bits to indicate which host is the origin or destination of the FIS, the routing in the switch is greatly simplified. This routing bit will be referred to as H-bit (91(*i*), 91(*ii*), 91(*iii*), 91(*iv*), 91(*v*), 91(*vi*), 91(*vii*) and 91(*viii*)) a logical value of zero indicates that the host 11 and a logical value of one indicates that the host 12 is the origin or destination of the FIS depending on the FIS direction. Thus, the device identifies which one of the hosts is an origin and/or destination so that routing of FIS is transparent to the switch thereby reducing the complexity of the design of the switch rendering its manufacturing less expensive, thus, providing 'route aware' routing through the switch.

When the switch is sending a FIS to the device, the switch resets the H-bit to a logical value of zero if the FIS originated from the host 11 and sets the H-bit to a logical value of one if the FIS originated from the host 12. The device has to save the H-bit and insert it in any FIS that is sent to the host. With a route aware FIS structure, the complexity of the active switch can be reduced to a layer 2 switch. The layer 2 switch of FIG. 5 can be modified to operate as an active switch with a route aware FIS structure. In one such modification, the active host selection circuit 141 of switch 200 is modified to examine the H-bit of inbound FIS from the device and route it to the proper host by generating control signals for path selection based on the H-bit of the incoming FIS.

The embodiments of the present invention have been described using a dual port FIFO. It should be apparent to those skilled in the art that a single port FIFO can be used with additional circuitry to replace a dual port FIFO. Furthermore, some of the buses in the embodiment that are input or output can be combined to be a single bidirectional input/output bus. Additionally, buses that are dedicated to one function can be combined into a single bus.

To summarize, in an embodiment of the present invention, two hosts, host 1 and host 2, such as host 11 and host 12 in FIG. 3*a*, coupled to a storage unit for writing and reading information thereto and from, seek concurrent access to a storage unit (such as the storage unit 16, shown in FIG. 3*a*) through a switch, such as switches 300 and 500 of FIGS. 6 and 10*a*, respectively. This is an important difference with that of prior art systems because while in the prior art, two hosts have access to the storage unit, they cannot concurrently access the same. In the prior art, if a connection between one of the hosts to the storage unit fails for some reason, the other host can continue to access the storage unit. However, switching to the other host, after the detection of a failure, causes a glitch in that the system needs to be reset prior to the other host's communication with the storage unit.

In yet other prior art systems, such as fault-tolerant systems, one host shadows the other host, that is whatever the active host is doing is attempted to be mimicked by the inactive host. This concept is called "heartbeat" indicating a connectivity between the two hosts to the extent both hosts are aware of each other's presence and that the other is operational. That is, one host realizes the failure by the other host in the event this "heartbeat" is no longer detected at which time the host that has performed the detection takes over accessing the storage unit and continues to operate without the other host. Yet such prior art systems require using a dual ported storage unit and can not use a single ported storage unit since the hosts are not capable of accessing the storage unit concurrently as done by the present invention.

Within enterprise systems, there is a great need for the embodiments of the present invention because multiple hosts are required to access a single ported storage unit at the same time. In the present invention, commands are transferred from the hosts to the storage unit concurrently as are other types of information. The present invention eliminates any glitches caused by switching from an active to an inactive host, as experienced by some prior art systems described hereinabove. In fact, in the present invention, switching between the two hosts is performed in a continuous and smooth fashion.

Hardware is essentially structured to follow the layers of SATA. The SATA physical layer includes an analog front end for transmitting and receiving high speed signals. An initialization state machine is also included along with an out-of-band detector and an interface block for interfacing with the link layer. A selection device selects whether to send initialization information or data from the physical layer. The link layer communicates with the transport layer, which typically includes a FIFO used for data transfer and a set of registers employed for non-data FIS exchange. The FIFO is generally used for storing data FIS while registers are generally used to store non-data FIS.

As shown in FIG. 4, in one of the systems of the prior art, there is a physical layer for one host, another physical layer for the other host and a physical layer for the device or storage unit used by a switch that is coupled between the hosts and the device. None of the other layers are in communication with the hosts and/or device. Through the physical layer, one of the hosts is selected by a multiplexer for communicating with the device and then the device sends data to that active host. An active host selection circuit decides or selects which host is initially selected along with an initialization circuit. Thus, this prior art switch only needs layer one or the physical layer to communicate, no other layers are needed for communications. However, as noted earlier, one of the problems with such a prior art system is the delay through the switch. Another problem is that only one host can communicate with the device at any given time.

One of the embodiments of the present invention seeks to solve the problem of the delay through the switch, as shown in FIG. 5. The delay through the switch is not a problem because the second layer of the SATA link is employed as opposed to only the first layer. The switch is actually a layer 2 switch, thus, capable of communicating within the link layer as well as the physical layer. The data from the host link layers are multiplexed but prior to being sent to the device, they are stored in a FIFO so as to be buffered in the event the delay through the switch is longer than that which is allowed by the serial ATA standard in which case, in prior art systems, this data would have been lost due to the long delay. However, in the embodiment of FIG. 5, the FIFO buffering prevents any data loss even if the delay through the switch is longer than the requirements of the standard. Subsequently, data from the device is routed to the active host by the use of the demultiplexer 243 (FIG. 5). Thus, in the embodiment of FIG. 5, while only one host communicates with the device at any given time, the delay through the switch 200 does not interfere with system performance and is in accordance with the standard's requirements.

Alternatively, layer 1 or the physical layer may be employed with a FIFO (rather than just layer 1) used to render the delay through the switch negligible, as done with the addition of layer 2 and described hereinabove.

In FIG. 6, concurrent access by two hosts to a device is depicted. Concurrency, as used herein, indicates acceptance of commands, from either of two or more hosts, at any given time including when a device (such as a storage unit) is not in an idle state. Idle state is when the device processing other commands. Traditionally, concurrency is achieved by multiplexing each host at a given slice of time, or what is commonly referred to as Time Division Multiplexing (TDM). However, this does not work well for storage devices because one may be in the middle of data transfer when suddenly, the transfer is interrupted to service another host due to a new time slice, or slot, occurring, which would be devastating to system performance and may result in lost data.

Thus, command-based switching or multiplexing is employed by the embodiment of FIG. 6. That is, when a command from one host is being processed, any commands from the other host are buffered and thereafter sent to the device after the current command is completed and so on, causing a ping-pong effect between the commands of the two hosts.

To effectuate command-based multiplexing, a task file is used in layer 4 for the two hosts as well as the device. In FIG. 6, this is shown as ports, the host ports and a device port are all layer 4 (or command layer) ports. The arbitration and control circuit 340 (FIG. 6) monitors the task file to check for any commands that might have been sent and then the commands are prioritized and the highest priority command is sent to the device. When a host port receives the command and has the priority, it will send a command to the device port. In the meantime, if another command is received from another host, it is stored in the task file and sent to the arbitration and control circuit and once the previous command is serviced, the pending command is relayed to the device and this ping-pong effect goes on. It should be noted that the timing requirements of the switch are met in the embodiment of FIG. 6 because the transfer of information is occurring using layers 1-4 which includes a FIFO. Additionally, commands can be sent concurrently allowing for concurrent transfer between two hosts and the device.

Further details of the arbitration and control circuit 340 of FIG. 6 are provided in the remaining figures of this document and discussed throughout the same.

The device sends information about its capabilities in response to "Identify Drive Command" and some of the parameters indicated by the device can be changed by the switch. For example, if the device supports command queuing, it has a queue depth indicating how many commands it can queue and then this information becomes important to the hosts. For example, if the queue depth indicates that only 32 commands can be queued, any number of commands exceeding this number, by both hosts, will overrun and result in commands being lost, as only 16 commands per host can be queued. Thus, the queue depth information is altered to indicate 16 rather than 32 so that each host only queues 16 commands.

The way this is done practically is to intercept the Q DEPTH information coming from the device and to change its value from 32 to 16. Additionally, a queue tagging circuitry for mapping the host tag and remapping device tag is employed Throughout this document, where a mux-demux circuit is used or discussed, it is referring to first selecting between two or more signals, thus, performing the muxing function and later routing the selected signal to the active host, thus, performing the demuxing function.

In the embodiment of FIG. 6, three FIFOs are employed, one in each host and a third in the device. This introduces delays.

In an alternative embodiment, as shown in FIGS. 9 and 10, only one FIFO is used where a FIFO is taken out of the transport layer. Rather, a FIS interface is used in layer 3, which makes for a less complex design and less delays due to FIFOs. A FIFO is shared by all three ports, the host ports and the device port.

In FIG. 11, layers 1 and 2 are replaced with a non-serial ATA port such as an ATA port thereby enabling use of storage units using non-serial ATA standard improving system cost using lower cost storage units in the system.

In yet another embodiment of the present invention, the FIS structure is replaced with a route aware FIS structure and a layer 2 switch is employed thereby cutting through layers of processing.

Thus, four distinct embodiments are shown and discussed, one is for using a layer 4 switching, another one is to bring down the communication to a different layer (layer 3) and introduces FIFOs to accommodate such communication, yet another is to replace the serial ATA with an ATA interface and the fourth is a route-aware FIS structure for switching where the FIS structure is aware of the routing of information to the different hosts.

It should be noted that while throughout this patent document, references are made to a particular polarity or logic state of a signal, such as logic state '1' or '0' to indicate active or inactive states of a signal, that the opposite polarity may in fact be used without departing from the scope and spirit of the present invention. Furthermore, any other type of known states of signals may be utilized without departing from the scope and spirit of the present invention.

The capitalization of certain letters of names of signals, states, devices and so forth, as used throughout this patent document, are done so to maintain consistency with names of corresponding signals, states, devices and so forth disclosed in the "Serial ATA: High Speed Serialized At Attachment", published by Serial ATA work group www.serialata.com, the contents of which are incorporated herein by reference as though set forth in full.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention. It is obvious to an expert in the art to combine the present invention with prior art to develop devices and methods that perform multiple functions including the teachings of this invention. Such devices and methods fall within the scope of present invention.

What is claimed is:

1. A switch coupled between a plurality of host units and a device for communicating therebetween and comprising:

a) a first serial advanced technology attachment (SATA) port coupled to a first host unit and including a first host task file, said first port for accessing, to the device, by the first host unit, the first host task file responsive to commands sent by the first host unit;

b) a second SATA port coupled to a second host unit and including a second host task file, said second port for accessing to the device, by the second host unit, the second host task file responsive to commands sent by the second host unit;

c) a third parallel ATA (PATA) port including a device task file, coupled to the device, for accessing the device, by the first or second host units, the device supports queuing of the commands sent by the first and second host units and generates an original queue depth value indicative of a number of commands that the device can queue from either of the first or second host units; and d) an arbitration and control circuit, coupled to said first host task file, said second host task file, and said device task file for selecting one of the first host or second host units to concurrently access the device, through the switch, by accepting the commands from either of the first or second host units, at any given time, including when the device is not in an idle state, the arbitration and control circuit being responsive to the original queue depth value and alters the original queue depth value to be a new queue depth value that is less than the original queue depth value so that each of the first and second host units is assigned less than the number of commands indicated by the original queue depth value but that a total number of commands queued by the first and second host units remains the same as the original queue depth value thereby misrepresenting the original queue depth value to the first and second host units to be less than the original queue death value thereby preventing the commands sent by the first and second host units from being lost by an overrun of the original queue depth value by either of the first or second host units.

2. A switch as recited in claim 1 wherein said first, second and third ports are level 4 ports.

3. A switch as recited in claim 1 wherein said device is a storage unit.

4. A switch as recited in claim 1 wherein said switch is employed in an enterprise system.

5. A switch as recited in claim 1 wherein said arbitration and control circuit causes the concurrent access of the device by the first and second host units.

6. A switch as recited in claim 1 wherein information, the form of data, commands or setup, is transferred from the device to the first or second host units through the switch and the information is modified by the switch prior to being received by the first or second host units such that modified information rather than the information is received by the first or second host units.

7. A switch as recited in claim 6 wherein the information is referred to as 'identity drive response'.

8. A switch as recited in claim 6 wherein the information is referred to as 'Tag'.

9. A switch as recited in claim 1 wherein information, in form of data, commands or setup, is transferred from the first or second host units to the device through the switch and the information is modified by the switch prior to being received by the device such that modified information rather than the information is received by the device.

10. A switch as recited in claim 9 wherein the information is referred to as 'Tag'.

11. A switch as recited in claim 10 wherein the arbitration and control circuit include a Tag/Sactive Mapping Circuit for mapping a host tag to a device tag and inverse mapping for identifying either the first or second host unit.

12. A switch as recited in claim 1 wherein either the first or the second host sends a legacy queue command queued by the device.

13. A switch as recited in claim 1 wherein either the first or the second host sends a native queue command for execution thereof by the device.

14. A switch as recited in claim 1 wherein the first, second and third ports are level 3 ports and a Data frame information system (FIS) first-in-first-out (FIFO) circuit and an associated FIFO Control are coupled to the first, second and third ports and located external thereto.

15. A switch comprising:

a first serial advanced technology attachment (SATA) port for connection to a first host unit, the first port including a first host task file responsive to commands sent by the first host unit;

a second SATA port for connection to a second host unit, the second port including a second host task file responsive to commands sent by the second host unit;

a third parallel ATA (PATA) port for connection to a device, the third PATA port including a device task file, the device supports queuing of the commands sent by the first and second host units and generates an original queue depth value indicative of a number of commands that the device can queue from either of the first or second host units; and an arbitration and control circuit coupled to said first host task file and said second host task file and said device task file, for selecting either the first host unit or the second host unit to concurrently access the device, through the switch, by accepting the commands from either of the first or second host units, at any given time, including when the device is not in an idle state, the arbitration and control circuit being responsive to the original queue depth value and alters the original queue depth value to be a new queue depth value that is less than the original queue depth value so that each of the first and second host units is assigned less than the number of commands indicated by the original queue depth value but that a total number of commands that can be queued by the first and second host units remains the same as the original queue depth value thereby misrepresenting the original queue depth value to the first and second host units to be less than the original queue depth value thereby preventing the commands sent by the first and second host units from being lost by an overrun of the original queue depth value by either of the first or second host units.

16. A switch as recited in claim 15 wherein the switch is a SATA switch.

17. A switch as recited in claim 15 wherein said device is a storage unit.

18. A switch as recited in claim 15 wherein said switch is employed in an enterprise system.

19. A switch as recited in claim 15 wherein said arbitration circuit causes the concurrent access of the device by the first and second host units.

20. A switch as recited in claim 15 wherein information, in form of data, commands or setup, is transferred from the device to the first or second host units through the switch and the information is modified by the switch prior to being received by the first or second host units such that modified information rather than the information is received by the first or second host units.

21. A switch as recited in claim 20 wherein the information is referred to as 'identity drive response'.

22. A switch as recited in claim 20 wherein the information is referred to as 'Tag".

23. A switch as recited in claim 15 wherein information, in form of data, commands or setup, is transferred from the first or second host units to the device through the switch and the information is modified by the switch prior to being received by the device such that modified information rather than the information is received by the device.

24. A switch as recited in claim 22 wherein the information is referred to as 'Tag'.

25. A switch that is connectable to a first host unit, a second host unit and a device via serial advanced technology attachment (SATA) links, said switch comprising:
   a first SATA port for connection to the first host unit, the first SATA port including a first host task file responsive to commands sent by the first host unit;
   a second SATA port for connection to the second host unit, the second SATA port including a second host task file responsive to commands sent by the second host unit;
   a third parallel ATA (PATA) port for connection to the device, the third PATA port including a device task file, the device supports queuing of the commands sent by the first and second host units and generates an original queue depth value indicative of a number of commands that the device can queue from either of the first or second host units; and
   an arbitration and control circuit, coupled to said first host task file, to said second host task file, and to said device task file, for selecting one of the first or second host units to concurrently access the device through the switch, by accepting the commands from either of the first or second host units, at any given time, including when the device is not in an idle state, the arbitration and control circuit being responsive to the original queue depth value and alters the original queue depth value to be a new queue depth value that is less than the original queue depth value so that each of the first and second host units is assigned less than the number of commands indicated by the original queue depth value but that a total number of commands queued by the first and second host units remains the same as the original queue depth value thereby misrepresenting the original queue depth value to the first and second host units to be less than the original queue death value thereby preventing the commands sent by the first and second host units from being lost by an overrun of the original queue depth value by either of the first or second host units.

26. A switch as recited in claim 25 wherein the switch is a SATA switch.

27. A switch as recited in claim 25 wherein said device is a storage unit.

28. A switch as recited in claim 25 wherein said switch is employed in an enterprise system.

29. A switch as recited in claim 25 wherein said arbitration and control circuit causes the concurrent access of the device by the first and second host units.

30. A switch as recited in claim 25 wherein information, in form of data, commands or setup, is transferred from the device to the first or second host units through the switch and the information is modified by the switch prior to being received by the first or second host units such that modified information rather than the information is received by the first or second host units.

31. A switch as recited in claim 30 wherein the information is referred to as 'identity drive response'.

32. A switch as recited in claim 30 wherein the information is referred to as 'Tag'.

33. A switch as recited in claim 25 wherein information, in form of data, commands or setup, is transferred from the first or second host units to the device through the switch and the information is modified by the switch prior to being received by the device such that modified information rather than the information is received by the device.

34. A switch as recited in claim 33 wherein the information is referred to as 'Tag'.

35. A switch, as recited in claim 1, wherein the new queue depth value reported to each of the first and second host units is no more than half of the original queue depth value.

36. A switch, as recited in claim 1, wherein in response to an identify drive command from either of the first or second host units, the arbitration and control circuit is configured to intercept an identify drive response, which is generated by the device in response to the identify drive command, and to replace the original queue depth value with the new queue depth value that is no more than one-half of the original queue death value that was reported by the device.

* * * * *

UNITED STATES PATENT AND TRADEMARK OFFICE
Certificate

Patent No. 7,523,236 B1                                                               Patented: April 21, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Sam Nemazie, San Jose, CA (US); Andrew Hyonil Chong, San Jose, CA (US); Young-Ta Wu, Fremont, CA (US); and Shiang-Jyh Chang, San Jose, CA (US).

Signed and Sealed this Nineteenth Day of October 2010.

*ALFORD W. KINDRED*
*Supervisory Patent Examiner*
*Art Unit 2181*
*Technology Center 2100*